United States Patent
Newton et al.

(10) Patent No.: US 11,477,017 B2
(45) Date of Patent: Oct. 18, 2022

(54) SYSTEM AND METHOD FOR QUANTUM-SAFE AUTHENTICATION, ENCRYPTION, AND DECRYPTION OF INFORMATION

(71) Applicant: NOVUS PARADIGM TECHNOLOGIES CORPORATION, Vancouver (CA)

(72) Inventors: Olivier Francois Roussy Newton, Vancouver (CA); Andrew Deonarine, Angus (CA); Nicolas Alexandre Roussy Newton, Vancouver (CA); Railton Frith, Little Kimble (GB)

(73) Assignee: BTQ AG, Vaduz (LI)

( * ) Notice: Subject to any disclaimer, the term of this patent is extended or adjusted under 35 U.S.C. 154(b) by 0 days.

(21) Appl. No.: 16/754,055

(22) PCT Filed: Oct. 8, 2018

(86) PCT No.: PCT/GB2018/052872
§ 371 (c)(1),
(2) Date: Apr. 6, 2020

(87) PCT Pub. No.: WO2019/069103
PCT Pub. Date: Apr. 11, 2019

(65) Prior Publication Data
US 2020/0328886 A1 Oct. 15, 2020

Related U.S. Application Data

(60) Provisional application No. 62/569,041, filed on Oct. 6, 2017.

(51) Int. Cl.
*H04L 9/08* (2006.01)

(52) U.S. Cl.
CPC .......... *H04L 9/0858* (2013.01); *H04L 9/0825* (2013.01); *H04L 9/0869* (2013.01)

(58) Field of Classification Search
CPC ... H04L 9/0858; H04L 9/0825; H04L 9/0869; H04L 9/0819; H04L 9/085; H04L 9/08
See application file for complete search history.

(56) References Cited

U.S. PATENT DOCUMENTS

2017/0264434 A1* 9/2017 Takahashi ............. H04L 9/0858
2019/0103962 A1* 4/2019 Howe .................... G06F 21/606

OTHER PUBLICATIONS

International Search Report and Written Opinion issued in related PCT International Application No. PCT/GB2018/052872, dated Dec. 7, 2018 (10 pgs.).

(Continued)

*Primary Examiner* — Quazi Farooqui
(74) *Attorney, Agent, or Firm* — Finnegan, Henderson, Farabow, Garrett & Dunner LLP

(57) ABSTRACT

Aspects and embodiments of the present invention relate to a method and system for generating a private cryptographic key for use in a secure cryptogram for transmission between a first entity and a second entity. The method may comprise: selecting a random vector defined in an n-dimensional vector space shared between the first entity and the second entity, the vector comprising one or more component coordinates defined in the n-dimensional vector space, each component coordinate being associated with one or more bits; determining the one or more bits associated with each component coordinate comprised in the random vector, and generating the private key in dependence on the one or more bits associated with each component coordinate comprised in the random vector.

60 Claims, 26 Drawing Sheets

(56) References Cited

OTHER PUBLICATIONS

Laih, Chi Sung, et al., "A new threshold scheme and its application in designing the conference key distribution cryptosystem," Information Processing Letters, vol. 32, No. 3, Aug. 24, 1989, pp. 95-99, Elsevier Science Publishers B.V., North-Holland (5 pgs.).

Brickell, Ernest F., "Some Ideal Secret Sharing Schemes," J.J. Quisquater and J. Vandewalle (Eds.): Advances in Cryptology—EUROCRYPT '89, Workshop on Theory and Application of Cryptographic Techniques, Houthalen, Belgium, Apr. 10-13, 1989 Proceedings, LNCS 434, pp. 468-475, Springer-Verlag Berlin Heidelberg 1990, Germany (8 pgs.).

Dutta, Ratna, et al., "Generalized Self-healing Key Distribution Using Vector Space Access Structure," A. Das et al. (Eds.): Networking 2008 Ad Hoc and Sensor Networks, Wireless Networks, Next Generation Internet, $7^{th}$ International IFIP-TC6 Networking Conference Singapore, May 5-9, 2008. LNCS 4982, pp. 612-623, Springer, IFIP International Federation for Information Processing 2008, Germany (12 pgs.).

\* cited by examiner

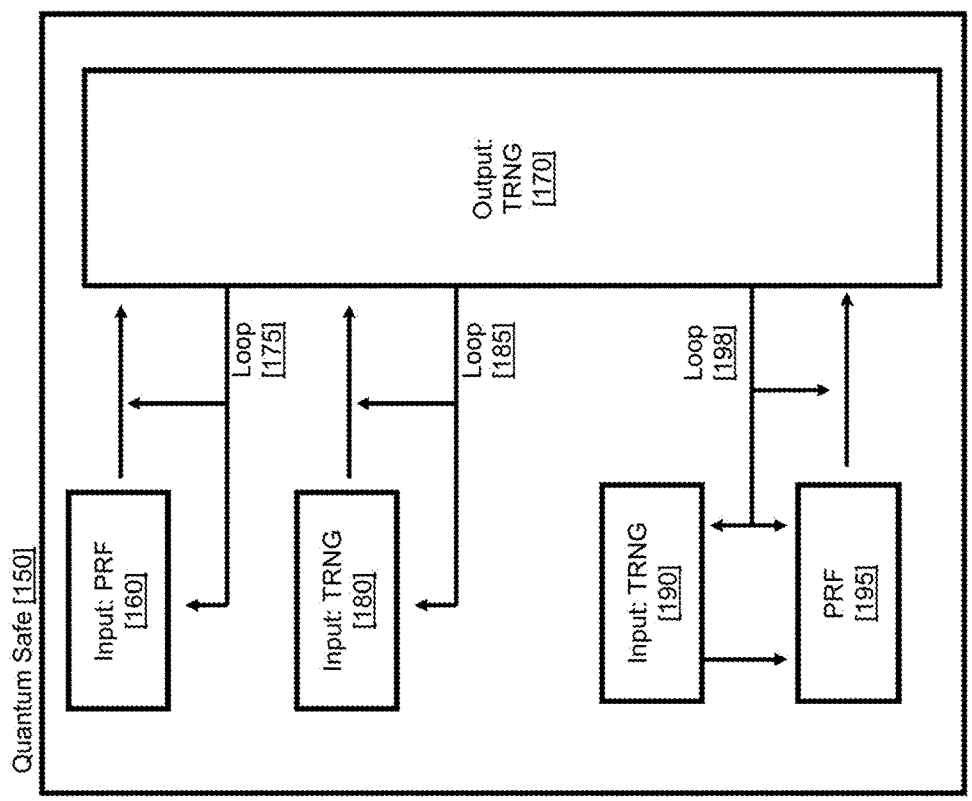
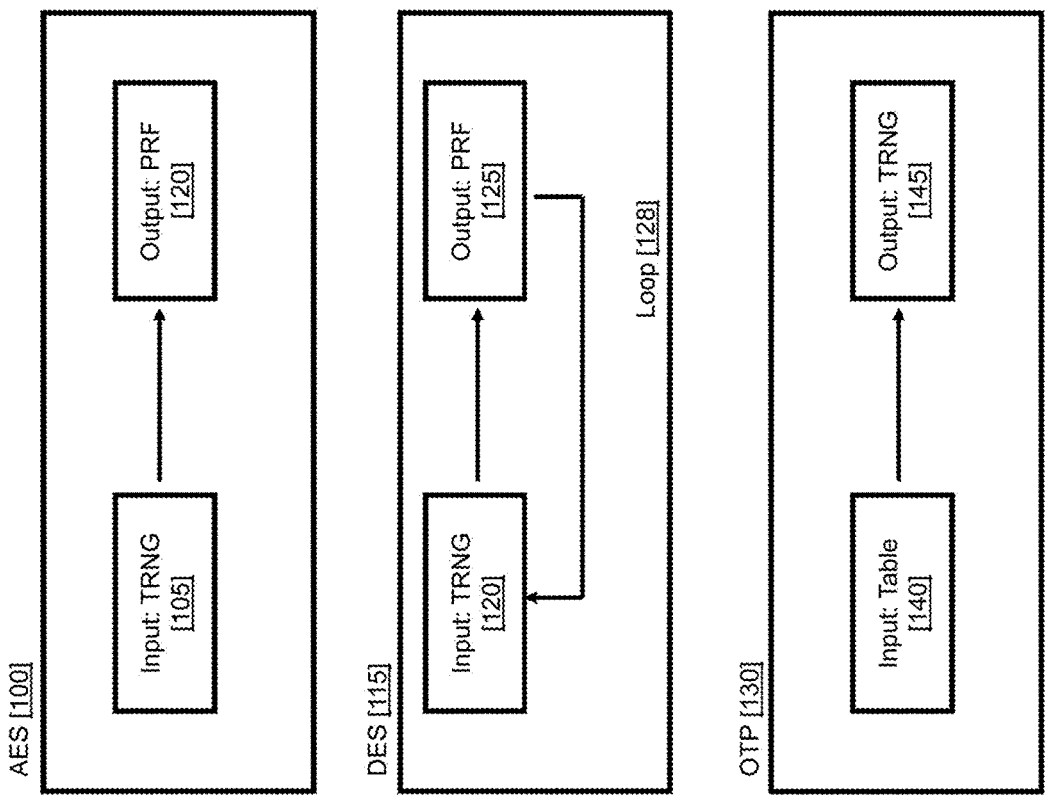
FIG. 1

FIG. 14

```
14001  DEFINE FUNCTION RANDOM(TYPE:QUANTUM|TRUE|PSEUDO,[RANGE:MAX[,MIN]]) : INTEGER;
14002  //----------
14003  ON PHASE ZERO -- MANUFACTURER ONE-TIME CONFIGURATION
14004                 -- SOFTWARE FIRMWARE MICROCODE HARDWARE
14005  CONFIGURATION
14006    BUILD.VERSION   = 1;                    // arbitrary constants
14007    BUILD.FEATURES  = ENHANCED;              // algorithm version
14008    BUILD.SERIALNO  = NEXT_SERIALNO;         // bit array of features supported
14009                                             // manufacturer's sequential serial numbers
14010    OPT_MODE        = SIMPLE|ENHANCED;       // normal mode = enhanced
14011    OPT_INTEGERSIZE = 64;                    // use 64bit/8byte storage path
14012    OPT_INDEXSIZE   = 128;                   // use 128bit/16byte packed virtual index
14013
14014    OTP_SIZEDEFAULT  = 2^24;                 // default otp size = 128mb
14015    OTP_DIMDEFAULT   = 2^2+1;                // default otp dimension = 5th order hypercube
14016    OTP_SIZERANGE    = 2^50..2^20;           // physical otp size range = 1mbit to 1pb
14017    OTP_DIMRANGE     = 2^1..2^16;            // virtual otp hypercube dimensions range 2 to 256
14018    OTP_TANGLERANGE  = 2^16..2^8;            // maximum phase one entangle run length before new master
14019    OTP_ENCRYPTRANGE = 2^16..2^8;            // maximum phase two encryption run length before new virtual index
14020
14021  DEVICE.OTP = FILL(ARRAY[OTP_SIZEDEFAULT],RANDOM(2^OPT_INTEGERSIZE);  // fill entire otp with random numbers
14022  END PHASE ZERO;
14023
14024  //----------
14025  ON PHASE ONE -- INITIALISE AND ENTANGLE OTPs
14026               -- ONE-TIME KEY EXCHANGE
14027               -- ALL DEVICES PHYSICALLY PROXIMAL AND SHIELDED
14028  CASE TEST_PIN                              // hardware pin or software build flag selects mode
14029    HIGH : OPT_MODE = ENHANCED;
14030    LOW  : OPT_MODE = SIMPLE;
```

```
14031  // RANDOMISE ONE TIME PAD, SET POSSIBLE SIZE AND DIMENSIONS ----------------------
14032  CASE OPT_MODE                                                                      // used enhanced security to obscure dimensions, sizes, run-lengths
14033    SIMPLE   : OTP_SIZE        = OTP_SIZEDEFAULT;
14034               OTP_DIMENSIONS  = OTP_DIMDEFAULT
14035    ENHANCED : OTP_SIZE        = RANDOM(OTP_SIZERANGE);                              // cloak size of otp
14036               OTP_DIMENSIONS  = RANDOM(OTP_DIMRANGE);                               // cloak dimensions used by votp
14037
14038  FOR DEVICE IN PHYSICAL_DEVICES DO                                                  // use all devices
14039    DEVICE.OTP = FILL(ARRAY[OTP_SIZE],RANDOM(MAXINT);                                // fill otp with random numbers
14040    SYNC(PHYSICAL_DEVICES);                                                          // ensure all otp's ready before entanglement
14041
14042  // KEY EXCHANGE WITH LIMITED RANDOMISED RUN LENGTH PER DEVICE ---------------------
14043  CASE OPT_MODE
14044    SIMPLE   : DEVICE.OTP = DEVICE.OTP XOR EVERYOTHER.OTP;                           // entangle all the otp's
14045    ENHANCED : REPEAT                                                                // prevent bad actor as only master used
14046               MASTER = RANDOM(PHYSICAL_DEVICE.COUNT);                               // chose a different master device
14047               LEN    = RANDOM(OTP_TANGLERANGE);                                     // chose a small next part of the otp
14048               MASTER.OTP(LEN) = MASTER.OTP(LEN) XOR EVERYOTHER.OTP(LEN);            // entangle some of the otp's
14049               UNTIL OTP_TANGLED;                                                    // keep using different master to entangle new part of otp
14050
14051  // RANDOMISE NUMBER OF DIMENSIONS AND SIZE OF EACH DIMENSION ----------------------
14052  OTP_DIMSIZE = OTP_SIZE DIV OTP_DIMENSIONS;                                         // set average dimension size
14053  FOR VDIM IN OTP_DIMENSIONS-1 DO
14054    CASE OPT_MODE
14055      SIMPLE   : OTP_DIMARRAY[VDIM] = OTP_DIMSIZE;                                   // divide otp equally across all votp dimensions
14056      ENHANCED : MASTER = RANDOM(PHYSICAL_DEVICE.COUNT);                             // chose a different master device
14057                 OTP_DIMARRAY[VDIM] = RANDOM(OTP_DIMSIZE,+/-OTP_DIMSIZE DIV 2);     // random spread of votp size 50..150% of dimsize
14058                 SYNC(PHYSICAL_DEVICES);                                             // other devices updated with dimension size
14059  OTP_DIMARRAY[OTP_DIMENSIONS] = REMAINDER(OTP_SIZE);                                // use remainder of otp_size on last votp dimension
14060  END PHASE_ONE;
```

```
15062  //------------------------------------------------
15063  ON PHASE_TWO -- ACCESS, ENCRYPT/DECRYPT, CERTIFY/AUTHENTICATE
15064                 -- ALL DEVICES REMOTELY CONNECTED
15065                 -- USING UNIQUE COMBINATIONS OF INDEXES INTO DIMENSIONS
15066  //------------------------------------------------
15067  // RANDOM/NEXT VIRTUAL INDEX
15068  FUNCTION RANDOM_INDEX : VINDEX;
15069    FOR VDIM IN OTP_DIMENSIONS DO
15070      VINDEX[VDIM] = RANDOM(OTP_DIMARRAY[VDIM]);   // randomise within each dimension size
15071                                                   // index at random start position in hypercube
15072  FUNCTION NEXT_INDEX : VINDEX;
15073    FOR VDIM = 1 TO OTP_DIMENSIONS DO              // modulo arithmetic on each dimension
15074      INC (VINDEX[VDIM])                            // working on lowest dimensions first
15075      IF   VINDEX[VDIM] < OTP_DIMARRAY[VDIM] THEN BREAK   // next position in lowest order dimension
15076      ELSE VINDEX[VDIM] = 0                         // confirm no overflow of index in the dimension
15077    IF COUNT(VINDEX IN INDEXLIST) > 1               // overflow into next position in higher dimension
15078    THEN INDEXLIST.MERGE_OVERLAPRANGE;              // when one encrypt range starts to overlap
15079                                                   // merge adjacent/overlapping indexlists ranges
15080  // NEXT/MERGE ENCRYPTION RANGE LIST
15081  FUNCTION NEXT_RANGE;
15082    CASE INDEXLIST.FULL                             // list of previous encryption ranges used
15083      TRUE  : VINDEX = INDEXLIST(RANDOM(COUNT)).LASTINDEX;   // extend an existing range
15084      FALSE : REPEAT VINDEX = RANDOM_INDEX;         // create a new range
15085              UNTIL NOT VINDEX IN INDEXLIST         // ensure unique range
15086    INDEXLIST.LASTINDEX := VINDEX;                  // save new or extended index as last index
15087    INDEXLIST.LASTINDEX.RUNLENGTH = 0;              // restart with new run length
15088
15089  // XOR ENCRYPT/DECRYPT BLOCKS/VALUES
15090  FUNCTION ENCRYPT_VALUE (VAR:VALUE, VAR:VINDEX);   // common encrypt/decrypt
15091    VINDEX := NEXT_INDEX(VINDEX);                   // use next hypercube index in virtual otp
15092    FOR VDIM IN OTP_DIMENSIONS DO                   // for each dimension
15093      VALUE := OTP[VDIM.VINDEX[VDIM]] XOR VALUE;    // mix with random number at the dimension's index
```

```
15094  FUNCTION ENCRYPT_TEXT(VAR:TEXT, VAR:VINDEX);
15095    FOR VALUE IN TEXT DO
15096      ENCRYPT_VALUE(VALUE,VINDEX);                                          // encrypt/decrypt block
15097
15098
15099  // ENCRYPT / DECRYPT MESSAGES ----------
15100  FUNCTION ENCRYPT_MSG(VAR:MSG, OUT:VINDEX):CIPHERTEXT;
15101    VINDEX         = INDEXLIST.LASTINDEX;                                   // get virtual index into hypercube location
15102    CIPHERTEXT.INDEX = PACK(VINDEX);                                        // cloak virtual index by packing using private dimension boundaries
15103    CIPHERTEXT.LEN   = LENGTH(MSG);                                         // with length of message pad msg if required
15104    CIPHERTEXT.TEXT  = ENCRYPT_TEXT(MSG,VINDEX);                            //
15105    CASE OPT_MODE
15106      ENHANCED : IF INDEXLIST.LASTINDEX.RUNLENGTH < RANDOM(OTP_ENCRYPTRANGE)  // exceeded run length in any one encrypt range
15107                 THEN INC(INDEXLIST.LASTINDEX.RUNLENGTH,LENGTH(MSG))        // increment run length counter
15108                 ELSE NEXT_RANGE;                                           // exceeded so use next or new range
15109
15110  FUNCTION DECRYPT_MSG(VAR:CIPHERTEXT):PLAINTEXT;
15111    PLAINTEXT = ENCRYPT_TEXT(CIPHERTEXT.TEXT, UNPACK(CIPHERTEXT.INDEX));    // unpack index using private dimension array and sizes
15112
15113  // CERTIFY / AUTHENTICATE USER TOKENS ----------
15114  FUNCTION CERTIFY(VAR:TOKEN) : TOKENTEXT;
15115    TOKENTEXT = ENCRYPT_MSG(TOKEN,INDEXLIST.LASTINDEX);                     // encrypt token
15116    CASE OPT_MODE
15117      ENHANCED : NEXT_RANGE;                                                // use a different encryption range (for encryption again)
15118                 MSG = ENCRYPT_MSG(TOKENTEXT, INDEXLIST.LASTINDEX);         // double encrypt and avoid reusing hypercube index positions
15119
15120  FUNCTION AUTHENTICATE(VAR:TOKENTEXT) : TOKEN;
15121    TOKEN = DECRYPT_MSG(TOKENTEXT);                                         // decrypt token
15122    CASE OPT_MODE
15123      ENHANCED : TOKEN = DECRYPT_MSG(TOKEN);                                // double decrypt to reveal original token
15124
15125  END PHASE TWO;
```

FIG. 15 Cont'd

SYSTEM AND METHOD FOR QUANTUM-SAFE AUTHENTICATION, ENCRYPTION, AND DECRYPTION OF INFORMATION

CROSS-REFERENCE TO RELATED APPLICATIONS

This application is a U.S. National Phase entry under 35 U.S.C. § 371 from PCT International Application No. PCT/GB2018/052872, filed Oct. 8, 2018, which claims the benefit of priority of U.S. Provisional Patent Application No. 62/569,041, filed on Oct. 6, 2017, both of which are incorporated herein by reference in their entirety.

FIELD OF THE INVENTION

The present invention relates to the field of cryptography. More specifically, the present invention relates to methods and systems for generating a private cryptographic key for use in a secure cryptogram for transmission between a first and second entity. Private keys generating in accordance with the herein disclosed methods, enable quantum-safe encryption to be achieved. The methods and systems disclosed herein can be applied in respect of any information that can be stored in digital format, including simple correspondence, financial data, sensitive biomedical data, or similar information. In accordance with aspects of the invention there are provided a method of generating a private cryptographic key, a system for generating a private cryptographic key, a computer program product, and a non-transitory computer readable data storage device.

BACKGROUND

Public Private Key Encryption can be described as a process of encrypting information between two parties by reversibly mixing data from two or more parties (referred to herein as a sender and a receiver) with other apparently random information. This produces an unintelligible ciphertext capable of transmission through a non-secure publicly visible communications medium, without being decodable by another unwanted party. A good encryption system will prevent any portion of the original information leaking out when attacked by cryptanalysts using mathematical or statistical analysis of the publicly available ciphertext or any publicly visible keys used in the ciphertext's decryption. This system will also allow rapid and computationally efficient decryption of the ciphertext when a secure private key is exchanged and combined with publicly visible keys to remove the apparently random information to reveal the original information.

Encryption techniques may be divided into two broad groups depending upon the frequency of exchange of private key information used to encrypt then decrypt information, such as plaintext, to ciphertext and back to the original plaintext. The strength of the encryption is determined by the method of producing the apparently random information used to hide the plaintext.

The first group of encryption techniques exchanges private key information just once, in the form of one-time-pads (OTPs) containing apparently random information. Encryption based on OTPs are also referred to as stream ciphers or Vernam ciphers (U.S. Pat. No. 1,310,719A). This type of encryption is considered unbreakable according to Shannon information theory (Shannon, C. "Communication Theory of Secrecy Systems": Bell Sys Tech J (1949) 28: 656-715) because only random noise is used for encryption, and no information is added. The OTPs are mutually agreed texts, such as passages from the published books, or text produced from unpredictable physical processes, such as rolling dice or quantum noise. Shannon's information theory shows we can use entropy as one measure of the quality of the OTP randomness, provided the random information is not a product of a deterministic process. The higher the entropy of the ciphertext the less information is revealed for analysis. Passages of written text in books are typically poor sources of random information exhibiting low entropy because they contain repeating predictable patterns and limited combinations of characters. Hence, by using frequency analysis of expected characters and patterns of texts, cryptanalysts may decode portions of the original plaintext or a small portion of the passage of the OTP written text. If the OTP text is a publicly known written text, this could potentially allow for the discovery of the source of the OTP text and the complete OTP and so subsequently all of the original plaintext.

Physical processes, such as radio frequency static noise are usually better sources of high entropy information to improve the quality of the OTP randomness. However physical processes can be subject to bias, for example a loaded dice will skew the random information favoring particular numbers, or in the case of radio frequency static, the noise may occasionally become predictable (for example, when a radar signal is beamed in a particular direction or perhaps a nearby cellular phone starts operating). The bias in a signal used to produce random information can also be measured by the entropy of the OTP. The best type of random information for OTPs is truly random, whose sources are True Random Number Generators (TRNGs). One group of TRNGs may derive randomness from one or more of many different and completely unpredictable quantum processes, such as radioactive decay, avalanche effect, shot noise or thermal noise or properties of photons. These are Quantum Random Number Generators (QRNGs). Encryption using pure QRNGs and quantum effects with well-constructed exchanges of references to private keys only is completely stochastic in nature, exhibiting the maximum entropy and reveals no discernible patterns rendering cryptanalysis impossible.

Recent developments in quantum computing have prompted the development of encryption methods that can withstand attacks from one or several quantum computers. Quantum computer safe encryption (QSE) requires a secure one-way function (SOWF) to exchange shared secrets/private keys and/or to encrypt plaintext/input information and decrypt cipher text. No amount of computational power applied to either the exchange of private keys or the encryption of plaintext/input information can decrypt the cipher text. QSE is completely immune from advances in quantum computers and does not contain Resistant One-Way Functions (ROWF) or Pseudo-Random Functions (PRFs) which introduce potential insecurities. Quantum computer resistant encryption (QRE) is an encryption scheme expected to resist decryption using quantum computers, exponentially more powerful than conventional computers. Resistance depends upon vulnerabilities within Resistant One-Way Functions (ROWF), protecting publicly exchanged encryption keys and/or within Pseudo-Random Functions (PRF) producing very long cyclical yet predictable random number sequences protecting plaintext/input information messages and other information formats. QRE uses Resistant One-Way Functions (ROWF) or Pseudo-Random Functions (PRF) so may never be completely safe.

Secure One-Way Functions (SOWF) or Resistant One-Way Functions (ROWF) are used to privately exchange information and/or encryption keys. Secure One-Way Functions (SOWF) are a physical property or function, requiring only one parameter/value, where no reverse function exists, such as entanglement within a quantum system or a private table of properties derived from a quantum effect or a QRNG. No amount of computational power with a SOWF is sufficient to create a reverse function; for example, Heisenberg's Uncertainty Principle shows it is impossible to compute random physical properties derived from quantum effects. For example, any attempt to create a reverse function for a photon's quantum properties through observation only destroys any SOWF result, making recovery of the original value impossible. SOWF functions are completely safe. By comparison, Resistant One-Way Functions (ROWF) are a computationally simple, mathematical function often requiring two or more parameters/values, whose reverse function produces one correct solution and an impractically large number of incorrect solutions to check and/or an impractically difficult, polynomial time computation. Knowledge of the ROWF's result alone, such as Google's Ring Learning With Errors, does not reveal the original key values. So in this case ROWF's require impractically large computational power to check all permutations of possible two key values to discover a valid result revealing an encryption key.

The Advanced Encryption Standard (AES) uses a ROWF function, previously thought to be highly resistant, which just simply multiplies two large prime numbers, whereas the AES reverse ROWF requires factoring the product of the two large primes; and considered impractical. AES is vulnerable to factoring with quantum computers using Shor's algorithm. Other ROWF's have been proposed yet the practicality of their use and future resistance remains uncertain. As computing advances, the development of the quantum computer and the associated rapid increase in quantum computer size, improvements in computer speed, and advances in mathematical theory increases the vulnerability of ROWF functions. ROWF functions being deterministic may never be completely safe.

Pseudo Random Functions (PRF) provide a long, disordered sequence of apparently random yet predictable numbers used to protect plaintext/input information and other types of information. PRFs are deterministic: by using a specific index into the sequence, called a key, the same random number is always returned. PRFs may be considered as a type of ROWF function since they are finite and cyclical, and will eventually repeat sequences of numbers. The PRF function is computationally simple, with a specific index and easily provides a short random number sequence, whereas the PRF's reverse ROWF function to find a short random number sequence in an extremely long sequence is an impractically difficult polynomial time computation. When some known, or even guessed, plaintext/input information is present within a portion of cipher text, a portion of the PRF's random sequence may more easily be discovered. This known plaintext attack is called a crib-drag. Searching within the very long predictable sequence for the discovered portion of random number is lengthy and difficult, however if found, provides an index and a possible encryption key. If the encryption key is revealed, all previous and subsequent cipher text can easily be decrypted until the key is changed. In the future, quantum computers and quantum search algorithms may be capable of rapidly checking entire portions of cyclical/predictable random number sequences, rendering the exchange of private encryption keys with ROWFs ineffective. PRF functions are a type ROWF functions which may never be completely safe. ROWFs are used in technologies like quantum resistant block chains and lattice algorithms which are thought to be invulnerable to attack by quantum computers but in actuality may also not be completely secure.

In contrast to the previously discussed encryption method in which keys are exchanged once, a second group of encryption methods also exists that involves the exchange of private keys over time; exchanging private keys, (rather than references to private keys), more than once. The private keys are computed from frequently exchanged public keys derived from a shared secret or certificate or alternatively and more recently keys derived from a quantum photon polarization called Quantum Key Distribution (QKD). QKD is a hybrid, using both Secure One-Way Functions (SOWF) to exchange encryption keys securely which then uses the encryption key with AES or other Pseudo-Random Functions (PRF), a type of Resistant One-Way Functions (ROWF), to encrypt plaintext/input information. QKD uses quantum effects, such as photon polarization, to transmit in secret an encryption key over a public medium. Photonic QKD's are of limited use as their speed of operation declines over relatively short distances, so to improve performance a Pseudo-Random Functions (PRF) takes the private encryption key as an index into a predictable deterministic sequence used to protect the plaintext messages/input information. If the PRF's, are rendered insecure by advances in quantum search algorithms then initial QKD private key exchanges may become irrelevant when they are no longer effective at protecting the cipher text from decryption. Consequently, QKD using Resistant One-Way Functions (ROWF) for plaintext encryption can never be considered completely safe.

Shared secrets and certificates produce public keys from a predictable one-way function, such as factoring very large prime numbers, where it is computationally easy to multiply two or more primes but very difficult to find the prime factors from one very large number. The security of these public keys to prevent the private keys being revealed is dependent upon mathematical and computational complexity and hence the practicality and timeliness of computing a reverse of the one-way function. Quantum photon polarization is inherently stochastic so cannot be predicted, however the reliability and frequency of key exchanges based on polarization degrades as a function of distance of fiber optic cables used, the furthest achieved being just over 400 km with practical private exchanges typically being around 30 to 100 km. QKD using photon polarization in directional line of sight laser or satellite communication is degraded by the accuracy of the optical systems, typically milliradians, and by atmospheric effects such as refraction and reflections from the likes of rain, water vapor, particulates and pollution. After exchanging keys, the private key is typically used to create a seed value for a Pseudo-Random Functions (PRF). The PRF produces an apparently random, though predetermined sequence of numbers without the limitation of degraded speed of QKD over longer distances, and is used to mix with the plaintext to create the ciphertext. Since the PRF algorithm is usually publicly known, any encryption using deterministic sequences requires the PRF algorithm have a very long period and the frequency of key exchanges high enough to prevent cryptanalysts from trying all possible combinations of PRF sequences by brute force.

Historically, both the single private key and the multiple private key exchanges have been used when communicating between sender and receiver; the first in the form of OTPs using random text sequences printed on flimsy soluble paper and the second in Enigma machines where the electrical rotors functioned as PRNG and the initial rotor positions acted as the seed. While the first group in the past using OTPs has often been more secure, the amount of information which could be encrypted was limited by the size of the OTP's single key exchange and the key exchange must be in private and in close proximity. Reuse of the same OTP introduces the possibility of cryptanalysis and drastically reduces the strength of any encryption. The second group is more commonly used; encryption algorithms such as DES/AES use frequent small key exchanges and have prevailed for large transfers of information or where it is not possible to exchange a large single private key or exchange keys in private. Both the current standard AES like Enigma, with its large number of rotor permutations, positions and sequences are susceptible to advances in modern computers, as are the resistant one-way functions used for the key exchange vulnerable to step progress in mathematical theory. For over 30 years, multiple key exchange encryption (starting with DES) has been improved by strengthening various parts of the algorithms and mathematics used in the public private key exchanges and improvements in the PRNG algorithms to exhibit greater entropy over longer periods. However, the underlying deterministic nature of the encryption techniques used by AES still remains essentially the same, leaving brute force decryption for now beyond the reach of existing conventional computer's speed and storage.

Recent advances in computer science have noted that it is theoretically possible for quantum computers to factorize large primes using Shor's Algorithm and possibly solve other resistant one-way functions far more quickly than conventional computers. Since these one-way functions are essential to the frequent exchange of private keys, quantum computers threaten to render the present encryption standards ineffective allowing the interception of private information on public networks. In an effort to counter the new vulnerabilities new algorithms such as lattice encryption and ring learning with errors have been proposed for private key exchange. However, since frequent private key exchanges still rely upon deterministic mathematical functions, the application of quantum computers and the step change nature of advances in mathematical theory require any future resistant one-way mathematical function to be selected with great caution and even so may still become susceptible to advances in quantum algorithms and mathematical theory.

Current methods of encryption are either impractical or not quantum-safe particularly with very large quantities of sensitive information crossing the public internet. Quantum computer safe encryption (QSE) requires a Secure One-Way Function (SOWF) to exchange private keys and/or to encrypt plaintext/input information and decrypt cipher text. No amount of computational power applied to either the exchange of private keys or the encryption of plaintext/input information can decrypt the QSE cipher text being exchanged between sender and receiver, or stored on the same device. QSE is completely immune from advances in quantum computers and does not contain Resistant One-Way Functions (ROWF) or Pseudo-Random Functions (PRF), (a form of ROWF), both of which introduce potential insecurities. Encryption such as AES uses deterministic private key exchanges and QKD uses stochastic private key exchanges. Both AES and normally QKD subsequently use deterministic algorithms in a PRNG to mix apparently random information with the private plaintext to encrypt or decrypt publicly secure ciphertext. Consequently, both the existing AES and the newer QKD rely on the frequency of key exchanges and the strength of their deterministic processes for the security of their encryption against attack by cryptanalysts. Consequently, both AES and QKD encryption methods remain in theory susceptible to cryptanalysis as they are or may become vulnerable to the novel use of quantum computers and algorithms.

OTPs can be based on random sequences produced by either deterministic or stochastic processes or both. Like AES and QKD's, deterministic OTPs are vulnerable to cryptanalysis (decipherment techniques). Stochastic OTP's however are not vulnerable to cryptanalysis, although the OTP's random sequence cannot be reused without becoming deterministic and so the random sequence is used at the same rate as the plaintext so the OTPs become impractical by being exhausted when used with very large volumes of information routinely transferred around the internet. Encryption based on OTPs are also referred to as stream ciphers or Vernam ciphers (U.S. Pat. No. 1,310,719A). This type of encryption is considered unbreakable according to Shannon information theory (Shannon, C. "Communication Theory of Secrecy Systems": Bell Sys Tech J (1949) 28: 656-715) because only random noise is used for encryption, and no information is added. OTPs have been used for communication networks (U.S. Pat. No. 9,590,951B2) and cloud storage (US Patent Application US20120134495). A method of using OTPs for authentication (where the authentication mechanism is a password) is outlined in US Patent Application US20100246811. The inventor of U.S. Pat. No. 9,590,951B2 noted that OTPs can be used for a form of post-quantum encryption, however there are several problems with this approach. First, this approach does not use truly random numbers or produces truly random results, making it vulnerable to cryptanalysis. Second, OTPs could be reused in this approach making them potentially breakable. For instance, approaches such as frequency analysis and natural language processing can be used to brute-force attack reused OTPs (Mason, J., et al. "A Natural Language Approach to Automated Cryptanalysis of Two-time Pads": Proc. of the 13th ACM conference on Computer and Communications Security (2006): 235-244). Third, the lifetime of the OTP is limited, meaning that data cannot be secured for prolonged time periods. Fourth, the size of communication is limited by the storage capacity available for the corresponding OTP. To avoid the OTP storage capacity issues, symmetric key encryption based on the generation of a large dynamic OTP with a fractal convolution function has been proposed (Rubesh Anand, P, Bajpai, G and Bhaskar, V: "Real-Time Symmetric Cryptography using Quaternion Julia Set": International Journal of Computer Science and Network Security (2009) Vol 9 No 3). However, this approach also does not use truly random numbers (timestamps) or produce truly random results (since a deterministic convolution function is used to expand the timestamps). The lack of randomness in the key and generated OTP is a significant issue as is the encryption which relies on a ROWF, leaving the Quatemion Julia Set OTP vulnerable to cryptanalysis. When implemented correctly, an OTP can be used to implement information-theoretic secure encryption, which means that security is ensured by the underlying information theory on which this method is based, rendering it unbreakable and securing information exchange between sender and receiver, or securing it on a single or multiple devices.

It is an object of the present invention to address at least some of the shortcomings of the prior art systems, and in particular to provide a secure and practical method of generating a private cryptographic key, that is resistant to an attack by a quantum computer, in other words, to provide a method of quantum safe cryptography.

The below is a list of acronyms that are used throughout the specific description.

Acronyms

CPU Central Processing Unit
DNA Deoxyribonucleic Acid
eOTP Entangled One-time-pad
FPGA Field Programmable Gate Array
FPLA Field Programmable Logic Array
HL7 Health Level 7
OTP One-time-pad
pOTP Physical One-time-pad
ppOTP Physical, Partitioned One-time-pad
QRNG Quantum Random Number Generator
RAM Random Access Memory
RNG Random Number Generator
TRNG True Random Number Generator
USB Universal Serial Bus
veOTP Virtual, Entangled One-time-pad
VLSI Very Large Scale Integration
vOTP Virtual One-time-pad
XML Extensible Markup Language
XOR Exclusive OR
xOTP Generic OTP
QKD Quantum-key distribution
PRF Pseudorandom functions
ROWF Resistant one-way function
PRNG Pseudorandom number generator
SOWF Secure one-way functions
AES Advanced encryption standard
3DES Triple data encryption algorithm

BRIEF SUMMARY OF INVENTION

In accordance with an aspect of the invention there is provided a method of generating a private cryptographic key for use in a secure cryptogram for transmission between a first entity and a second entity. The method may comprise: selecting a random vector defined in an n-dimensional vector space shared between the first entity and the second entity, the vector comprising one or more component coordinates defined in the n-dimensional vector space, each component coordinate being associated with one or more bits; determining the one or more bits associated with each component coordinate comprised in the random vector; and generating the private key in dependence on the one or more bits associated with each component coordinate comprised in the random vector.

In accordance with certain embodiments of the invention, the steps of selecting the random vector, determining the one or more bits, and generating the private key are carried out using a processor. In certain embodiments the method may comprise: transmitting information associated with the random vector to the second entity, the information associated with the random vector enabling the second entity to recover the private key from the shared n-dimensional vector space. The information associated with the random vector may comprise information indicative of the one or more component coordinates associated with the random vector. In this way, the second entity is able to determine the private key, by using the information associated with the random vector received from the first entity, in combination with knowledge of the shared n-dimensional vector space.

The method may comprise: generating the cryptogram in dependence on the private key; and transmitting the cryptogram to the second entity, the cryptogram comprising confidential information recoverable by the second entity in dependence on the recovered private key.

In accordance with certain embodiments the method may comprise: compressing the confidential information with a lossless compression algorithm; combining the compressed confidential information with random data; generating the cryptogram by encrypting the compressed confidential information combined with the random data; and wherein the cryptogram comprises information enabling the confidential information to be distinguished from the random data. For example, in certain embodiments it is envisaged that the information enabling the confidential information to be distinguished from the random data, may comprise information associated with the portions of the n-dimensional vector space that may be associated with the confidential information. In this regard it is important to note that any binary string may be represented in the n-dimensional vector space, and so accordingly, it is possible to represent the confidential information with reference to coordinate values in the n-dimensional vector space. The use of compression helps to improve the confidentiality of the confidential information.

In certain embodiments, the random data is compressed with a lossy compression algorithm; and the cryptogram may be generated by encrypting the compressed confidential information combined with the compressed random data. Compressing both the confidential information and the random data further improves the security of the present method. In accordance with certain embodiments the method may comprise the steps of: generating a first nonce; encrypting the first nonce using the generated private key; forwarding the encrypted first nonce from the first entity to the second entity; receiving a response message from the second entity comprising a second nonce; determining if the first nonce and the second nonce are correlated; and authenticating the second entity in dependence on the first nonce and the second nonce being correlated. This provides a convenient means of conducting bilateral authentication, with the objective of confirming to the first entity that the second entity comprises the correct private key, and therefore is in possession of the shared n-dimensional vector space.

The method may also comprise the steps of: generating a third nonce; encrypting the third nonce using the generated private key; forwarding the encrypted third nonce from the second entity to the first entity; receiving a response message from the first entity comprising a fourth nonce; determining if the third nonce and the fourth nonce are correlated; and authenticating the first entity in dependence on the third nonce and the fourth nonce being correlated. In this way it is possible to conduct mutual authentication in which both parties are authenticated.

In accordance with certain embodiments, the method may comprise: generating the random vector using a mathematical function, the mathematical function comprising a pseudo-random number generator configured to generate random component coordinates defining the random vector. The use of a random number generator to generate the component coordinates improves the security of the system, by making it more difficult for a hacker to predict the random vector. The pseudo-random number generator may be seeded with a value from a source of random numbers.

Similarly, in certain embodiment a random number generator may be used in place of a pseudo-random number generator.

In certain embodiments the random vector may be generated using a quantum key distribution protocol executed between the first and second entities, the quantum key distribution protocol being configured to generate a random sequence of numbers, and associating the random sequence of numbers with component coordinates defining the random vector.

In certain embodiments the method may comprise: generating the shared n-dimensional vector space prior to selecting the random vector. Generating the shared n-dimensional vector space may comprise the steps of: generating a random binary string; and projecting the binary string into the n-dimensional vector space using a projection function, the projection function mapping the binary string to the n-dimensional vector space. The binary string may comprise a linear array of bits, and the projection function may be configured to map the linear array of bits to an n-dimensional array of bits comprised in the n-dimensional vector space. The projection of the binary string into n-dimensional vector space significantly increases the security of the method by increasing the state space within which the random vector may be defined. In certain embodiments the n-dimensional vector space may be further projected into an even larger vector space. In certain embodiments the n-dimensional vector space may be unbound, which effectively means there are an infinite number of different vectors that may be defined in the space and used for defining the private key.

In accordance with certain embodiments the n-dimensional vector space may comprise any one of: one or more fractal dimensions; and one or more nested complex dimensions.

In accordance with certain embodiments the projection function may be a state-dependent one-way function. Mathematically this means that it is not possible to calculate the binary string from knowledge of the projection function, since its inverse does not exist. Again, this improves the security of the system, and reduces the risk of a hacker gaining any knowledge of the binary string.

The step of generating the random binary string may comprise: the first entity generating a first random binary string; the second entity generating a second random binary string; and combining portions of the first and second binary strings to generate the binary string. This process is referred to a entanglement throughout the present description.

In certain embodiments the portions of the first and second binary strings may be randomly combined. Similarly, the portions of the first and second binary strings may be combined in accordance with one or more of: a mixing function; a merging function; a substitute function; an exchange function; a shuffle function; and a riffle shuffle function. In yet further embodiments the first and second binary strings may be combined using an exclusive OR operator "XOR".

In accordance with embodiments of the invention the shared n-dimensional vector space may be generated in a secure environment. This may occur during an initial configuration step between the first and second entities, and ensures that both the first and second entity share the n-dimensional vector space, without the risk of its confidentiality being compromised.

In certain embodiments the method may comprise: dividing the binary string into a plurality of discrete sub-sections, each sub-section comprising a plurality of bits; associating an index to each sub-section. The step of projecting the binary string into the n-dimensional vector space may comprise: mapping the indices associated with at least some of the sub-sections, to different coordinate values in the n-dimensional vector space. The step of determining the one or more bits associated with each component coordinate comprised in the random vector may comprise: identifying the index associated with each component coordinate and determining the plurality of bits associated with each component coordinate in dependence on the identified index.

In certain embodiments each discrete sub-section may comprise a nibble.

In accordance with certain embodiments, the method may comprise: generating a random sequence of indices using a random number generator; and selecting the random vector by identifying the component coordinate associated with each index in the sequence of randomly generated indices. The use of a random number generator, which may relate to a quantum random number generator, to generate the random vector helps to ensure that the vector is truly random, further improving the security of the present method.

In accordance with certain embodiments the method may comprise: partitioning the random binary string into two or more separate partitions; and projecting at least a portion of the separate partitions into the n-dimensional vector space using the projection function. For example, the random binary string may be partitioned into a plurality of partitions of equal length. Similarly, the random binary string may be partitioned into a random number of partitions, each partition having a random length. In certain embodiments the number of partitions may be proportional to the number of dimensions of the vector space.

The method may comprise: generating the private key by combining the one or more bits associated with each component coordinate comprised in the random vector. Similarly, the method may comprise: generating the private key by combining the one or more bits associated with adjacent component coordinates comprised in the random vector.

In yet further embodiments, the one or more bits associated with each component coordinate comprised in the random vector are combined in accordance with a logical operator. For example, an exclusive OR operator "XOR".

In accordance with certain embodiments the private key may be a one-time key, and the method may comprise: generating a new private key for each new cryptogram required for transmission between the first entity and the second entity.

In accordance with a further aspect of the invention, there is provided a system for generating a private cryptographic key for use in a secure cryptogram for transmission between a first device and a second device. The system may comprise a processor configured to: select a random vector defined in an n-dimensional vector space shared between the first device and the second device, the vector comprising one or more component coordinates defined in the n-dimensional vector space, each component coordinate being associated with one or more bits; determine the one or more bits associated with each component coordinate comprised in the random vector; and generate the private key in dependence on the one or more bits associated with each component coordinate comprised in the random vector. This aspect of the invention and its embodiments benefit from the same advantages as the previously described aspect. In certain embodiments the first and second devices may relate to electronic devices.

In accordance with certain embodiments the system may comprise: an output configured to output information associated with the random vector to the second device, the information associated with the random vector enabling the second device to recover the private key from the shared n-dimensional vector space. The output may be configured to output information indicative of the one or more component coordinates associated with the random vector.

The processor may be configured to: generate the cryptogram in dependence on the private key. The output may be configured to: output the cryptogram to the second device, the cryptogram comprising confidential information recoverable by the second device in dependence on the recovered private key.

In certain embodiments the processor may be configured to: compress the confidential information in accordance with a lossless compression algorithm; combine the compressed confidential information with random data; generate the cryptogram by encrypting the compressed confidential information combined with the random data; and wherein the processor is configured to include information enabling the confidential information to be distinguished from the random data in the cryptogram. Similarly, the processor may be further configured to: compress the random data in accordance with a lossy compression algorithm; and generate the cryptogram by encrypting the compressed confidential information combined with the compressed random data.

In accordance with certain embodiments the system may comprise a random number generator and an input. The random number generator may be configured to generate a first nonce. The processor may be configured to encrypt the first nonce using the generated private key. The output may be configured to output the encrypted first nonce from the first device to the second device. The input may be configured to receive a response message from the second device comprising a second nonce; and wherein the processor may be configured to determine if the first nonce and the second nonce are correlated and to authenticate the second device in dependence on the first nonce and the second nonce being correlated.

The system may comprise a pseudo-random number generator configured to generate the random vector by generating random component coordinates defining the random vector. Similarly, the system may comprise a random number generator configured to generate a random binary string; and the processor may be configured to generate the shared n-dimensional vector space prior to selecting the random vector, by projecting the binary string into the n-dimensional vector space using a projection function, the projection function mapping the binary string to the n-dimensional vector space. The binary string may comprise a linear array of bits, and the processor may be configured to use a projection function configured to map the linear array of bits to an n-dimensional array of bits comprised in the n-dimensional vector space.

The processor may be configured to use the projection function to map the binary string to an n-dimensional vector space comprising any one of: one or more fractal dimensions; and one or more nested complex dimensions.

The processor may be configured to use a state-dependent one-way projection function.

The random number generator may be configured to generate a first random binary string, and combine portions of the first random binary string with portions of a second random binary string received from the second entity. The random number generator may be arranged to randomly combine the portions of the first and second random binary strings. The random number generator may be arranged to combine the portions in accordance with one or more of: a mixing function; a merging function; a substitute function; an exchange function; a shuffle function; and a riffle shuffle function. The random number generator may be arranged to combine portions of the first and second random binary strings using an exclusive OR operator "XOR".

In certain embodiments, the system may comprise a secure environment, and the processor may be configured to generate the shared n-dimensional vector space in the secure environment. The secure environment provides a means to ensure that the vector space may be generated without risk of eavesdropping. The secure environment may comprise any one or more of: a Faraday cage; a Virtual Private Network (VPN); a secure fibre optic communications channel; and a secure quantum communications channel for establishing a quantum key.

In accordance with certain embodiments the processor may be configured to: divide the binary string into a plurality of discrete sub-sections, each sub-section comprising a plurality of bits; associate an index to each sub-section; mapping the indices associated with at least some of the sub-sections, to different coordinate values in the n-dimensional vector space; and identify the index associated with each component coordinate and determine the plurality of bits associated with each component coordinate in dependence on the identified index.

The processor may be configured to divide the binary string into the plurality of discrete sub-sections, each sub-section comprising a nibble.

In certain embodiments the random number generator may be configured to generate a random sequence of indices; and the processor may be configured to select the random vector by identifying the component coordinate associated with each index in the sequence of randomly generated indices.

The processor may be configured to partition the random binary string into two or more separate partitions, and project at least a portion of the separate partitions into the n-dimensional vector space using the projection function.

The processor may be configured to partition the random binary string into a plurality of partitions of equal length. The processor may be configured to partition the random binary string into a random number of partitions, each partition having a random length.

The processor may be configured to generate the private key by combining the one or more bits associated with each component coordinate comprised in the random vector.

The processor may be configured to generate the private key by combining the one or more bits associated with adjacent component coordinates comprised in the random vector.

In certain embodiments the processor may be configured to combine the one or more bits associated with each component coordinate in accordance with a logical operator. The logical operator may be an exclusive OR operator "XOR".

In accordance with certain embodiments the private key may be a one-time key, and the processor may be configured to generate a new one-time key for each new cryptogram required for transmission between the first and second devices.

In accordance with certain embodiments, the first and second devices may relate to any electrical device, comprising a mobile device; and a personal computing device, such as a personal computer.

In accordance with yet a further aspect of the invention, there is provided a computer program product, comprising instructions for carrying out the previously described method.

In accordance with yet a further aspect of the invention, there is provided a non-transitory computer readable data storage device, having stored thereon instructions for carrying out the previously described method.

In accordance with a further aspect of the invention, there is provided a mobile device configured to carry out the previously described method.

Many modern encryption standards use deterministic processes to produce and exchange many small private keys which could be deciphered using modern computers, quantum computers, or using modern algorithms. Alternatively, modern encryption can use a stochastic process to produce a large private key, physically exchanged only once before use where the amount of use is closely related to and limited by the size of the private key. A provably impenetrable and indefinitely QSE method may not use predictable/deterministic processes to hide plaintext or produce private keys without introducing the possibility of decipherment or breaking the encryption. To prevent any possibility of decipherment, irrespective of advances in computational speed or algorithmic methods, all encryption must only use truly random/stochastic processes to produce a private key which is exchanged only once in private before one public use where the private key is sufficiently large to encrypt any practical volume of plaintext with minimal computational power. This approach addresses the issues that prevent a conventional OTP encryption approach from being truly unbreakable by quantum computers discussed above (i.e. the lack of truly random numbers, limited lifetime of encrypted data, etc.).

Embodiments of the present invention provide selective reuse and recombination of true random numbers in an OTP. The perfect security of an OTP is well described. Encryption using an OTP with elements filled with true random numbers is information theoretic secure since for any plaintext input or compressed data (which should be lossless), all possible ciphertext outputs are equiprobable leaving frequency analysis by cryptanalysts futile. Likewise, the vulnerability of a two-time pad is also well known. Reuse of the same OTP by combining two or more ciphertext using the same random numbers from the same indexes into the OTP, called a collision, reveals the underlying combined plaintext/input information which is subject to attack by a form of frequency analysis called a 'crib drag'. This novel type of OTP can be used to encrypt raw data, or more ideally compressed data (which should ideally be lossless).

In the case of existing prior art ciphers based on existing OTPs, reuse of the same random numbers in predictable sequence by an index walk through and wrapping around from the end to the beginning of the pad, provides the desired opportunity to remove the random numbers in the pad from the ciphertext and allows for practical crib drag attacks by cryptanalysts. While both two-time and many-time pads may be subject to crib drags/frequency analysis by cryptanalysts, to be possible, this requires: (1) firstly, collisions of two or more cipher texts must occur using the same random numbers, (2) secondly, collisions must be close or contiguous in time and space to be detectable, (3) thirdly, collisions must capable of being detected or guessed by frequency analysis, (4) fourthly, indexes to the random number sequence space must be identifiable, (5) fifthly, collision must occur frequently within a practical timescale, (6) finally, if infrequent ciphertexts must be stored/searched to reveal collisions.

Aspects of the invention rely upon some aspects and assumptions in use of a multi-time pad not being well considered nor studied. Security against crib drags/frequency analysis is provided by the various different aspects and embodiments of the invention, since none of the aspects and embodiments of the invention satisfies all six prerequisite conditions, such that no physical embodiment of a crib drag attack is possible either in a spatial or temporal domain (a full discussion of this is contained in the Appendix). The frequent reuse through combinations/mixing/merging of many OTP elements to create a new enormous, complex space (a complex space is defined as any set or universe with added structure, examples of which include linear spaces, topological spaces, Euclidean spaces, probability spaces, Hilbert spaces, metric spaces, networks, trees, maps, hyperdimensional spaces, hypercubes, Markov chains, combinations of these spaces (such as a 5-dimensional space nested within a 9-dimensional space), and other possible spaces) full of new elements derived/extracted from combinations of the physical OTP random numbers is so large it cannot all physically exist at the same time. The complex space being unphysically large, cannot be stored in any medium, and can only be treated as a virtual complex space and portions of the space constructed dynamically on demand using an index into the complex space to retrieve elements.

Reuse of the same combination of OTP elements within the complex space is the same as collisions of the complex space indexes. To ensure an even use/distribution across the entire complex space by the indexes, indexes are generated dynamically using a true random number generator, called 'nonces', processed by a randomness extractor (which consists of unbiasing algorithms and compression, which can be lossless or lossy), and subsequent accesses uniformly spread without repetition across the entire complex space using a linear feedback shift register with coefficients chosen randomly in private (or one of many other deterministic processes such as predictable pseudo random functions). Any complex space index collisions become equiprobable, and this is illustrated in the Appendix, along with the probability of collision using a crib drag.

Redundant (repeating or predictable) information present patterns which assist the cryptanalysts and aid frequency analysis. Randomness extractors remove redundant information converting any information into shorter sequences with higher entropy. Randomness extraction can be performed at each step, on the random numbers, (generated, stored and used), on the OTP (when mixing/merging elements), on the complex space (indexes and nonces), and on the plaintext/input information (before mixing/merging with random numbers). Compression can be performed as part of the randomness extraction process, where compression can be either lossy or lossless. A random walk within an OTP also avoids repeating or predictable patterns and is a process in which a path is followed through a complex space from one position to another at random, where information at each of those locations in the complex space is XORed (or another similar operator can be used) with the previous piece of information in the walk, to produce a final result at the end of the walk. This final result of subsequent XORing (or another operator can be used) is then used for cryptographic purposes, such as encrypting and decrypting data, and the properties of each walk include being equiprobably distributed throughout the unphysically large complex space (so collisions, particularly repeated collisions between random walks having repeated use of same complex space indexes is vanishingly rarely).

Aspects and embodiments of the present invention prevent the fulfillment of the pre-requisites for successful crib drags since; (1) firstly, the use of random numbers by the ciphertexts is always dwarfed by the number of elements contained in the complex space (factorially larger than the original OTP, so collisions of indexes into the complex space are vanishingly rare, (2) secondly, the plaintext/input information is mixed with a discontiguous sequence of mixed/merged random numbers selected equiprobably (with a linear feedback shift register) across the entire complex space, collisions cannot occur in clusters, so the period between collisions is always vanishingly rare, (being the number of permutations of ciphertexts recorded compared to the number of permutations in the complex space), (3) thirdly, the potential symbols contained in plaintext/input information used for frequency analysis are changed into an equiprobable range of symbols after randomness extraction (which can include lossless compression) and increase the entropy of plaintext/input information and ciphertext information (rendering frequency analysis less effective), (4) fourthly, the indexes into the complex space are nonces, true random numbers give no clue to the content or internal structure of the complex space, the composition (reuse and recombination) of true random numbers in an OTP remain hidden (preventing the discovery of an element in the original OTP), (5) fifthly, in practice a gigabyte OTP of a billion or more elements can be used to construct complex space thousands of orders of magnitude larger than the original plaintext/input information (which can be compressed in an ideally lossless fashion), so the collision frequency of indexes into the complex space asymptotically approaches though never quite reaches the Shannon Limit so is vanishingly rare, in practice collisions may never actually occur, like a perfect OTP without collisions achieves unbreakable information theoretic security, (6) finally, frequency analysis of ciphertext across the complex space of a multi-time pad, either using a series of independent random walks (with vanishingly small or non-existent probability of collision) or a single exhaustive walk (without a collision being possible) through the entire complex space, still require ciphertexts between collisions are stored, so combinations can be checked for collision, however, this is infeasible as the storage capacity and search time requirements for any crib drags are forced into an unphysically large complex space where crib drags can never in practice be realized, resulting in an unbreakable "information unphysical security". A discussion of the probability of crib drags being performed successfully is discussed in the Appendix.

Neither conventional nor quantum computers can predict quantum random numbers in the multi-pad or indexes/nonces, address the vanishingly rare or non-existent index collision frequency, the unphysical ciphertext storage capacity demands nor can any exponential speed improvements with quantum computers outpace the factorial nature of searching for cribs in a complex space.

Disclosed herein are techniques for implementing an impenetrable, inherently quantum-safe, fully stochastic encryption method (sometimes referred to herein as quantum-safe encryption ("QSE"). The method may comprise up to eight steps that can be implemented in hardware, software, or in various combinations of hardware and software, including (1) the identification of OTP data to be exchanged between multiple devices (which can be real, physical devices or virtual devices) or stored on a given device, (2) partitioning data into segments for creating a partitioned OTP, (3) the creation of a virtual OTP by projecting OTP data into a virtualized complex space (a process in which random information corresponding to the original OTP data is generated and assigned to a hyper-dimensional/complex coordinate system, which expands the size of the data involved in the encryption/decryption process and is a ROWF), (4) entangling the OTP data from one or more devices (entangling involves mixing/merging the data from one or more devices), (5) physical separation of the devices (when more than one device is being used), (6) encryption and decryption of information using OTP data, and when required, (7) authentication (a process in which the connection between multiple devices is verified) and (8) certification (a process in which the communication between multiple devices is registered as valid).

In accordance with an embodiment, the most basic implementation of the method comprises the creation of a physical OTP, entangling the OTP, optionally partitioning the physical OTP (pOTP), and then virtualizing the pOTP. This virtualized OTP (vOTP) can then be used as a key to encrypt and decrypt plaintext information. For example, in accordance with an embodiment of the present invention may comprise encrypting data on a single device, and OTP data identification, OTP creation and virtualization, and using the generated vOTP for encryption/decryption of confidential information. A more complicated embodiment may involve secure communication between multiple devices, and could involve the OTP data identification, virtualization, entanglement, separation, and encryption/decryption, as well as authentication and certification steps. In certain embodiments, the OTP may be generated using a true random number generator (making them a SOWF), rather than less optimal software/hardware based pseudo-random data generators (ROWF). The creation of OTP data using random number data ideally from a TRNG/QRNG, together with procedures such as partitioning, entanglement, and virtualization, and can be used to form new cryptographic primitives such as hashing functions. These can be used to create new, quantum-safe cryptographic ledgers (such as blockchains) and similar technologies.

Disclosed herein are several use cases, including the encryption/decryption of data (which can be anything stored in a digital format) on a single device for personal use, the encryption/decryption of data for transmission between multiple physical/virtual devices, and other similar applications. Each application requires at a minimum the creation of a physical OTP, and the creation of a virtualized OTP. Optionally, embodiments may comprise one or more additional operations (partitioning, entanglement, separation, authentication, certification, etc.) to add additional security to the encryption/decryption process.

A shared secret/private key is used, which is an OTP with a capacity usually designed to continuously encrypt/decrypt information, that will remain safely encrypted indefinitely, for a period of time several orders of magnitude greater than the expected life of the text to be hidden or the device embodying the technique. The encryption technique requires an OTP, ideally with true random information, to be shared and massive beyond the practical storage size of any foreseeable memory device. Since the OTP's true random information is generated using a quantum effect or similar phenomenon to produce the random sequence with maximum entropy, this truly random information is incompressible according to Shannon's Law. Consequently, we cannot compress an extremely large OTP down to a manageable size. Instead, the invention creates a "virtual" OTP in an astronomically sized combinatorial complex space using projection function(s) to expand a smaller OTP. This process of expansion through virtualization increases the number of random possibilities for encrypting the data. During the initial process of creating an OTP and a virtual OTP, the QRNG is used to create random data for the OTP, as well as coordinates in complex space, and information for paths/walks through the complex space. The virtualization process is random and remains private. It is important to note the expansion of a smaller OTP through a projection function does not mean the original data is a compressed form of the expanded OTP. Instead, the expanded OTP produced by the private and random projection function is completely random and is not compressible without disclosure of the private projection function so the Kolmogorov complexity (Kolmogorov, A. On Tables of Random Numbers" Sankhya Ser. A. (1963) 25: 369-375) of the expanded OTP remain equal to the length of the expanded OTP.

Since mixing (performing certain mathematical operations, or combination of operations) and/or merging two or more random numbers will produce another random number, portions of the initially generated OTP populated with random data, otherwise known as a "physical OTP", can be used multiple times without the threat of reusing data. Each use of a number from a different portion of the physical OTP may be treated as an index in one dimension of a multidimensional space, or complex space. Combinatorically, the number of different combinations produced when combining the different random numbers from each dimension rapidly creates a new and extremely large series of virtual random numbers. To avoid a crib-drag attack, it is important to avoid reusing any combination of indices, since this collision will reuse parts of the OTP data, and could allow a cryptanalyst after frequency analysis to determine part of the original OTP. To prevent any predictable behavior or reuse of the same combinations when encrypting, the technique uses a stochastic quantum effect to produce a true random number to select an arbitrary sized block of indexes into each dimension. If the block has already been used before, then the next closest unused adjacent block is used. After a contiguous series of indexes are used to encrypt a series of plaintext, the block is marked as used and if possible coalesced with any other used neighbors to prevent reuse which prevents the introduction of a vulnerability through reuse and the possibility of deterministic behavior. The series of indexes used need not be linear nor contiguous, (using the next adjacent index into the complex space) but may by preference be discontinuous so that more than one, if not all indexes, are changed for each access into the complex space. In addition, the subsequent discontinuous sequence of indexes, which follows remains private so the product of the combinations of random numbers used also remain private. The algorithm for the private discontinuous sequence may preferably be a long cycle PRF, where both seeds and polynomial terms are exchanged by reference either to a RNG (ideally a TRNG/QRNG) or the randomly selected portion of the OTP, physical or virtual. The PRF function is deterministic and dynamic, however the PRF function and seed values remain private. In optional versions, the number of dimensions may also be varied and/or resized and/or some skipped, being selected at random or by reference to a new portion of the OTP on each private exchange of information. In optional versions, the individual index into each dimension may be translated using another discontinuous sequence, as before preferably a long cycle PRF configured, seeded and selected at random. Access into a sequence within each dimension may optionally use a fractal function, such as a Hilbert Curve. Access across all dimensions used may also use a multi-dimensional fractal function. All the versions used to virtualize and access the complex space may be used in any combination or order and possibly recursively.

The invention provides inherently quantum-safe authentication with each message successfully decrypted. The encryption and decryption are checked against a cyclical polynomial checksum to ensure the contents of the plaintext have been successfully transferred. Explicit authentication may be achieved with a probe/challenge message by either sending a nonce, some true random information from an internal RNG (ideally a TRNG/QRNG), or using true random information from a stored sample in the virtual OTP of any partner (which used ideally a TRNG/QRNG to produce its random information). Preferably, bidirectional authentication may use ideally true random information from the internal TRNG/QRNG to reduce the consumption of the OTP, and unidirectional authentication may use a stored portion of information from the virtual OTP. The authentication may optionally contain a timestamp and period of validity. Using this approach, each probe/challenge message appears to be different when encrypted.

A probe/challenge message serves two main functions: first, the received probe message challenges a partner to check and accept communication from another device, and/or return the probe to the sending device, a sample piece of unchanged information. This is achieved by sending an encrypted message containing true random information to be decrypted and then re-encrypted and then returned. Since the same portion of the virtual OTP may never be reused, a valid decryption of the returned message with the original true random information is derived from a unique part of the partner's virtual OTP. The authentication process will fail if a device returns an unchanged probe message without first decrypting and encrypting again. This is considered a failure because it violates the requirement for a nonce, a unique unused index into the virtual OTP.

In one aspect, a computer-implemented method and system (which may be implemented in hardware or in executable instructions stored on a non-transitory storage medium) involves an encryption/decryption process that is done in two phases: private and public. The private phase consists of customizing the initial encryption algorithm, which involves the creation of a set of one or more random parameters, modified or selected by deterministic means for determining the method of encryption and decryption. Then, for encryption/decryption to take place, there is the compilation or use/reuse of one or more different algorithms modified and/or selected by deterministic means. Random data is generated to create an OTP which is made to correspond with information that is going to be encrypted. The information to be encrypted is then shared/mixed with information from one or more OTPs from the same or different electronic devices; an OTP can also be mixed with parts of itself. A preliminary data processing step, wherein source information (which can include metadata) is acquired and processed is performed to create the OTP. During all of the processes that involve the selection of random parameters or random information, or the generation of random data, true random number or quantum random number generators are preferably used. Less ideally, pseudo-random number generators could be used in part or fully to replace the random number generators, but this makes the resulting encryption less secure.

Before the creation of an OTP can begin, data needs to be processed using a variety of methods (such as parsing)

which results in extracted units of information (such as bits, nibbles, bytes, character, etc.); the process can include a method for parsing text-based information, extraction of bit information from images, video, and/or audio, or similar process for other data formats After the information has been parsed, the OTP is calculated for each unit of information, which consists of random information (such as character, bits, or other pieces of information) that correspond to each unit of information in the original, parsed dataset; the truly random number data is calculated from computer processors which contain true/quantum random number generators, or QRNGs (such as the Intel v5 processor or similar ARM processors which use a bulk quantum effect based entropy generator or similar method) or higher computer processors, which use the heat generated by the CPU to generate random values. This approach can be considered a secure one-way function (SOWF) in contrast to resistant one-way functions (ROWFs) or pseudo-random functions (PRFs) which are inherently vulnerable to cryptanalysis. Next, a collection of one or more different types of OTPs (generically referred to as xOTPs), containing random data which is created using a source of random information, to be partitioned, projected, and/or entangled, are created using the parsed data. Additionally, a partitioning step splits data into segments, and then the corresponding OTP information is created for these segments.

The public phase involves the creation of references to different algorithms, parameters, and OTPs to prevent disclosure of the initial private information that is being processed. These initial, randomly varied, predetermined algorithms and/or parameters are referenced only by communicating via indirect references/indexes. The process of encrypting/decrypting information involves the indirect reference to the shared/mixed OTP, which occurs optionally by means of the varied predetermined algorithms and parameters also by indirect reference. Optionally, the process of encryption/decryption, or communication, can occur by indirect reference into shared OTP data using (ideally) truly random data. As well, the process of encryption/decryption can use one or more indirect references to combine/mix OTP data to create a larger expanded/virtualized OTP.

To create the OTP, a source of random numbers or a collection derived therefrom, such as pseudo random number generators, true random number generators or quantum random number generators, alone or mixed in any combination for all or part of the time is used. As well, the OTP will be used in conjunction with source data which can consist of information derived from an entanglement process. Entanglement involves the reproducible merging of information from one or more sources (such as separate devices). For instance, two devices might have OTP data on each device, which could be entangled by merging (such as shuffling, riffling or concatenating the information together), or mixing (such as performing a logical bit operation such as XOR between the two information sets to produce another piece of information) or both. Or, OTP data can be shuffled between the different OTPs. The initial entanglement steps of mixing and/or merging and the sequence they are used are chosen at random and remain private, and later the entanglement sequence and parameters dynamically altered at random by indirect reference. The OTP created will be long enough to be used with this entangled information, such that a resulting information set of memory length n will have an OTP of at least length n. The OTP (to be preferably privately shared) is formed from a collection of information derived from any source of random data. An operation called virtualization will expand the OTP into a larger, virtualized OTP by mixing/merging one or more random data in a collection. Additionally, an OTP index operation called an "access function" is used to retrieve information from within the virtualized OTP. The access function uses the locations of any one or more combinations of the random data, in the collection to be mixed as indices into the dynamically computed portion or all of the virtualized OTP. The mixing function (also referred to as a transposition or substitution function) involves any function which can create a new random piece of information, such as data, derived as a product of combinations of data, used recursively where appropriate. Examples of mixing functions include (i) logical exclusive-or, (ii) add, (iii) multiply, (iv) polynomial cyclical redundancy checksum/logical feedback shift register, (v) hashing functions, (vi) any in function with general form $x=f_{max}(a,b)$. In addition to this mixing function, an optional function which ensures that any combination of locations in the collection or random data is used only once may be used, and an optional function which randomly varies constants used by the mixing functions, such as in polynomial terms or hash terms.

The mixing process may include the use of a collection of one or more index selection functions where the indices access random data contained within an OTP and that data is combined by mixing to create a larger virtualized OTP. The index selection functions create a sequence for the larger virtualized OTP dependent upon either an initial value(s) and/or subsequent values, where initial value(s) may be provided by any source, possibly recursively, preferably also random data from a private source of random data such as an OTP, and the subsequent values provided from previous state or product of the previous state. Index selection functions capable of creating a sequence of indexes to access an OTP for the selection of two or more indexes into any type of new or existing OTP(s) or part of OTP(s), including: (i) Any mixing function as mentioned above, (ii) any function with general form newselection=$f_{new}$(lastselection), such as: a pseudo random number generator, a increment/decrement function, a Fibonacci series function, a fractal function, a composite index selection function, any other similar function. The selection process may include the use of one or more index selection functions to form another composite index selection function, any of which may be used once or repeatedly at any time, in any order and any combination. Additionally, an optional function to vary the data indices and the range of sizes of each index can be used, as well as an optional function to use one or more index selection functions chosen at random. An additional optional function to recursively use one or more index selection functions chosen at random may also be used.

Then a virtualization function takes any OTP type, like a standard, physical OTP (pOTP), physical partitioned OTP (ppOTP), or other OTP using different possible virtualization methods to create a longer vOTP (or possibly a virtual entangled OTP (veOTP), which herein is referred to more generically as vOTP), or another OTP (which can include any OTP, referred to generically as a xOTP). In the virtualization function, xOTP data is projected into a complex space (such as a hyper-dimensional space with irregular numbers of dimensions, or other spaces), as well as random paths through the multidimensional data, stored in a set of vectors/walks encoding dimensional coordinates are then calculated. The vOTP can be derived using one of several possible methods, including (a) a 1:1 mapping between physical OTP (pOTP), or other xOTP, and a vOTP; (b) a vOTP derived from a partitioned xOTP projected into a complex hyper-dimensional space; (c) a vOTP derived from a partitioned OTP (pxOTP); (d) another source of information can be used to derive the vOTP; (e) the creation of a vector set of paths/walks used for the encryption/decryption process, or a simple vOTP is created by simply copying the pxOTP into memory.

A vOTP is created by "projecting" OTP data on to an n-dimensional complex vector space. In certain embodiments n may designate 1 dimension (a vector), 2 dimensions (a plane), 3 dimensions (cube), 4 dimensions (hypercube), or more dimensions. The n-dimensional complex vector space may contain any one of a simple integer set of dimensions (e.g. 4-dimensions); complex spaces within a given complex space (e.g. a 4-dimensional space which contains two smaller 8 dimensional spaces); fractal dimensions; a vector space; a network/graph representation, and other types of spaces, models, or representations for virtualization. OTP data may be stored in the n-dimensional space after being partitioned into m partitions, where each partition may optionally correspond to one or more separate dimensions, using mapping systems or more complex algorithms. In this way it is possible to associate partitioned OTP data with a particular virtualized complex space, accounting for the data and type of dimensions.

The creation of a vOTP can be described with the following mathematical steps. First, OTP information is parsed (i.e. partitioned) into discrete units, and these elements of information are illustrated in equation 1.1:

$$OTP=\{o_{1p1}, o_{2p1}, o_{1p1}, \ldots o_{npm}\} \quad \text{Equation 1.1}$$

Where the index 1 . . . n is an element of information in the OTP (such as a byte, word, etc.) and p1 . . . pm is a particular partition and a member of the partition set P. Each partition value consists of binary information extracted from the original dataset (e.g. o1p1=10001001011). Then this information may be allocated into the complex space by creating a set of randomized coordinates in a complex space, and using those coordinates to allocate the information from the OTP (equations 1.2 and 1.3)

$$OTP \rightarrow vOTP_{Data} \quad \text{Equation 1.2}$$

$$\{o_{1p1}, o_{1p1}, \ldots o_{npm}\} \rightarrow \{o_{1c1}, o_{1c1}, \ldots o_{ncx}\} \quad \text{Equation 1.2.1}$$

where OTP is an OTP of any format, $vOTP_{Data}$ is the data contained in the vOTP, and the coordinates $d_1 \ldots d_n$ are random coordinates in a complex space derived using the RNG (ideally a TRNG/QRNG). After the information has been transformed into the complex space, an associated vector set will be created. The vector set defines a "walk" (or a path) through the complex space, and is associated with a randomly selected choice of coordinates in the complex space. A walk or path may be expressed in the general form in equation 1.3:

$$w_x = \langle o_{Ac1}, o_{Bc1}, \ldots o_{Zcx} \rangle \quad \text{Equation 1.3}$$

$$vOTP_{Paths} = (w_1, w_2, \ldots w_z) \quad \text{Equation 1.3.1}$$

Where $c_1 \ldots c_x$ are sets of coordinates for complex space (for example, in a 4-dimensional space with integer coordinate systems, the coordinate c1 could correspond to (235, 2837571, 37263, −2837), and $w_i$ is an ordered vector of coordinates representing a single walk. $vOTP_{Paths}$ defines the set of all possible paths through the vector space. The coordinates can be selected from the set VD, which represents the complete set of coordinates assigned in equation 1.2.2. A complete set of paths stored in $vOTP_{Paths}$ (equation 1.3.1) can be generated as the set $w_1 \ldots w_z$ where z is defined as the length of the original dataset (text file, image, etc.) for which the OTP was created. Using the data $vOTP_{Data}$ and path information $vOTP_{Paths}$, we can then create cipher data of length z corresponding to the original data. The cipher data can then be created as illustrated in equation 1.4:

$$vOTP_{Cipher} = \{i_1, i_2, \ldots i_z\} \quad \text{Equation 1.4}$$

Each cipher value $i_1 \ldots i_z$ corresponding to each element of the original dataset are calculated by performing XOR (or another operator) between the OTP data different coordinates contained in the corresponding vector value $w_1 \ldots w_z$. The final cipher values can then be used to compute the final encrypted or decrypted data by XORing (or using another operator) with the original data.

In further embodiments of the invention it is envisaged that another source of information similar to an OTP may be used to derive the vOTP. Once partitioning takes place, a vector set of information is created, in a manner similar to the one described previously. In this embodiment, data may be retrieved from each coordinate specified in the path vector in the complex space, and then XORed with the next piece of data in that path vector at the next coordinate. This process is repeated until a final set of values $E_1$, $E_2$, etc. are calculated for a corresponding set of vectors, which completes the virtualization into the complex space; the vectors contained in the vector set of the virtualization are used to encrypt and decrypt information, such that for each vector $v_1 \ldots v_n$ of random length $l_1 \ldots l_n$, where the elements in each vector reference dimensions $d_1 \ldots d_n$. The elements which correspond to individual coordinates in the xOTP (where the original coordinates/complex space index are generated using a nonce/random information from a QRNG) are XORed together (or using another appropriate function) in sequence to produce cipher data $c_1 \ldots c_n$ during the encryption process, or $e_1 \ldots e_n$ during the decryption process. The "walk" through each vector (this path being originally calculated using truly random information from the QRNG) involves a process in which subsequent pieces of information are XORed (or using another appropriate operator) together.

In every step, the information to be encrypted can be compressed (ideally in a lossless fashion). The size of the vOTP is calculated to account for the duration of time it will be used. When creating a physical, partitioned OTP (ppOTP) from other OTP data (which can be a pOTP, vOTP, eOTP, or some other OTP data xOTP), OTP data is partitioned into n partitions. In certain embodiments the method for partitioning comprises using a reproducible algorithm configured to determine the boundary of each partition.

In certain embodiments, once OTPs have been created, they will be entangled and shared between one or more devices. Within the present context, the term entanglement is used to denote a process in which each participant to the communication protocol contributes some information to the generation of the vOTP. In certain embodiments this is achieved by mixing portions of each participant's xOTP together, for subsequent use in the virtualization process, and ultimately in generating the vOTP. In certain embodiments, a method of sharing entangled OTPs and/or expanded OTPs initially starts with identifying one or more OTPs or optionally expanded OTPs, in any combination, in part or wholly held within one or more devices. Initial OTP data can consist of ppOTP, vOTP, pOTP, or some other OTP data in any another format (xOTP). Next, an entangling function is applied, optionally distributed over multiple devices (where no single device has overall control), which may be used to decide upon which device(s) and in which order they are used to mix part or all of their OTPs together.

The resulting mixture of the OTPs is shared, in part or wholly, by one or more of the devices. During the entangling process, data is mixed/merged using a mixing/merging function. A mixing/merging function (or transposition or substitution function) may comprise any function which can create a new random data derived as a product of combinations of random data, such as logical exclusive-or, add, multiply, polynomial cyclical redundancy checksum or hashing functions being but a few illustrative examples. Each step of the entanglement process may comprise an optional randomness extractor function (such as described by John von Neumann and others) and may be used on the random data to further mix/merge, and increase the entropy of the random data. Optionally, an entropy checking function may be used to confirm the randomness of the OTP, and if this is below a threshold, it is envisaged that in certain embodiments the entanglement process may be restarted. In certain embodiments, the entanglement process takes place, preferably, within a secure environment (such as within a Faraday cage) or through a secured link (such as a quantum-safe link), or on a single secure device when only one device is used.

When processing xOTP data, different workflows can apply the operations of partitioning, entanglement, and/or virtualization to the xOTP data. In other words, the sequence with which the partitioning, entanglement and virtualization processes occur, may vary. Intermediate OTP data can consist of a number of different types of OTP data, including ppOTPs, vOTPs, eOTPs, epOTPs, vpOTPs, or some other OTP data. Optional error/entropy checking can be performed after each operation. Workflows can consist of two intermediate steps to produce a final working OTP, or another number of steps in which operations (such as partitioning, entanglement, and/or virtualization) are repeated. Each workflow would result in a final OTP which can be stored, transmitted, or used in some other fashion. The creation of the OTP through a number of possible workflow creates an astronomical number of potential vOTPs that may be used for encryption purposes, all of which use SOWFs. The result of this is that it becomes impossible for a quantum computer or computers with high processing capabilities to correctly calculate the vOTP required to decipher ciphertext generated using vOTP. This is in sharp contrast to other known methods of cryptography such as lattice cryptography or quantum-key distribution which make use of ROWFs and PRFs. When the present methods of generating a vOTP are used in conjunction with other cryptographic operations, such as encryption, decryption, authentication and certification, the resulting cryptographic communication protocols become invulnerable to cryptanalysis. In certain embodiments, once entanglement has been performed, the physical/logical and/or electronic separation of the devices may occur. In certain embodiments, the encryption step itself can involve the use of an operator such as an XOR operation or other reversible operator, and a decryption step, which would use the same operator.

For retrieving information, the access function is used, and these functions use virtualization functions and/or relies upon the virtualization functions, methods, and structures to expand an OTP into a virtualized OTP (vOTP) or part thereof to dynamically create and/or return part or all of the expanded vOTP, possible access functions may include combinations of (i) any virtualization function, (ii) a complex space function, (iii) a partition function which localizes each index access, or an access function with unrelated virtualization function, such as: (i) source of random data, preferably a from private OTP; (ii) a source of agreed indexes, preferably without duplicates.

In certain embodiments, in which the present methods are used for encryption purposes, an optional authentication step may occur in the communication between the one or more devices (real or virtual), in which the devices are verified using one or more probe/challenge messages and the exchange of small, encrypted portions of data (which is not required if encryption is occurring on a single device). In connectionless communication between devices, device ID and other information may be broadcasted, and devices may be validated after successful connection. In the authentication or datagram process, a key is generated by randomly selecting a portion of the xOTP, along with the coordinates of that information in the xOTP. This information comprises a key, which is transmitted with the xOTP. Transmission of data can occur in a quantum-safe fashion over any distance, which can include satellite transmission, intercontinentally, within the same computer network in a local building, etc. A certification step can also occur in which authenticated devices are added to a secure list and connecting devices are then checked against this list of valid devices (which is not required if encryption is occurring on a single device). The certification process is optional but further ensures the security of transmitted data.

In certain embodiments, the foregoing methods may be implemented in hardware or software. The electronic device or devices may have the capability of converting true random processes into truly random information, then deriving random data (using a TRNG/QRNG/software based generator) from this information, and using these true random numbers to produce the resulting OTPs with another device. Where the random information/data may optionally be derived/processed at any step within the software/hardware/device using a randomness extractor. Each device may have the ability to entangle such a device with other electronic devices of similar or different design. The devices may have onboard RAM, a CPU, and firmware to perform these key functions, or some other configuration of electronic components, which achieve equivalent functional outcomes. Each physical device may function as a separate device or in conjunction with other devices, which share core components.

It is envisaged that the present methods may be used to encrypt information of any format, and of any type, including but not limited to biomedical data (electronic medical records, molecular sequence data, FASTQ data, molecular structure information, HL7 (Health Level 7) transmissions, XML, or other formats); financial information (including trading data, stock related information, and other datasets); currency (such as conventional bank transactions, cryptocurrency, and other types of data); military data (which can include geographical coordinates, satellite transmissions, digital correspondence, and similar information); or any other digital data.

In accordance with a further aspect of the invention, a computer program product is provided comprising computer-executable instructions, that when executed by a computer processor, configure the computer processor to perform the steps of any one of the previously described methods above.

Similarly, in yet a further aspect of the invention there is provided a computing device comprising a processor and a computer readable memory having stored thereon computer-executable instructions, which when executed by the processor, configure the computing device to perform the steps of any one of the previously described methods above.

BRIEF DESCRIPTION OF DRAWINGS

FIG. 1 is a diagram illustrating conventional versus QSE.

FIG. 14 illustrate in pseudo-code how an encryption process might be implemented in software.

FIG. 15 illustrate in pseudo-code how a decryption process might be implemented in software.

DETAILED DESCRIPTION OF THE INVENTION

A detailed description of one or more embodiments of the present invention is provided below along with accompanying figures that illustrate the principles of the invention. This detailed description and accompanying figures illustrate the present invention by way of illustrative example only, and is not to be construed as limiting. Alternative embodiments are envisaged that are not explicitly described herein, but which adopt the operative principles of the embodiments described herein, and which would be obvious to the person skilled in the art on the basis of the presently provided illustrative examples. The description will clearly enable one skilled in the art to make and use the invention, and describes several embodiments, adaptations, variations and alternatives and uses of the invention, including what is presently believed to be the best mode and preferred embodiment for carrying out the invention. It is to be understood that routine variations and adaptations can be made to the invention as described, and such variations and adaptations squarely fall within the spirit and scope of the invention. For the purpose of clarity, technical material that is known in the technical fields related to the invention has not been described in detail so that the invention is not unnecessarily obscured. Such details relate typically to background information widely known in the field of cryptography, and which would form part of the general background knowledge of the person skilled in the art.

In FIG. 1, conventional encryption schemes are contrasted with the Quantum-Safe Encryption (QSE) approach disclosed herein. The schemes are abstracted and shown at a highly simplified functional block level showing sources and flow of entropy in the systems, omitting details of keys, mixing, merging, transposition or substitution. In AES encryption [100], a TRNG [105] is used as input to produce PRF data [120]. In 3DES [115], TRNG input [120] is converted to PRF output [125], and that output can become input again and reprocessed in a loop multiple times (three times to make the encryption process more secure). In conventional OTP encryption [130], input in the form of a table of data [140] can be converted into TRNG output [145]. In the quantum safe approach employed here [150], PRF input data [160] can be converted to TRNG output data [170], and this output can be reprocessed as input in a loop [175]. Similarly, TRNG input data [180] could also be used as input, producing TRNG output [170] which could then constitute input and be reprocessed in a loop [185]. Additionally, TRNG input [190] can be mapped to intermediate PRF data [195], which could then be used to produce TRNG output [170], which again could be reprocessed in a loop [198]. Overall, TRNG output data [170] maybe also be looped back to any input [160,180,190,195] in any order, sequence or iterations (not shown).

Figure 2:
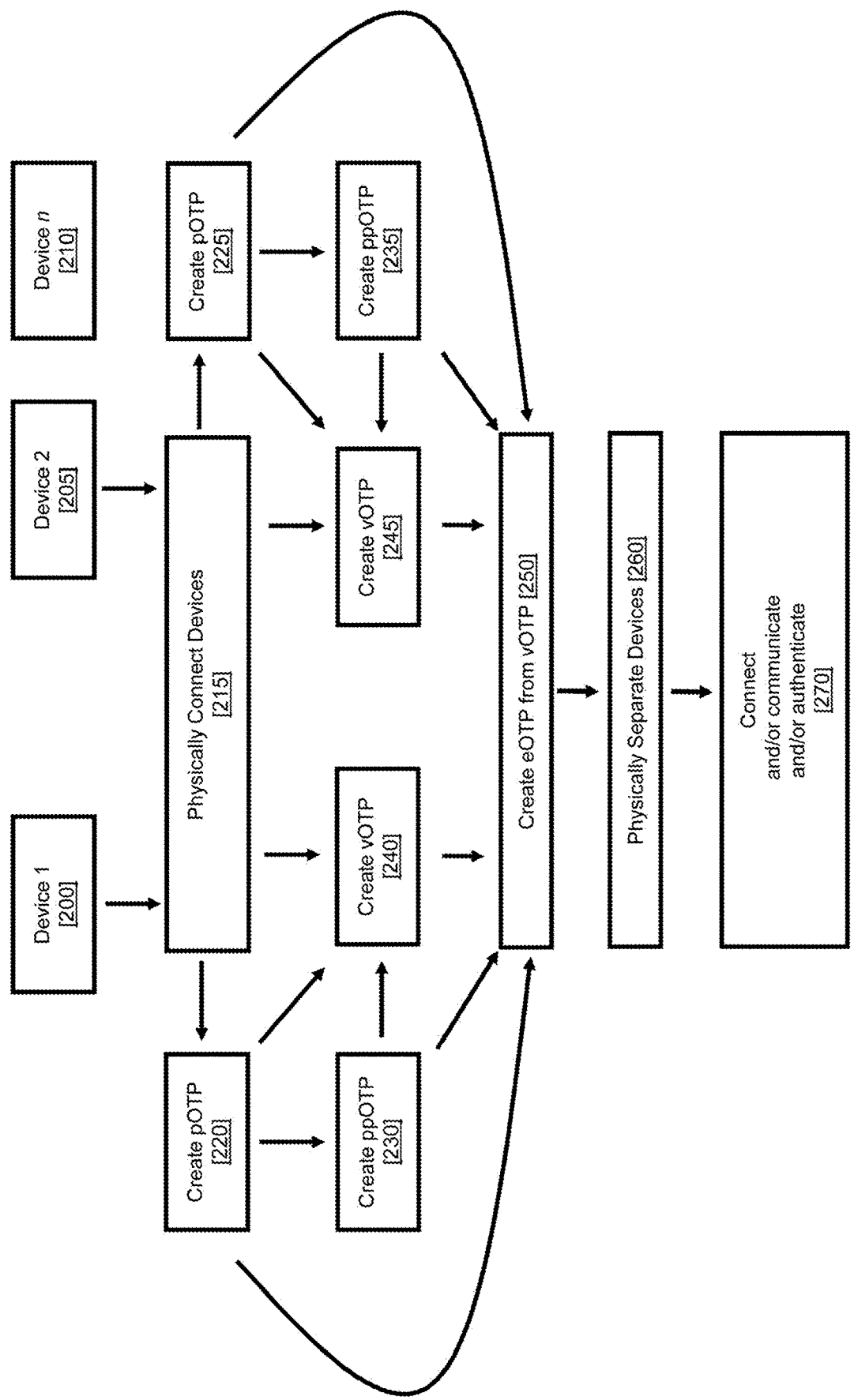
FIG. 2 is a schematic diagram illustrating the general process for QSE in accordance with an embodiment of the present invention.

In FIG. 2, a schematic illustration of an overall process flow for QSE is shown. First, an arbitrary number of devices (physical or virtual) containing data, which are illustrated by [200], [205], and [210], are connected to each other using USB connections, network connections, wireless communication, optical or similar means [215]. This connection can take place in a shielded/secure environment, like a Faraday cage when physically proximal, or over a network if the devices are remotely located from each other, e.g. in different countries, on different continents, in space, etc. The disclosed process can also take place on a single device to secure data on that device. Next, a physical OTP (pOTP) is created for each device, and in this figure this process is illustrated for 2 devices [220] and [225], although it could be for an arbitrary number of devices. Then, the pOTPs are "partitioned" into separate parts to create the partitioned, pOTPs (ppOTPs) [230], [235]. Using the ppOTPs, a virtual OTP (vOTP) is then created by projecting the ppOTP into complex space [240], [245]. Finally, the vOTPs are then entangled to create an entangled OTP or eOTP [250]. Once this step is complete, the devices can then be physically separated and then encrypted data can now be exchanged

[270]. The order of these steps may be considered to commutative so may be applied in a different order.

Figure 3:
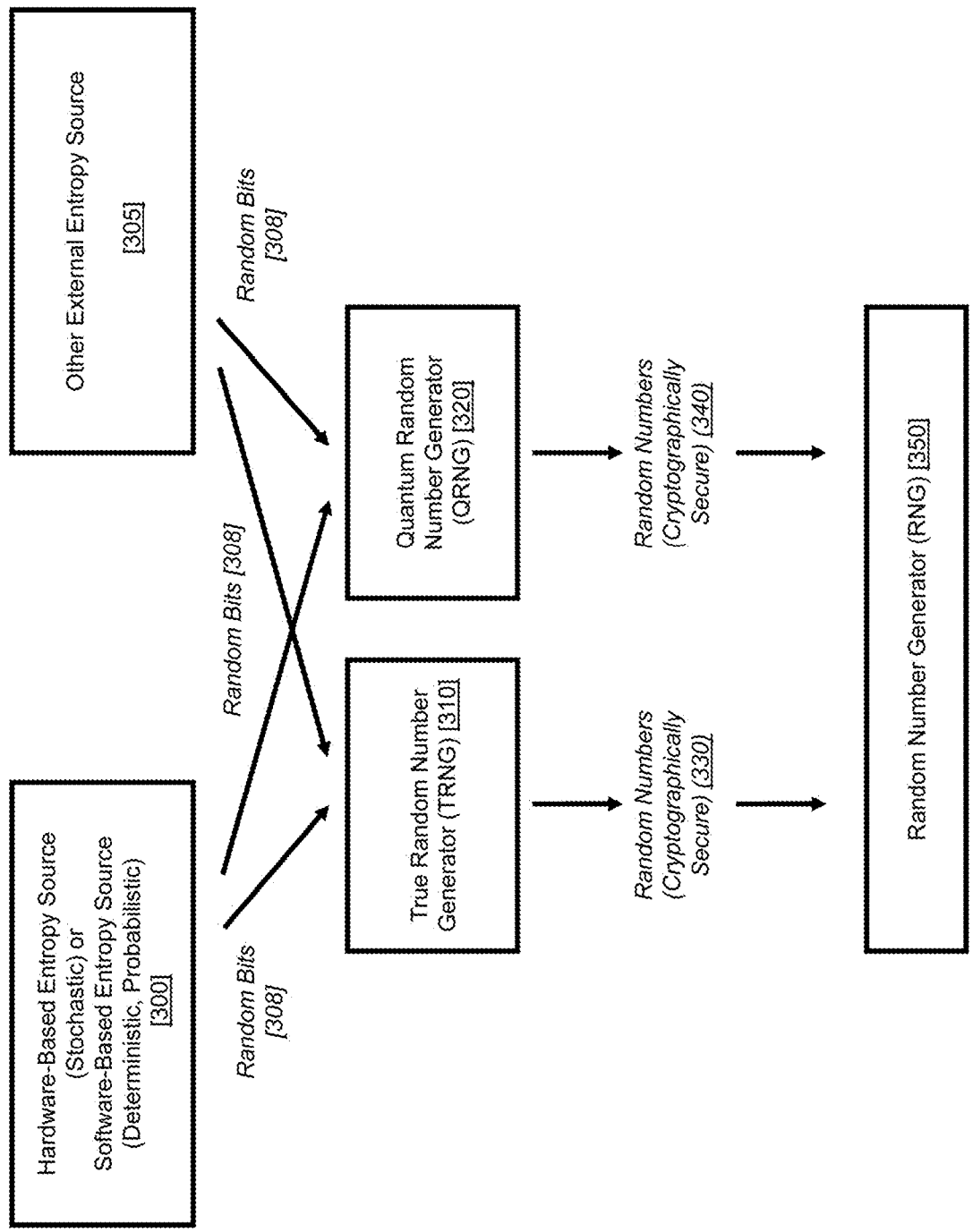
FIG. 3 is a block diagram illustrating true random number generation for QSE.

In FIG. 3, a method for generating true random information is illustrated. First, random information or stream of bits are created using a hardware based entropy generator, either a TRNG, or preferably a QRNG, or less ideally a software-based entropy generator for example PRNG, which is suboptimal being deterministic since it may not generate a truly random stream of bits [300] or any combination mixed together. The random bits are then used as input to a true random number conditioner/generator (RNG) [310] which verifies that the information is indeed random, and then produces truly random numbers from the random bits [330]. Alternatively, random bits may be supplied as input from a quantum random number generator (QRNG) [320] to produce random numbers [340]. These random numbers generators are optionally combined to create a common Random Number Generator RNG [350] used as data to generate cryptographic information such as the pOTP. The RNG (which ideally consists of a TRNG/QRNG) may be conditioned with an unbiasing algorithm/randomness extractor. The source of the random information may preferably be located internally within the device or optionally solely or mixed with another externally connected generator [305].

Figure 4:
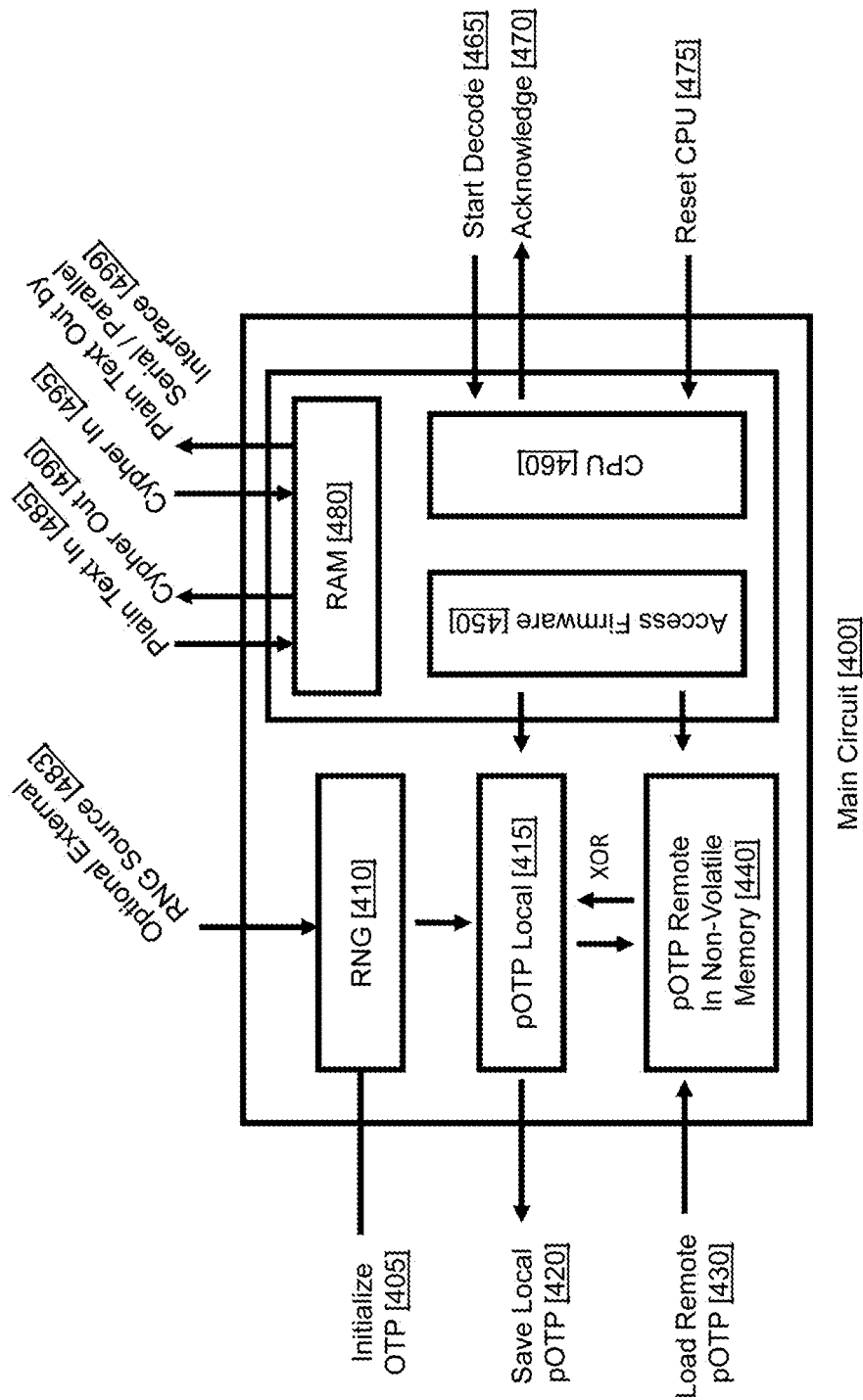
FIG. 4 illustrates a high-level block design of a hardware implementation of a QSE device.

FIG. 4 outlines the physical design of an electronic circuit [400] which could be used to perform quantum-safe encryption. First, an initialization signal is sent to the device [405] to start generating random data for producing an OTP. The internal hardware-based random number generator (RNG) [410], which can be a QRNG or TRNG or can mix with or use an external RNG source [483], generates truly random/cryptographically secure random numbers for OTP production. A local OTP [415] is then created using the random data using programmed firmware [450], which can then be saved [480] into memory. As well, another circuit of the same/similar design could also be performing these steps and transmitting a remote OTP [430], which could be loaded [440] through a connection between the two devices. The creation of local OTPs [415] and loading remote OTPs [440] is executed in firmware [450] by the central processing unit (CPU) [460], microcode or hard-wired logic. Encryption and decryption operates independently. To start the usually asynchronous decoding process, which involves converting a cipher to plaintext, a "start decode" signal can be sent to the CPU [465]. The CPU will then transmit an acknowledgement [470]. Additionally, the CPU can be reset [475] by sending a reset signal, which will interrupt any process the CPU is executing at the time. The random-access memory (RAM) can be used for storing plaintext [485], and for output of the resulting cipher [490] during the encoding/encryption process. Conversely, ciphertext [495] can be converted back to plaintext [499] during the decoding/decryption process by storing and ciphertext and output of the plaintext. The Save Local and Load Remote can be used to exchange and mix the OTP between two devices with a simple link. With multiple devices, a network comprising a ring ensures the OTP is exchanged between every device. Other network topologies, such as ring or broadcast or token, are possible depending on the type of connection used (wired, wireless or other).

Figure 5:
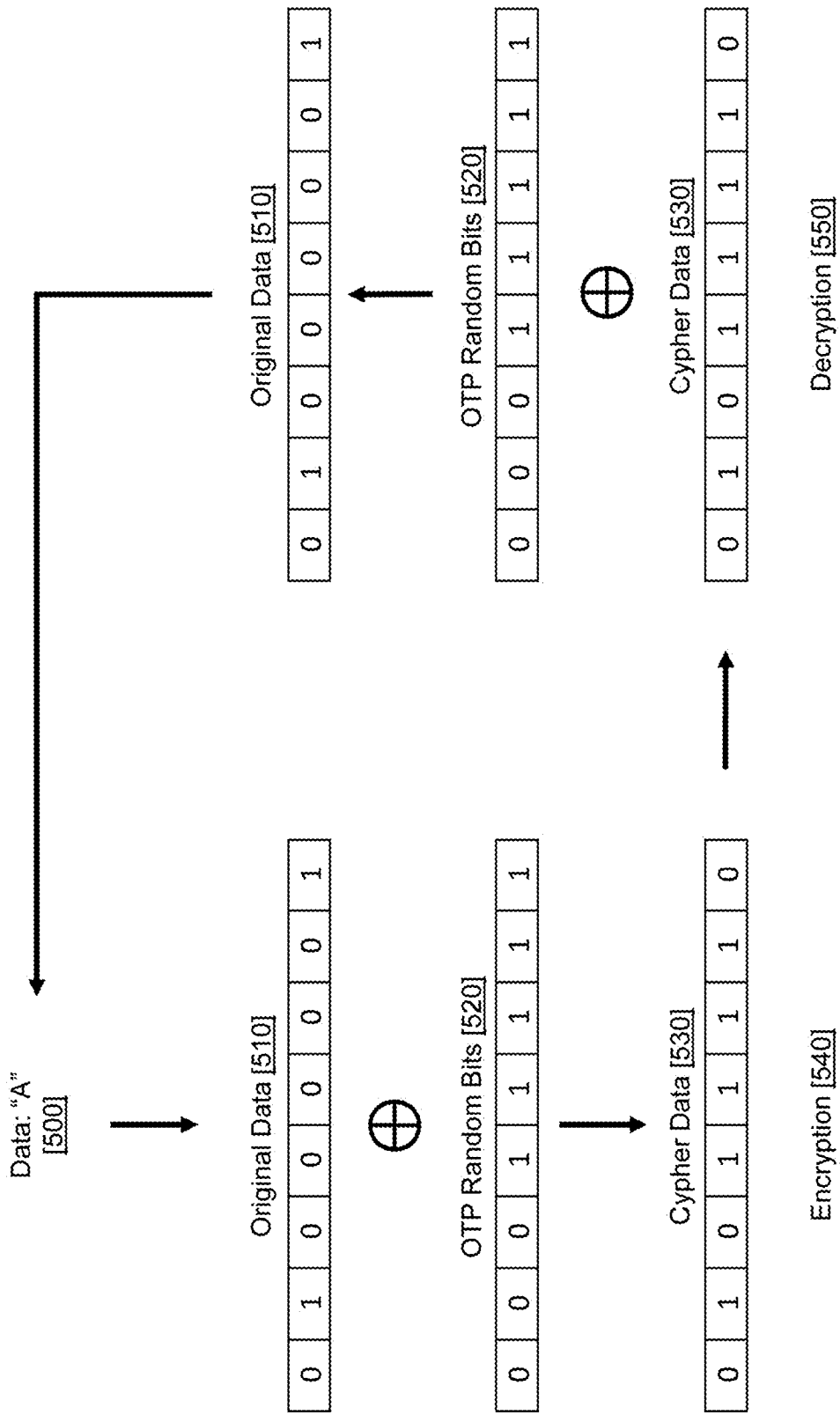
FIG. 5 illustrates the use of a commutative operator such as XOR in encryption and decryption.

In FIG. 5, the process of calculating a cipher, and then converting cipher data back to original data is illustrated using a reversible commutative operator (preferably like exclusive OR, or XOR which is a bitwise logical operator which returns the value 1 if either bit of the two inputs is different, and 0 if the bits are the same). Alternatively, the process of transposition and or substitution could be used. In this calculation, the bits of the original data are XORed with the bits of the OTP data, resulting in the creation of a cipher. Original 8-bit data [500] is then XORed (or another reversible commutative operator used) with the OTP random bit information [520] to produce the cipher data [530]. This overall process can be described as encryption [540]. After transfer between devices or in time, the encryption process can be reversed, where the cipher data is XORed with the same OTP random bit information [520] to produce the original data [510], and this overall process can be described as decryption [550]. This process is inherently parallel and can be performed in hardware and or software on large blocks of information and need not be limited to 8 and 16 bits, with 64, 128, or larger units or word sizes also possible.

Figure 6:
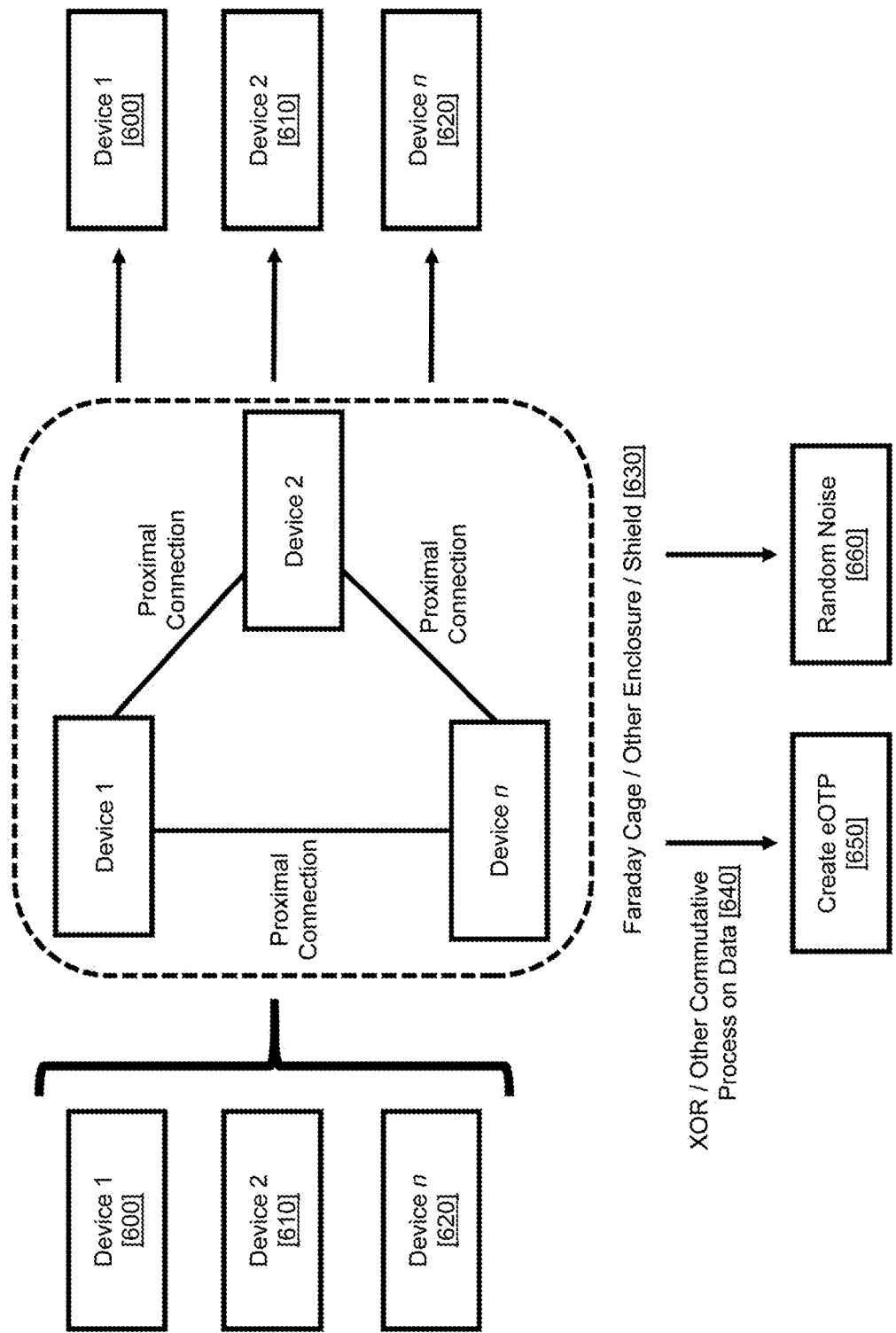
FIG. 6 illustrates the process of entangling devices to produce an entangled one-time-pad (eOTP).

FIG. 6 describes the process of creating an entangled OTP, or eOTP, from physically linking an arbitrary number of electronic devices. First, the devices [600], [610], [620], which could be smartphones, tablets, computers, laboratory equipment, or other electronics, or contained with embodied hardware or microcode, are physically linked to each other using a wired, wireless or optical connections such as Ethernet cables, USB connections, or other similar means preferably within a Faraday cage or other shielding [630] to maintain privacy. Each device will produce an OTP produced by its local RNG, which is mixed/merged/entangled with all the other device's OTPs, and then the devices physically separated before being used to create encrypted cipher text [640]. This physical connection in this protected environment allows the OTPs created for each device's original random data to be "entangled" (if they pass security and entropy checks/authentication) and produces a single OTP, called the eOTP [650]. Each of the devices when entangled have all or part of their OTP's set to the same identical random data.

If the devices do not pass security checks, contain low quality random data or fail to authenticate, then a stream random noise is produced, rather than eOTP data. In the case of an unauthorized individual attempting to perform cryptanalysis by creating a predictable pattern to enable later decryption, random noise, generated by each devices' RNG [660], makes it difficult for hackers to determine if eOTP data is being transmitted or not or even if the random data should be used at all. The random noise is not mixed/merged/entangled with any other device's so at a later stage the unauthorized individual's device(s) will be excluded and unable to decrypt the other devices cipher text. After the eOTP is created, the devices can then be separated and their data is now securely encrypted. Creating the eOTP is a one-time process and will not be repeated until reset to manufacturers default settings. When only a fraction of the OTP capacity is entangled, the remaining capacity maybe be used and this process repeated with another possibly different group of devices. For additional security measure, resetting the device without a partner, by being self-partnered destroys the contents of all local OTPs within the device and across hardware software embodiments writes new random information into the OTPs rendering the device unable to decrypt any of the previous encrypted ciphertext such that it cannot participate in encryption, or be linked to any recorded or previous encryptions.

Figure 7:
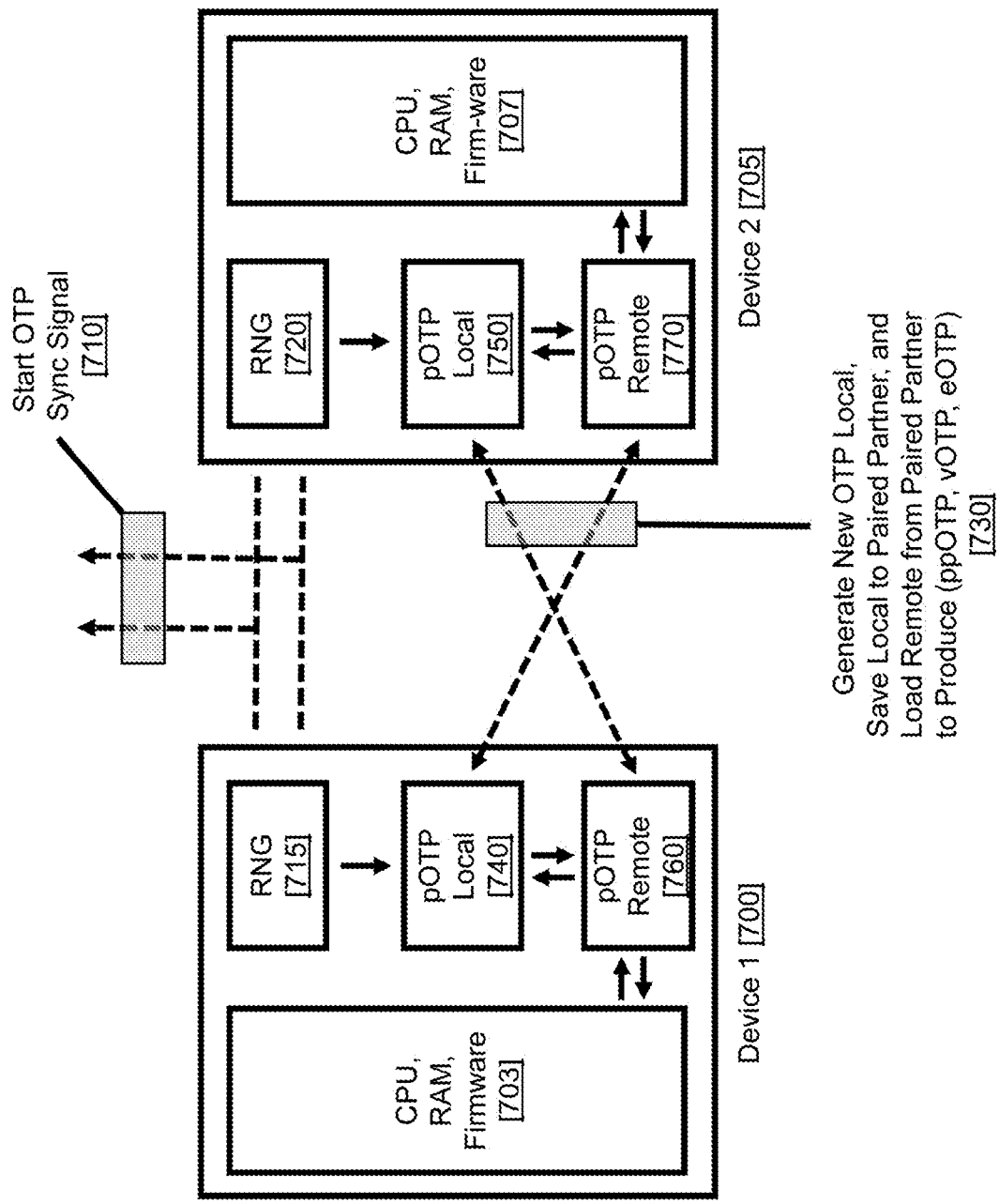
FIG. 7 illustrates the process of calculating physical one-time-pads (pOTPs) during the entangling of two or more devices.

In FIG. 7, the linking process between two or more devices is illustrated. Given two devices, device 1 [700] and device 2 [705], a signal is sent to both devices to start the calculation of an OTP on each device [710]. The signal also synchronizes the devices so that they can generate their OTPs at the same time. During the calculation of the OTP, the RNGs in each device [715], [720] will generate random number data which will create randomized bit data that comprised the OTP. These OTPs are then stored on each device [740], [750]. These locally stored OTPs are then exchanged between devices during the linking process and stored on each opposing device [760], [770], and then used to generate a new eOTP [730]. The simple exchange between 2 devices may be extended to multiple devices using a ring buffer to circulate the local pOTP to every other device so the resulting entangled eOTP contains a mixture of all the devices local pOTPs. This one-time process can be described as an "early bind" between devices as no further exchange of keys/OTPs is required to encrypt or decrypt information. With self-partnered devices local [740], [750] and remote [760], [770] OTPs connect only to the same device, or combination of the Start OTP Sync signals [710] may be used to create a new unrelated OTP.

Figure 8:
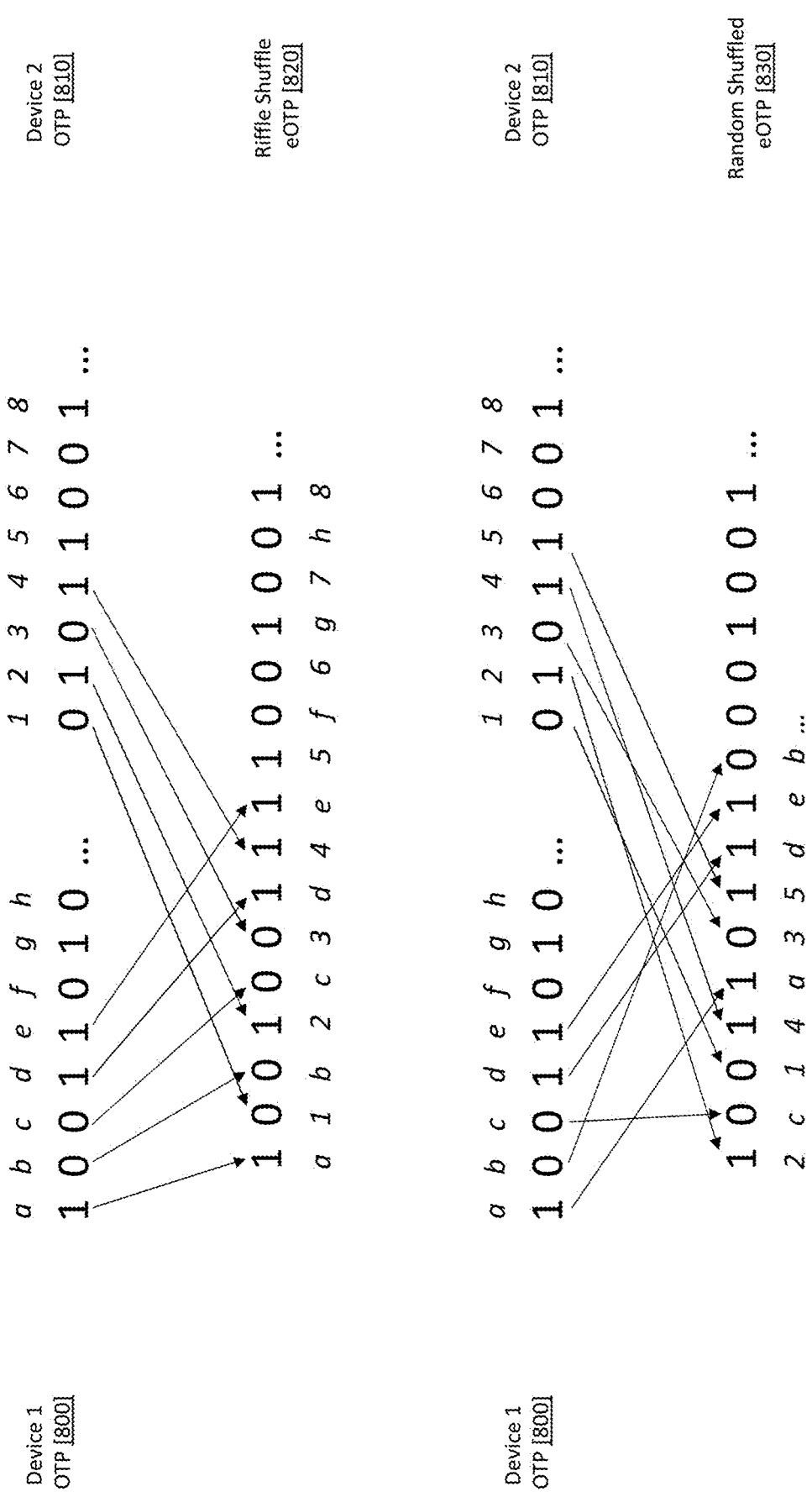
FIG. 8 illustrates the process of entangling two pOTPs using a bitwise operation.

FIG. 8 depicts the process of entangling two OTPs using different approaches. In the first example, OTP data from two devices [800], [810] are entangled by alternating their bits to form an eOTP [820]. This process of alternating information from different sources is referred to as a riffle shuffle. In the second example, the OTP data [800], [810] are randomly combined to form an eOTP [830], through a process that can be described as random shuffling. Other processes for producing eOTPs are possible, such as producing a mix/merge/transpose/substitute shuffle and preferably the XOR operator.

Figure 9:
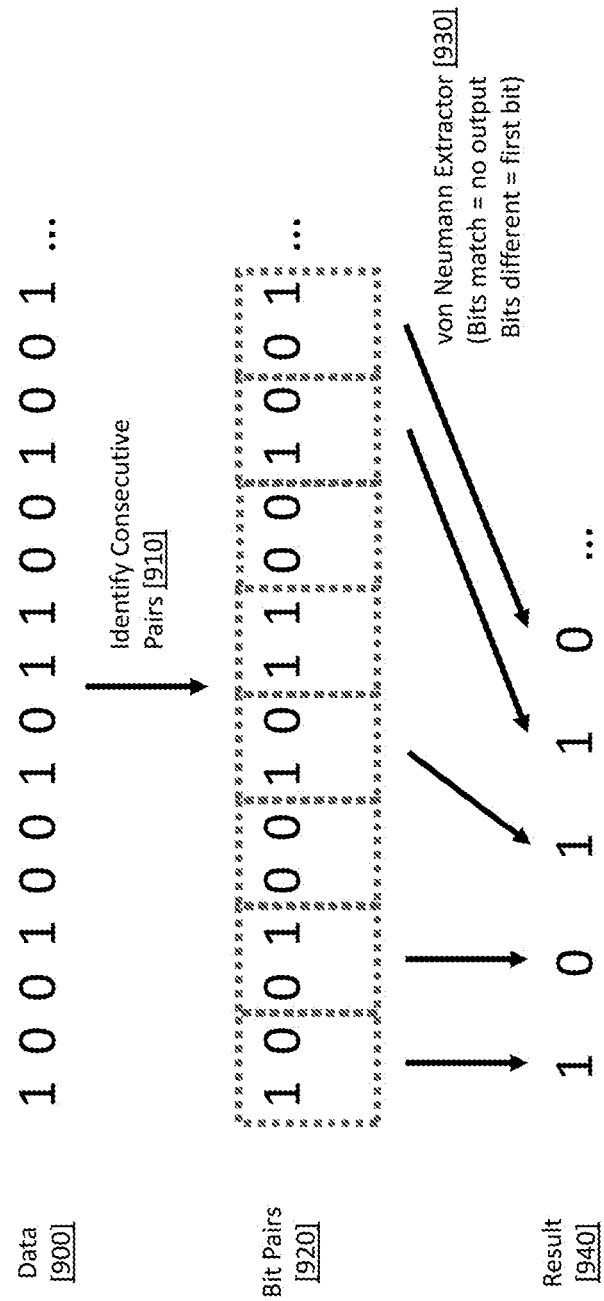
FIG. 9 illustrates the process of performing randomness extraction on random data.

FIG. 9 depicts the process of executing randomness extraction using random data that might comprise an OTP or OTPs or source of random numbers. A number of different unbiasing algorithms/randomness extraction processes can be used, and the one illustrated here is a basic von Neumann extractor. In a von Neumann extractor, a set of binary data is identified [900]. Then, consecutive pairs of bits are identified [910] resulting in pairs of bits [920]. The von Neumann extractor uses two rules [930], a new set of random data is generated. In the case of the von Neumann extractor, these rules are: if the two bits are equal, ignore the bits. However, if the bits are not equal, then the extractor retains the first bit [930] (optionally the second bit being the same albeit logical negation). This results in the final extracted data [940]. Randomness extraction processes can also include lossy or lossless compression.

Figure 10:
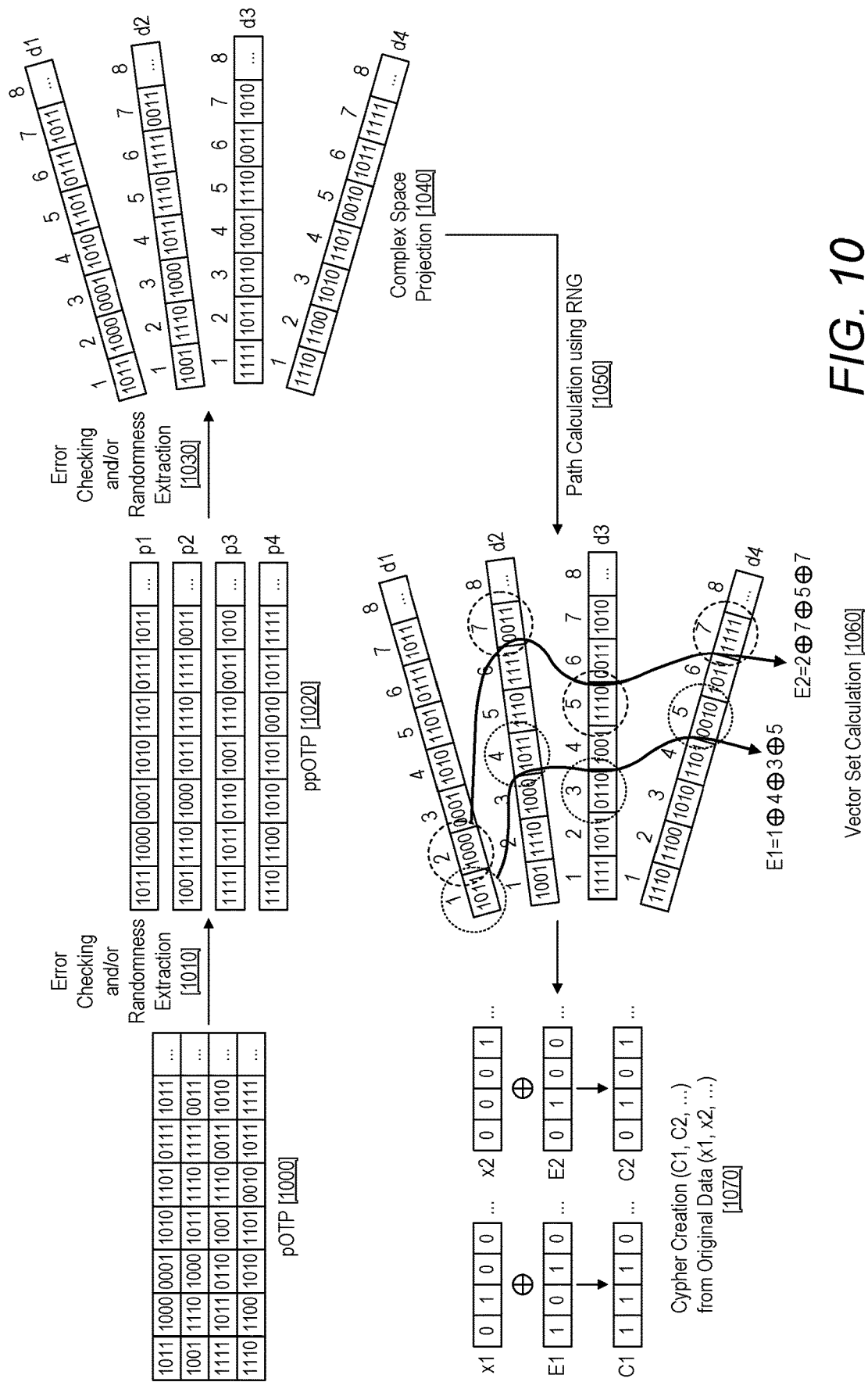
FIG. 10 illustrates the process of partitioning a pOTP to produce a physical, partitioned one-time-pad (ppOTP), and then projecting the ppOTP into hyper-dimensional space.

FIG. 10 depicts the process of partitioning a pOTP and then expanding the size of the OTP using a complex virtualization. First, a pOTP [1000] (which in this example consists of binary information stored in units of 4 bits, or nibbles) corresponding to raw original data, or compressed (ideally lossless) data is partitioned into p partitions using an algorithm that produces reproducible partitions. An example could include an algorithm which splits the pOTP preferably into n equal or nearly equal parts, or possibly an algorithm that randomly selects an arbitrary or prime/co-prime or near a prime number length for each of p partitions (within a certain range of values) and encodes a partition stop point in the data. The possible variability of partitions sizes renders the translation to the virtualization in complex space unpredictable to observers of unentangled devices. Error checking [1010] ensures that the data is partitioned in a reproducible fashion without loss of fidelity, and the information in the (any/all types of) OTP is checked to be random; for example asymptotically convergent with randomness extractor theoretical efficiency and/or compliant with NIST standards concerning entropy, computational and data quality. The result is a partitioned pOTP, or ppOTP [1020]. Next, the partitioned data is projected into a complex space [1040], such as a hypercube. In this process, a number of dimensions d (usually equal to the number of partitions p, but it can also have a different value) is used to access the stored data. It is important to note nested complex spaces can also be used. For instance, a larger 4-dimensional space could contain a small hyper-dimensional space of 8 dimensions, and another space of 13 dimensions. This makes partitioning more complicated, but also increases the complexity of the virtualization and therefore reduces the likelihood of cryptanalysis. Complex spaces can be created using a number of different approaches, such as procedural algorithms, randomly, or using simple methods (such as simply pre-selecting a single integer value, like d=4 dimensions). Additionally, fractal dimensions may be used, and different coordinate systems could be used for each dimension, and within a particular dimension. Partitioning can be done multiple times, making the process more complex, and less vulnerable to cryptanalysis.

Each index into a dimension consists of a linear vector that can access/index stored data from a data partition (or multiple data partitions) in the ppOTP. Next, information from the ppOTP is then accessed using the linear vectors of memory that comprise coordinates in the complex space. For example, the ppOTP is partitioned into 4 partitions and projected into a 4-dimensional complex space. In software terms, this is the equivalent of taking a single dimensional array a[x . . . n] and splitting it into four preferably non-overlapping parts, $p_1[x_1 \ldots n_1]$, $p_2[x_2 \ldots n_2]$, $p_3[x_3 \ldots n_3]$ and $p_4[x_4 \ldots n_4]$. Then, each element in each partition is stored/referenced in the linear arrays which comprise the dimensions of the complex space (in this example, a 4-dimensional complex space with dimensions $d_2$, $d_2$, $d_3$, and d4). When the ppOTP data is accessed through the complex space, a path (vector of coordinates) is provided through each of the multiple dimensions. The index coordinates are initially determined using nonce from the RNG [1050], and each path vector may have a fixed or random number of coordinates, indicating positions in the various dimensions. Using this path vector, a set of values can then be calculated from the complex space projected ppOTP, this process being referred to as a vector set calculation [1060]. In this process, data is retrieved from each coordinate specified in the path vector, and then mixed (preferably XORed) with the next piece of data in that path vector at the next coordinate. This walk process is repeated until a final set of values $E_1$, $E_2$, etc. are calculated for a corresponding set of vectors, which completes the virtualization into the complex space. Since each vector in the vector path corresponds to a unit of data in the original pOTP (which in turn corresponds to a unit of data in the original plaintext/other data), the resulting values $E_1$, $E_2, \ldots E_n$ can be mixed and then be XORed (or using some other reversible commutative operator) with the original plaintext/other data $x_1, x_2, \ldots x_n$ to produce cipher data $c_1$, $c_2, \ldots c_n$ [1070]. Each vector $v_n$ in a vector set s can be created by moving between a given set of dimensions $(d_2 \ldots d_n)$ in a random order, using random coordinates in each of those dimensions (without a collision by reusing the coordinates in a particular dimension). Vectors can be of different lengths, reusing a dimension, but preferably not the same coordinate in that dimension. If, when creating the next coordinate in a vector set, there is an attempt to iterate to the next dimension but that exceeds the largest dimension $d_n$, then one could move to the first dimension in the space (e.g. $d_1$), or to a random dimension (and use a random coordinate in this dimension that has not been used before).

Figure 11:
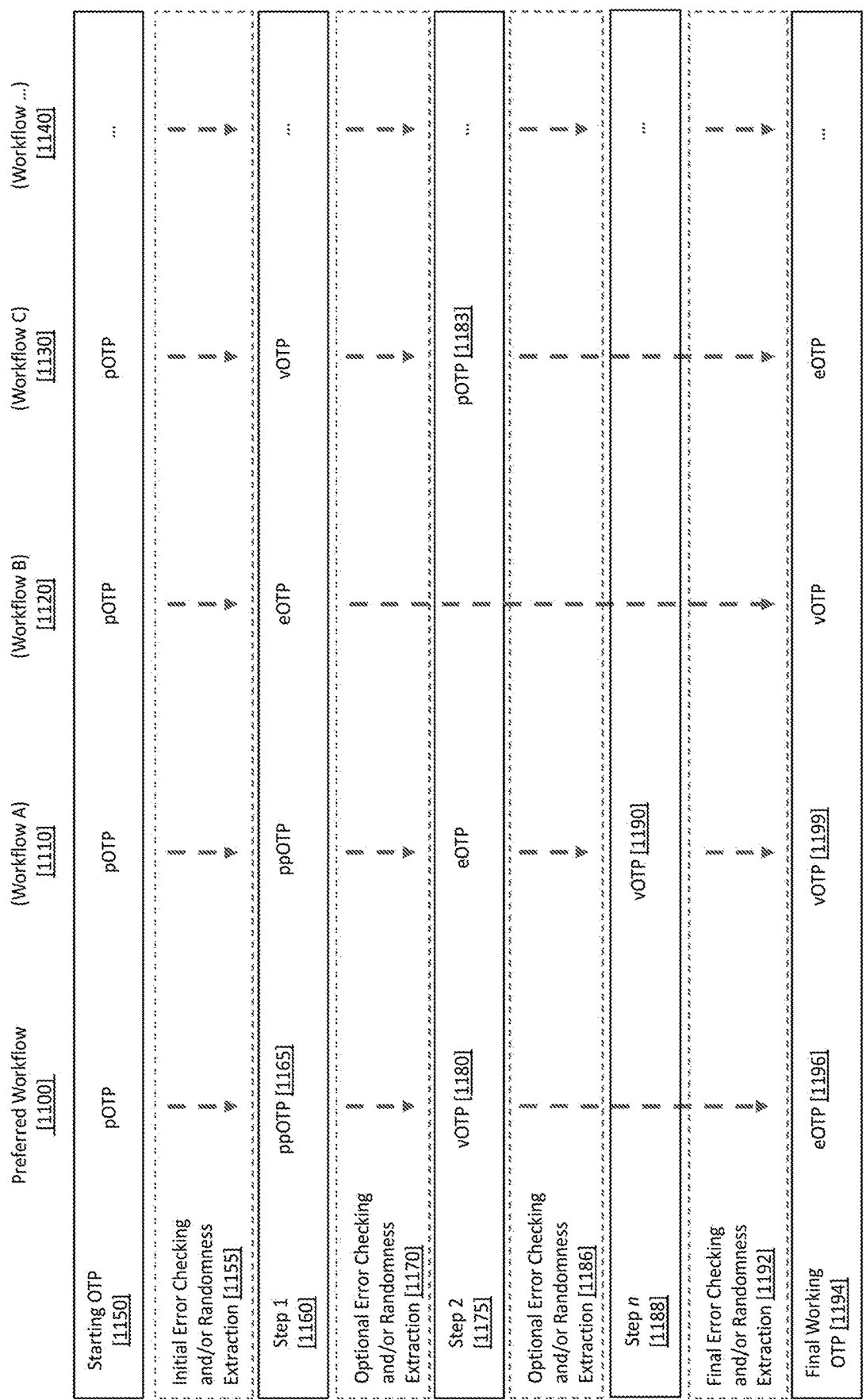
FIG. 11 illustrates a method for creating a final OTP from a starting OTP using different exemplary workflows.

FIG. 11 illustrates a variety of workflows for creating a secure OTP. The preferred workflow [1100] uses preferred security measures, error checking, and randomness extraction at different stages. Workflow A [1110] entangles data before the creation of the final working OTP. Workflow B [1120] performs entanglement even earlier, before partition, and workflow C [1130] performs entanglement earlier before partition. Other permutations and combinations in the workflow are also possible [1140]. In the entanglement process, the resulting xOTPs from different devices are combined by mixing or XORing (or using another reversible/commutative operator) the information from each device in sequence. The xOTPs can be generated using similar methods, or if the partitioning (data is partitioned at different locations in different devices), virtualization (the complex space contains different dimensions in different devices), or another aspect of the xOTPs differs, a process of standardizing the information can take place (where the coordinate locations are mapped to each other using a reproducible process) and information then mixed or XORed after standardizing the coordinates in the xOTPs.

Once random data has been generated by or loaded from the RNG source (which may consist of random integer or floating point numbers, which are calculated in firmware/software by calling the appropriate opcode, which in turn generates random bits), the first version of the OTP, the physical OTP (pOTP) is created [1150] by using the random numbers from the RNG to generate random bits. For convenience, the random bits may be organized into units of bits corresponding to the units of information in the original plaintext/other data that is to be encrypted or decrypted. For instance, if the original plaintext was stored in 32-bit units (words), then the pOTP bits would be stored in 32-bit words as well.

In each workflow, starting OTP data [1150], which normally consists of a pOTP, is processed using a different operation, such as partitioning, entanglement, virtualization (accessing using complex space virtualization), or another operation(s). Workflows can have different numbers of steps depending on the number of operations performed. These operators could be performed in different sequences and can be skipped and/or repeated. An optional error-checking step [1155](using randomness extraction/NIST/other standards) is performed on the output from the first operation. This produces different output depending on the workflow, and is considered step 1 [1160]. Then, another operation (partitioning, entanglement, virtualization, etc.) and another optional error-checking operation is performed [1170] to produce the next set of output in step 2. Depending on the workflow, this can result in a vOTP [1180], or virtualized partitioned OTP [1183], or other combinations. Another step (step n [1188]) could be performed, in which another partitioning/entanglement/virtualization operation is completed on the data. In workflow A [1110], this would produce a virtual, entangled OTP (veOTP, or generically referred to as a vOTP [1190]). Finally, another operation is performed [1192] on the OTP data to result in the final working OTP [1194], which can include an eOTP [1196], virtualized, virtualized, entangled OTP (vveOTP, or generically referred to as a vOTP [1199]), or a vOTP or eOTP, among other possibilities.

Figure 12:
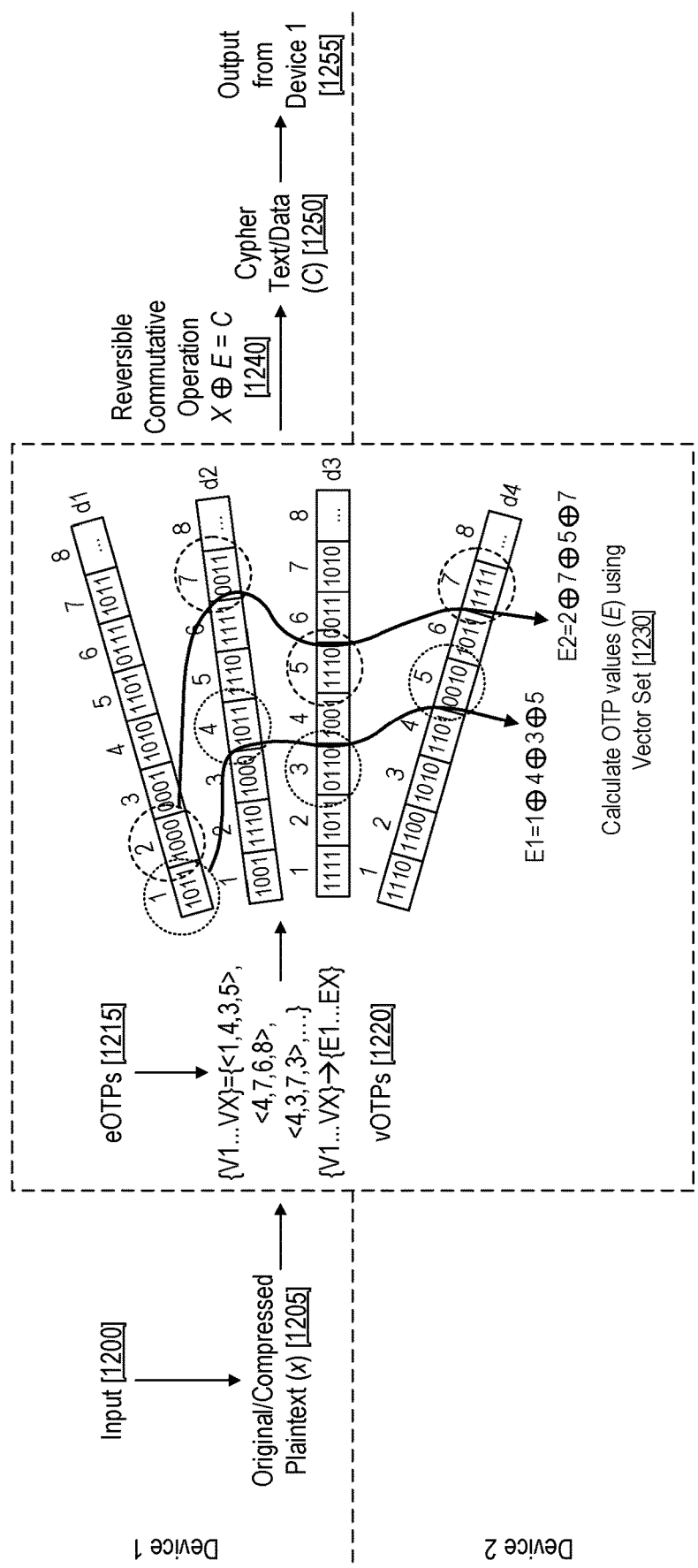
FIG. 12 illustrates the basic method for encrypting data using an eOTP and original plaintext data.

In FIG. 12, the process of encrypting data is described. First, a device (called device 1) contains input data, which input data may relate to confidential information that needs to be securely transmitted to a receiver. The input data may be in the form of plaintext, e-mails, multimedia data, or other information which can be input by users, obtained from sensors, transferred from other electronic devices, or produced/stored by other means. This information is then identified and parsed [1205], and a vOTP is calculated from the original data [1220]. Using the vector paths derived from the index used to access each dimension and data stored/dynamically accessed in the vOTP, OTP values ($E_1, E_2, \ldots E_n$) are then calculated [1230] and mixed and then XORed (or using another commutative operator [1240]) using the equation $x \oplus E = C$ (where C refers to the ciphertext, x refers to the original plaintext, and E refers to the mixed OTP values produced by the vOTP) to produce a ciphertext/data corresponding to original plaintext/input information [1250]. This data is then stored and/or can be transmitted to other devices [1255] and includes vector set which acts as a SOWF by indirectly referencing the contents of vOTP.

Figure 13:
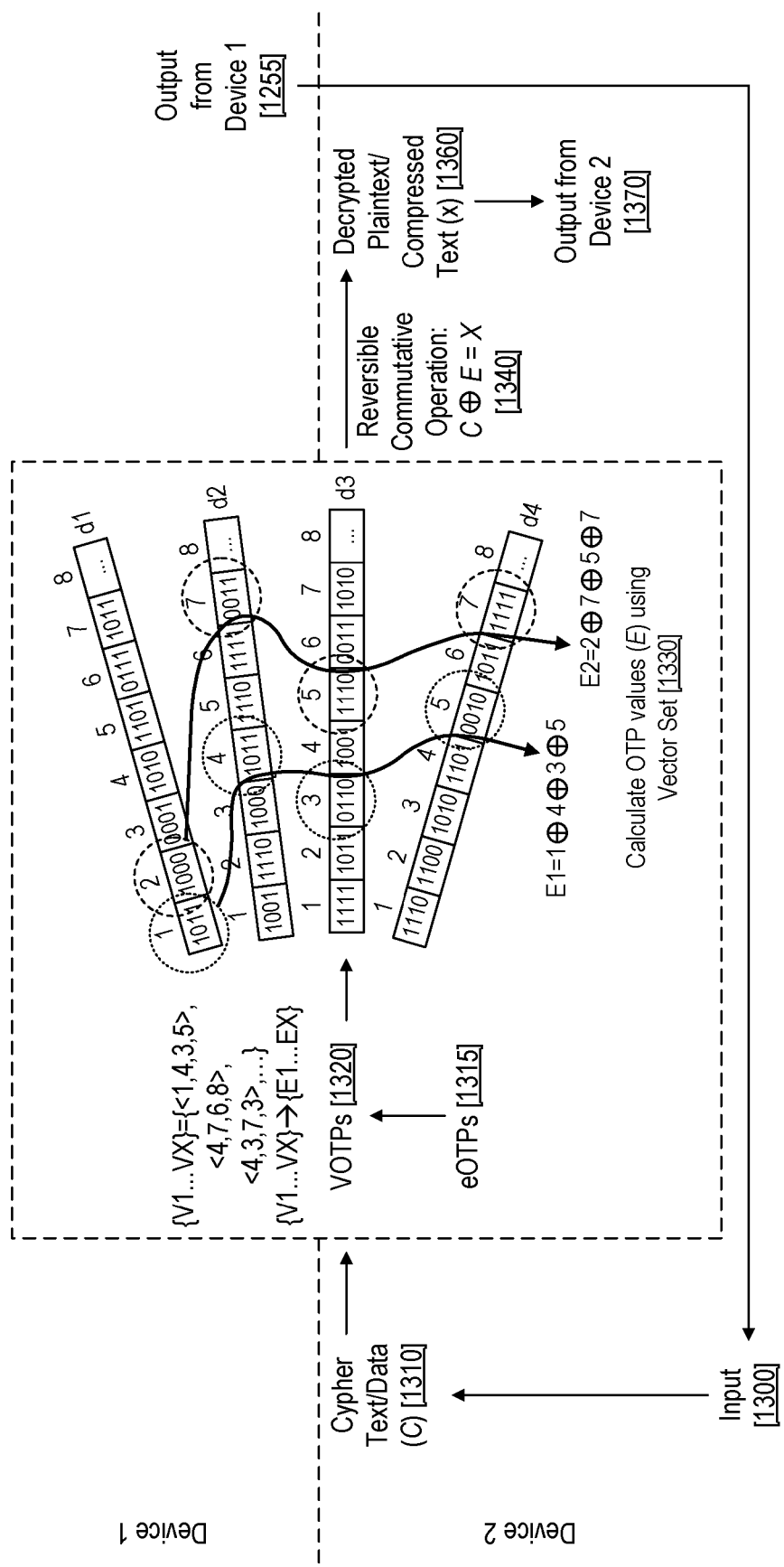
FIG. 13 illustrates the basic method for decrypting data using an eOTP and the cipher generated from the encryption process.

In FIG. 13, the process of decryption is outlined. Output from the encryption process on device 1 [1255] (discussed in FIG. 12) is then used as input for the decryption process on device 2 [1300]. This is transmitted between devices using a method of digital transmission, such as a wired connection (USB, Ethernet, etc.), wireless method, or other means or storage devices. This input is then parsed into units/words of data, and constitutes the ciphertext/data for device 2 [1310]. A vOTP [1320], derived from the eOTP [1315] (which is a shared secret between device 1 and device 2) is then used with the vector set to indirectly access the shared vOTP to reproduce the values $E_1, E_2, \ldots E$. [1330]. A reversible function is used so in the preferred case of XOR the reciprocal function is also another XOR function. These values are then XORed (or another reversible commutative operation used) [1340] to convert the ciphertext/data back to the original plaintext/input information [1360] according to the equation $C \oplus E = x$, where C is the ciphertext, E are the values calculated from the vOTP, and x is the original plaintext/input information data from device 1. This resulting plaintext/input information can then be saved on device 2, and used as output [1370] for transmission to other devices, processed further, etc.

FIGS. 14 and 15 illustrate in pseudocode one possible embodiment of the system, and describe the process of encryption in three main phases: phase 0 (which involves the configuration of hardware and the initial settings for the algorithm), phase 1 (initialization and entanglement of OTPs), and phase 2 (during which data can be accessed, encryption/decryption can take place, as well as certification and authentication). First, various parameters for the encryption process are set including build version [14006], features [14007], and serial number [14008]. Parameters for the basic operations during encryption can also be set, including simple/enhanced encryption [14010], integer size [14011], and index size [14012]. Additionally, OTP parameters can be set concerning the size of the OTP [14014], the number of dimensions [14015], and ranges of values for OTP size [14016], dimensions [14017], entanglement values [14018], and the range of values for encryption [14019]. Then, the OTP is filled with random data using the parameters set previously [14021] using the QRNG to generate truly random data. In phase 1, different types of OTP entanglement can take place, including "enhanced" entanglement [14029] vs. simple entanglement [14030]. First, OTP data is generated for each device [14040, 14041], and then if OPT_MODE is set to "simple" then the given device's OTP is XORed with the OTPs of every other device that it being entangled with. When OTP_MODE is switched to enhanced [14029], a random number of dimensions in the OTP [14037] are then selected for entanglement, then a random master is selected repeatedly [14047] and a portion of the OTP mixed and synced by the selected device until the entire OTP is mixed. Then a random master is selected repeatedly [14057], each choosing a random sized portion of the OTP to be allocated to each dimension in the OTP used for entanglement [14058]. Finally, the information is then synched between devices [14059].

In phase 2, information can be encrypted or decrypted simultaneously, and authentication and/or certification can also take place. A create random index function [15068-15070], and a next index function [15072-15078] is provided which allows randomly created indices to be incrementing from the assigned random position within each of the OTP's dimension range's permissible values. Ranges of data in the multidimensional OTP are iterated through using the NEXT_RANGE function [15081-15087] to prevent cryptanalysis or replay attacks. This function finds the next usable range of indices in the OTP for the encryption/decryption process, allocating new ranges [15083] until full and then extending an existing range [15084-15085] until it merges with another range. The basic encryption function is also the decryption function and consists of simply XORing a single value in a given piece of data with OTP data using a given virtual dimension VDIM and virtual index VINDEX [15093]. This function is called repeatedly in the ENCRYPT_TEXT function until the required piece of information is encrypted [15095-15097]. In this function, the PACK operation compresses and cloaks the number and arrangement of each dimension's index bits in the publicly visible index to the minimum [15102] without revealing the number of bits used to index each dimension [15101] shared privately during phase one. This occurs in the function ENCRYPT_MSG [15100] where the ENCRYPT_TEXT function is called [15104]. After a random amount of encryption [15111] the function will start to encrypt a new or extended range within the OTP. The decryption occurs when the DECRYPT_MSG function calls ENCRYPT_TEXT [15110-15111] being its own reciprocal function. Certification of information occurs in CERTIFY function [15114-15118] which calls the ENCRYPT_MSG function [15100]. If OPT_MODE is set to enhanced, ENCRYPT_MSG is called again [15118]. Authentication is performed in a function [15120-15123] where DECRYPT_MSG is used to process a given piece of token text TOKENTEXT. Note that the token text is derived from the OTP data, and there are certain demarcated ranges within the OTP for authentication. Demarcation prevents multiple requests being made for token text which could be used to provide data for cryptanalysis. If OPT_MODE is set to enhanced, then DECRYPT_MSG is called again.

Figure 16:
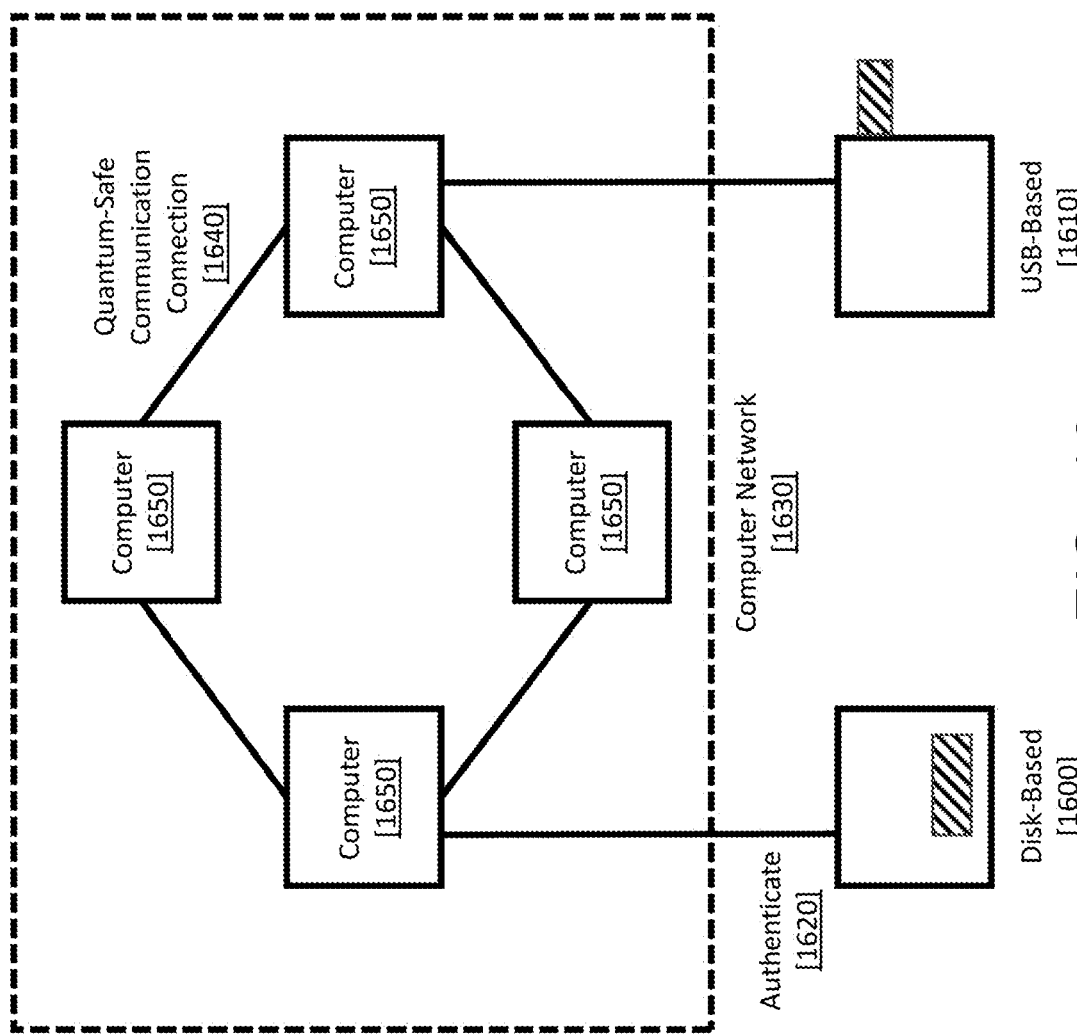
FIG. 16 illustrates how a device could connect to a computer network in a quantum-safe fashion.

FIG. 16 illustrates a computer network utilizing the quantum-safe encryption method in accordance with embodiments of the invention. A device could have disk-based [1600] or USB-based [1610] implementation of the quantum-safe encryption system which then authenticates [1620] with a given computer network [1630]. The computer network consists of quantum-safe communication [1640] between various devices [1650] equipped with software/hardware implementation of the QSE system which can include computers, tablets, phones, or other electronic systems.

Figure 17:
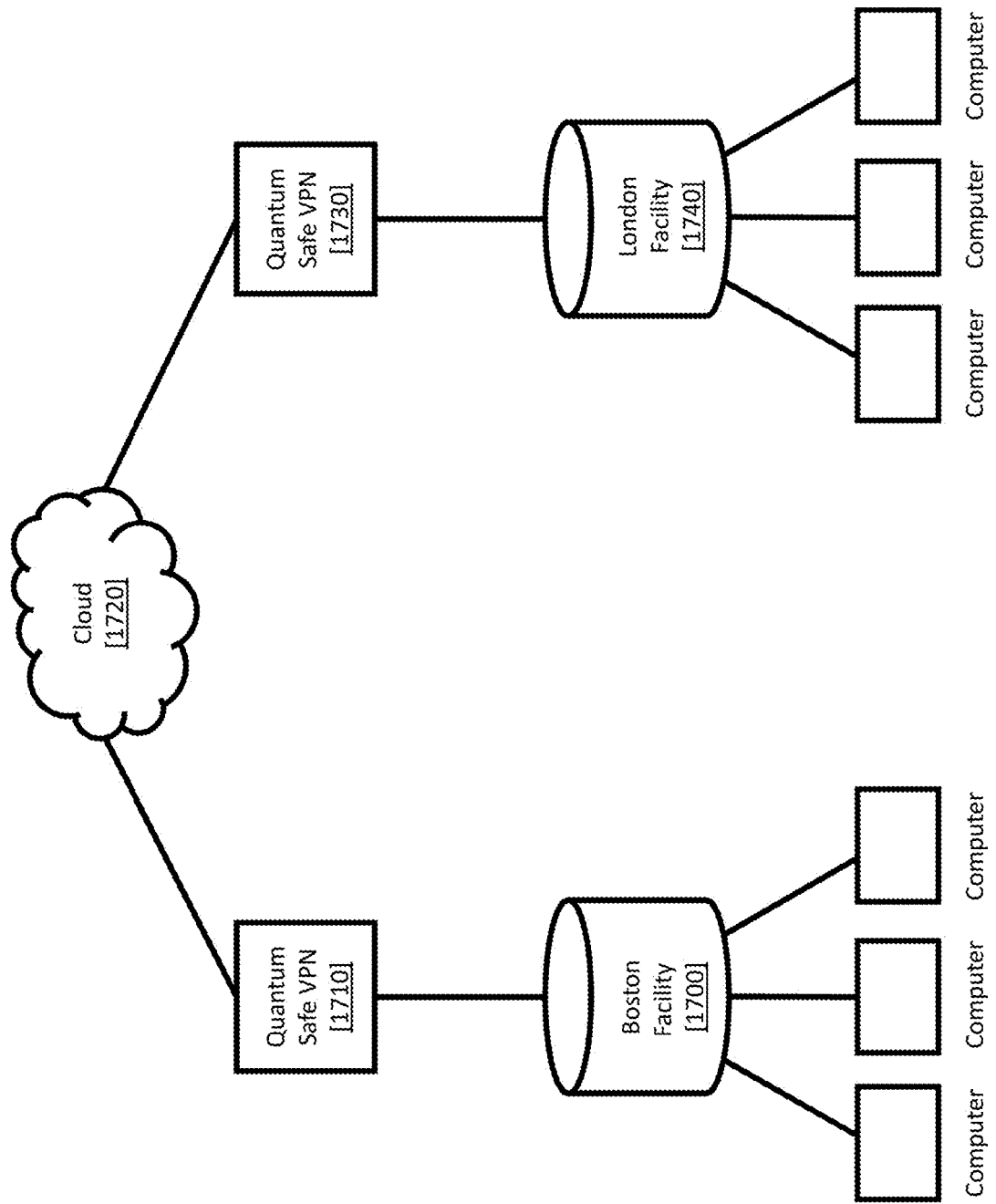
FIG. 17 illustrates an example of how computer networks could communicate over great distances in a quantum-safe fashion.

FIG. 17 illustrates how a computer network/virtual private network (VPN) could be constructed/configured to securely transmit data using computers acting as gateways in a quantum safe manner over any distance, in accordance with embodiments of the present invention. First, a computer network in one location such as Boston, USA [1700] connects to a quantum-safe virtual private network (VPN) gateway [1710] and then can connect through the VPN to the internet/cloud-based resources [1720]. Through the cloud a connection with another quantum-safe VPN in London gateway [1730], UK is established. Through this VPN, communication with a computer network in London [1740] can finally be achieved. Similar schemes can be used to connect to any other computer network in any other location, whether globally or in space (through aircraft/satellite/spacecraft communication).

Figure 18:
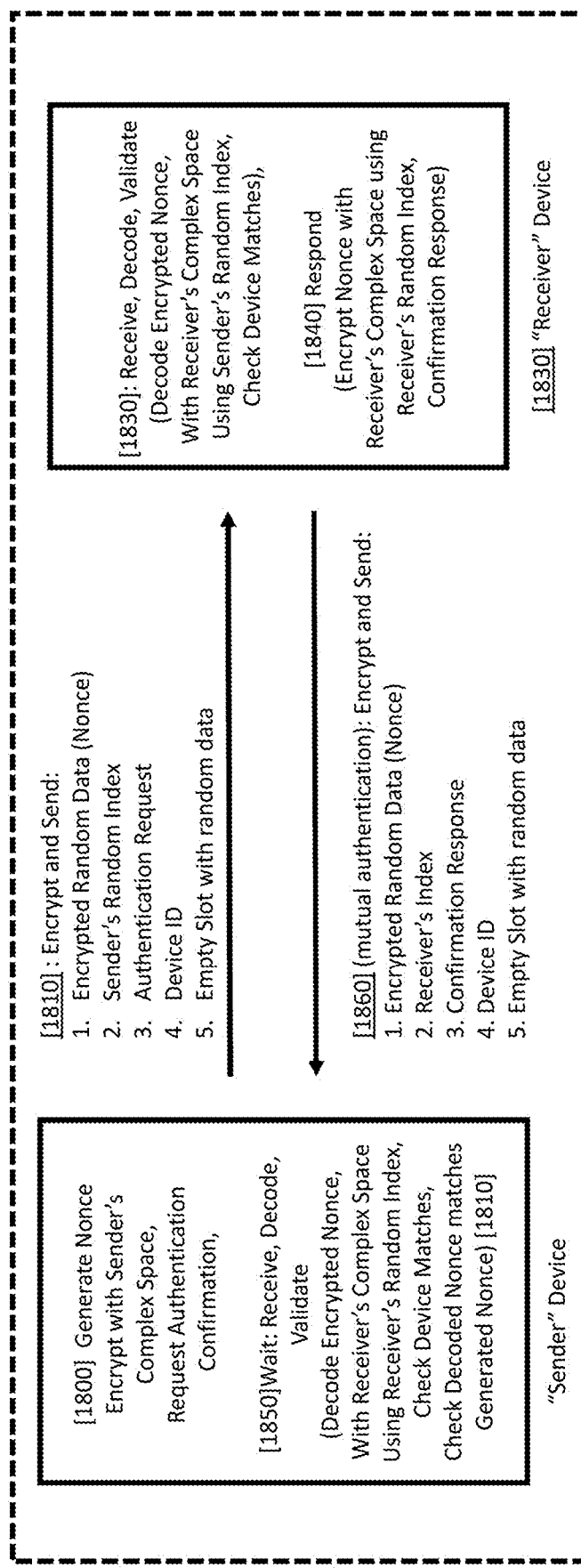
FIG. 18 illustrates the process of authentication between two or more devices.

FIG. 18 illustrates one possible simplified authentication process between two (or more) devices, referred to as sender and receiver. It is envisaged that the authentication process may compliment the previously described encryption process. The object of a bilateral authentication process is for the sender to determine if the receiver is in possession of the correct encryption key, generated during the previously described virtualization process. Similarly, the object of a multilateral authentication process is for both sender and receiver to confirm that their opposite party is in possession of the correct encryption key. In accordance with this embodiment, the authentication process consists of exchanging information (packets) between both devices, having a standardized size (e.g. 1 kilobyte). Information may be stored in the packet, and any remaining storage space in the packet that is not used may be padded with random data in an empty slot. The authentication process is initiated by the sender device generating a nonce in step [1800], which has its usual meaning and relates to a piece of random data, preferably generated by a random number generator. The nonce may comprise a small portion of random data, that when encrypted is combined with data from an eOTP associated with one or more coordinates (or equivalently associated with one or more indices) selected by the sender and defined in the complex space. In certain embodiments the data may be combined using for example, an XOR function. In step [1810] the sender encrypts and transmits the following to the receiver: (1) the generated nonce; (2) a request to provide the sender with a confirmation of what the random data (nonce) generated by the sender was; (3) a device ID; and (4) null bits encoding an empty slot of information. In step [1830], the encrypted data is received by the receiver, and decrypted in order to recover the nonce. The receiver can only successfully recover the random data (nonce) when the sender's encryption and receiver's decryption keys match. That is to say that both the receiver and sender's keys relate to the same coordinate, or equivalently indices, in the shared complex space. In this way the receiver is able to recover the random data. In order to complete the unilateral authentication process, the receiver then needs to re-encrypt and communicate the recovered random data (nonce) back to the sender at step [1840]. Upon receipt of the receiver's response, the sender then verifies whether the nonce recovered by the sender is consistent with the nonce transmitted by the sender, at step [1850]. When the receiver's complex space or indices do not match the nonce produced and returned to the sender will be useless random data and the sender's confirmation of the received nonce will fail. A Unilateral authentication is successful when the sender is able to verify the nonce, where the random data recovered by the receiver is consistent with the random data transmitted by the sender. This confirms to the sender that the receiver is in possession of the correct key for the current session, and also is in possession of the secure information required to define the complex space that is known only to the sender and receiver. Where bilateral authentication is required, then the receiver may generate a new random nonce, encrypt and transmit it back to the sender, by doing the following at step [1860]: (1) generate a new nonce; (2) request that the sender provide the receiver with a confirmation of what the new random data (nonce) generated by the receiver was, (3) the destination device ID, and (4) bits that occupy an empty slot in the communication protocol. The sender then recovers the random data (nonce) comprised in the receiver's prepared nonce in the same was as previously done by the receiver in recovering the random data comprised in the sender's nonce, and encrypts and communicates the response to the receiver for authentication. The authentication process prevents replay attacks by requiring encryption on each encrypt and send step [1820], [1850] that encryption uses different complex space indexes (vector path set) and for every encrypt and send step, a different source and destination index.

Figure 19:
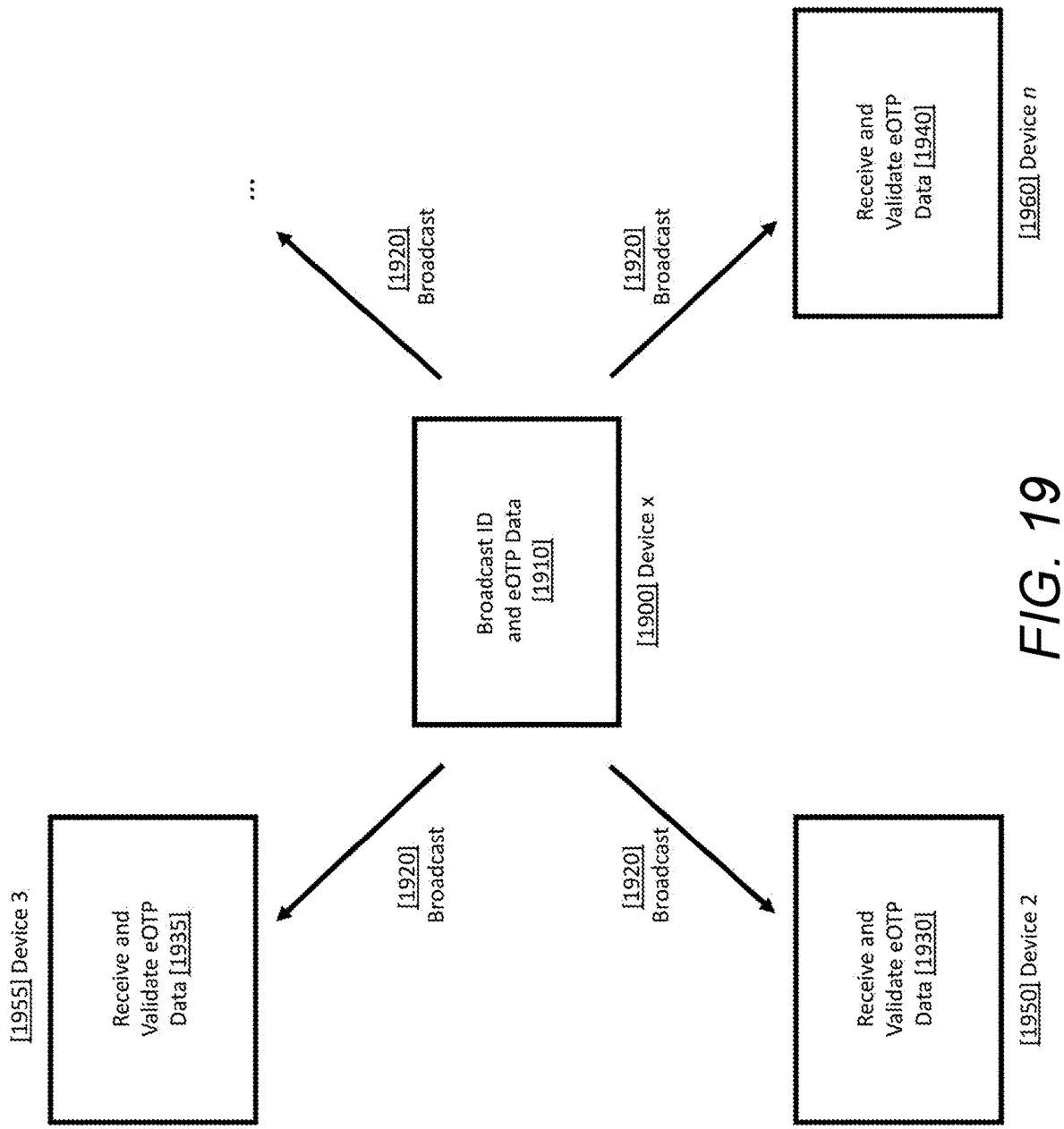
FIG. 19 illustrates the process of broadcasting information using datagrams.

FIG. 19 is a depiction of connectionless communication between multiple devices using a datagram which may contain sequence number, timestamp and lifetime information. Initially, a device, here designated as device x [1900] broadcasts information, containing a broadcast device ID, a random sample of eOTP, and corresponding eOTP index [1910] is encoded, encrypted, and then stored in a datagram for broadcasting/multicasting to other devices [1920]. Each of the devices that are capable of receiving the broadcast/multicast then decrypt the data, and validate the eOTP [1930], [1935], [1940] in the various devices [1950], [1955], [1960]. If the validation is successful, the information from the broadcasting device is accepted and other communication from the broadcasting device can be accepted for usage.

Figure 20:
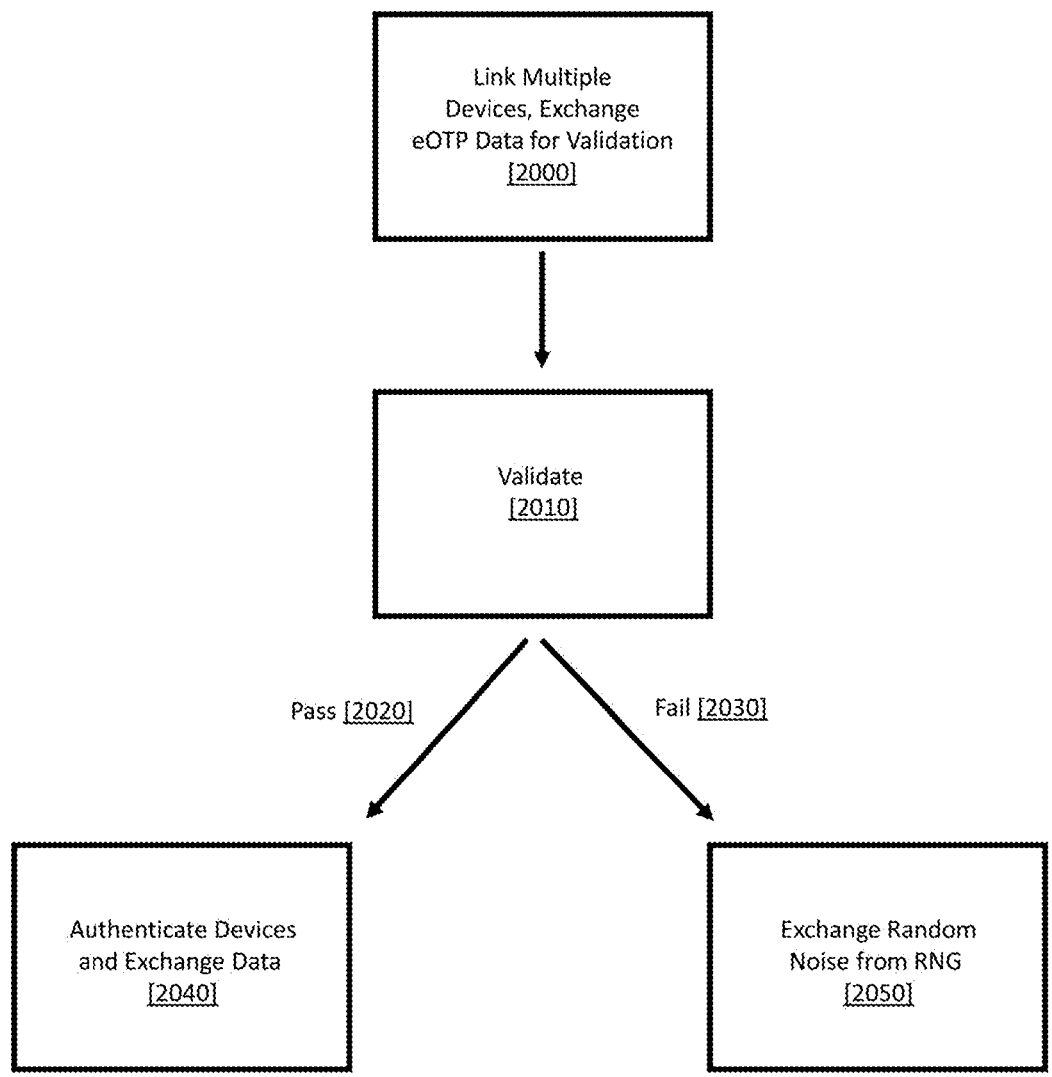
FIG. 20 illustrates a flowchart which describes the basic logic involved in authentication and communication for QSE.

FIG. 20 illustrates the logic that governs the authentication process and datagram-mediated communication. Once information has been sent or broadcasted for validation [2000], the validation process, in which data is decrypted, is performed [2010]. If the validation process is successful (or a "pass" [2020]), then the authentication process was successful and data is exchanged between two or more devices [2040]. If the validation process failed [2030], then rather than exchanging actual information between two or more devices, random data from the RNG is passed [2050]. An optional step in the secure encryption process described here is authentication, which involves the creation of a device identity and a simple one way sender identity check of each message sent between sender(s) and receiver(s) or storage device. QSE can be used to secure communication of information during the authentication process. Identities are stored as binary device identities of sufficient length so that there is no chance of collision, and can also include appended binary group identifiers. A set of registers, which can index into portions of a given xOTP(s) of variable length can be used to hold/record/store device and group IDs. In addition to this, a configurable process to load, record, or allocate identity from various possible sources, which can include an xOTP, a QRNG, an external source of random data, or another source of identity can be used to manipulate the authentication data. Additionally, a configurable process to set a particular identity at the time of manufacture, or at the time when devices are being configured when xOTPs are exchanged/entangled, and/or during a specified interval or event (optionally based on elapsed time, volume of encryption or number of connections, expiry time/date, or other factors) is used. To create lists of identifiers, identifiers are created/recorded in a certified list of all other known entangled device IDs/group IDs compiled at the time of entanglement or appended to the list of identifiers when other new device(s) share common portions of the device's xOTPs are entangled. As part of the authentication process, a random number generator should selected and configured, which can be from an internal RNG (which can be a PRNG, QRNG, TRNG, or other source), an xOTP, or an external RNG. The authentication process can also include an optional process to create a source of random numbers by mix/merge/substitute/transpose random numbers including optionally a randomness extractor (which can also perform lossy or lossless compression) such as a von Neumann extractor. During authentication, random nonces can also be used, which can be of arbitrary length and generated from a random number source. A sender will then broadcast its identity over a network or other communication scheme, and during this process, append device ID/group ID to each piece of data being sent before QSE is used to secure the data. The receiver will then check the identity of the device ID/group ID in each piece of data received after QSE, and if there is no match in the list, the data will be optionally discarded.

The authentication process can also be expanded to involve more complex methods and approaches, such as two and three way authentication using a device identity (device ID), and/or shared group identity when sent between the sender(s) and receiver(s) using QSE. In this process, a sender's challenge process is performed to authenticate the identity (which can include the device ID and/or group ID) of the receiver device(s) to be challenged by sending a QSE message/data containing a challenge key which is the result of an operation (such as an XOR operation) between the identity of the receiving device(s) to be challenged and a random challenge nonce. The receiver's response process, which occurs when the receiver is responding to a sender's challenge message, with a QSE challenge response message/data containing the result of the receiver's device/group identity XORed (or another operator) with the sender's challenge message/data to recover the sender's original random challenge nonce from the sender's challenge key. This is subsequently returned to the sender. The sender's authentication process, which involves receiving the receiver's response message and confirms if the sender's random challenge nonce and the receiver's recovered challenge nonces match (as any other receiver's device/group identity will not recover the sender's challenge nonce). In the optional receiver response process, which involves responding to the sender's challenge, the receiver also challenges the sender's device identity. In this process, the receiver's challenge response message also contains/appends a challenge message containing a key being the product (preferably XOR) of the sender's device/group identity to be challenged and a receiver's random challenge nonce. In the sender's challenge response, which involves a reply to a receiver's random challenge message/data with a QSE challenge response message containing the result of the sender's device/group identity XORed (or using another operator) and the receiver's challenge message to recover the receiver's original challenge nonce from the receiver's challenge key which is returned to the receiver. The receiver's authentication process involves receiving the sender's challenge response message/data and confirms if the receiver's original random challenge nonce and the sender's recovered challenge response nonces match (since any other sender's device/group identity will not recover the receiver's challenge nonce). Optionally, during the authentication process, a sender or receiver, challenge or response processes may append an additional arbitrary size random nonce for each challenge and response to increase the effective size of device identity thereby reducing either the possibility of replay attacks or identity collisions caused by similar but incorrect OTPs accidentally responding by chance. Another optional process which can be undertaken during authentication is that sender or receiver, challenge or response processes may use QSE twice or more to encrypt the challenge/response messages thereby hiding the challenge response sequence and further obscuring the sender's/receiver's identity.

Figure 21:
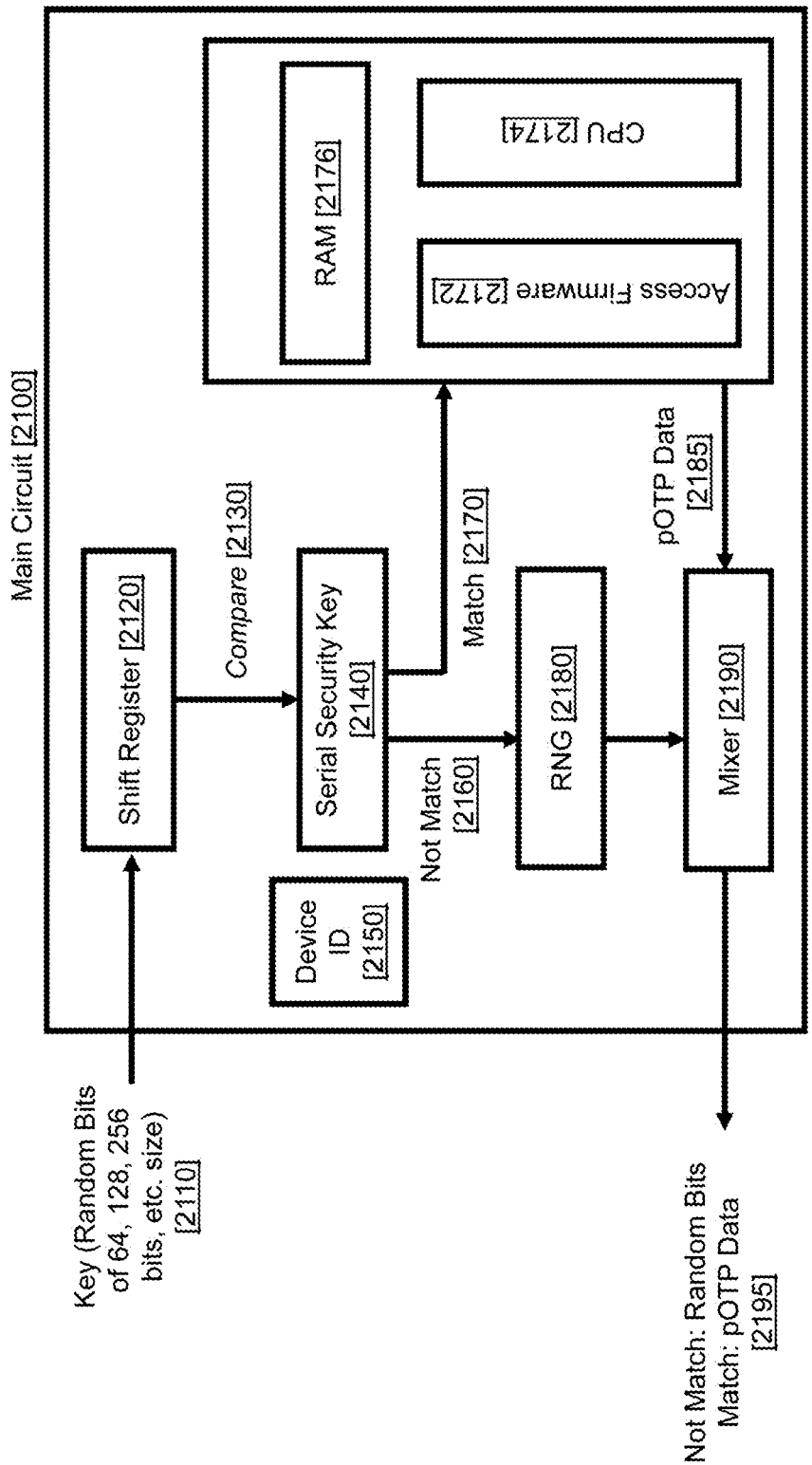
FIG. 21 illustrates physical access to a QSE device for OTP readout.

FIG. 21 illustrates how an optional readout of the OTP in an electronic device would function. A key, which can consist of bits of data of a given length [2110] (for instance, 64, 128, or 256 or more bits) is passed to a main circuit [2100] through a connection. This information is first analyzed by the shift register[2120], which contains a set of random bits programmed at fabrication time by another RNG on a separate device which is part of the manufacturing process. The shift register performs a comparison [2130] of the key to the serial security key [2140] programmed into the hardware. If the comparison results in a match [2170], then the firmware [2172], CPU [2174], and RAM [2176] produce the pOTP data [2185], which is then passed to a mixer [2190] before transmitting the data to another device [2195]. If the comparison of the key to the serial security key does not match [2160], then this results in the RNG generating random data [2180] which is then passed to the mixer [2190], and then this random data is randomly transmitted to another device [2195]. Although the figure illustrates serial processing of the readout key, an alternative embodiment allows parallel loading and processing of the readout key and OTP.

Figure 22:
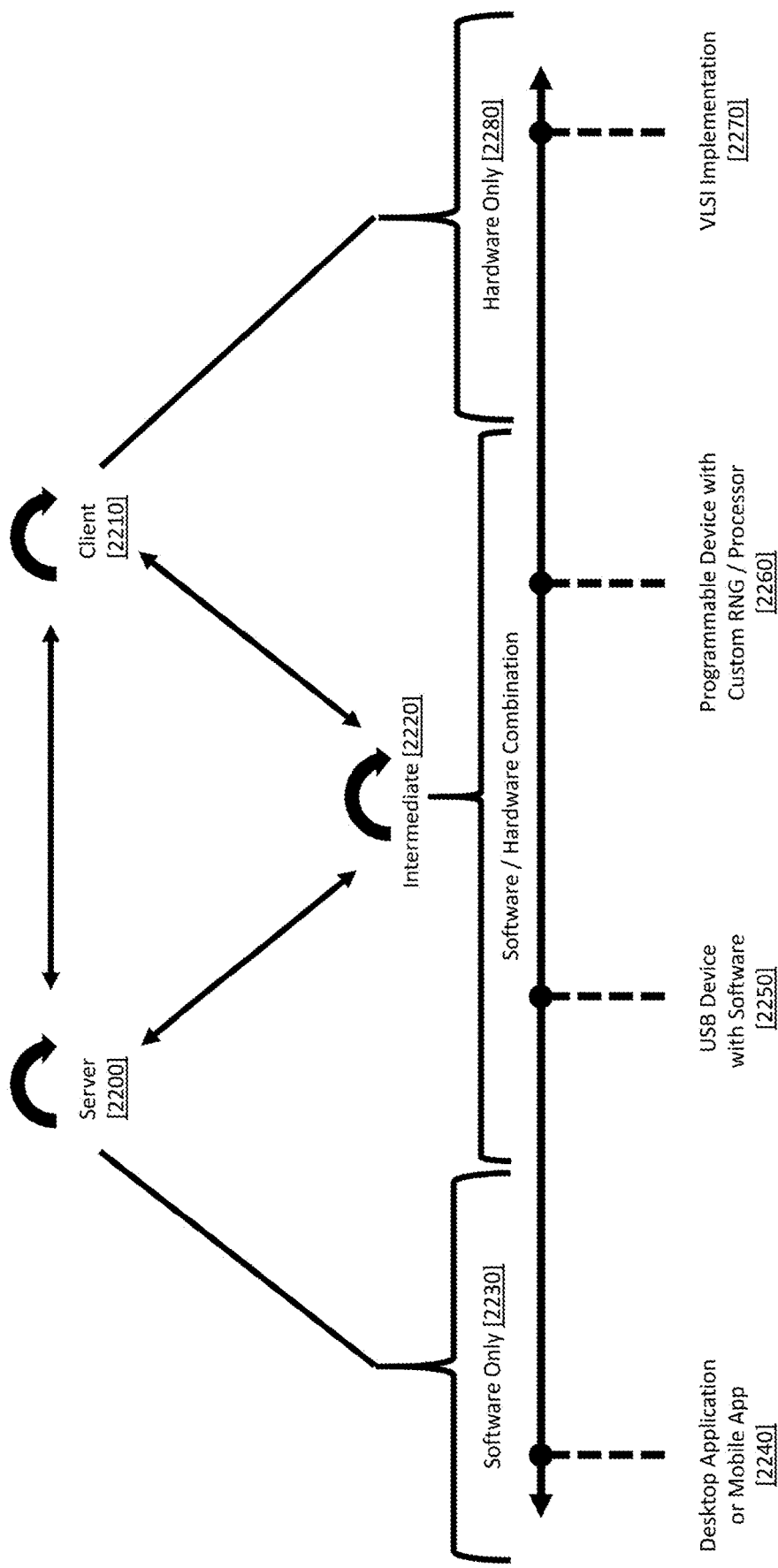
FIG. 22 illustrates possible embodiments of the present invention on the software-hardware spectrum.

Referring to FIG. 22, overall the invention can consist of different embodiments, where each embodiment can comprise a server [2200], client [2210], or intermediate [2220], which can interact with each other or themselves. Each embodied in many different combinations of software and hardware, with predominantly software implementation being one end of the spectrum [2230], and predominantly hardware on the other end [2280]. Logic blocks in software running on a general-purpose computer, such as in a desktop application or mobile app [2240] is an example of a predominantly software implementation. Dedicated logic hardware in highly integrated circuit designs (some of these implementations in increasing order of miniaturization are discussed below (all require random number generators)), such as with hardware implementations [2260], are examples of predominantly hardware implementations. Simple applications running on personal computers require only each has a source of random information (preferably TRNG/QRNG) [2230]. The personal computers initially should ideally be connected together in an isolated environment and since the personal computers share resources, however when in use, the applications may become vulnerable to attack. A software only implementation may be used with cellular phones, where the software and OTP memory are located in a Trusted Execution Environment (TEE) to protect the encryption software and OTP from attack. Another implementation takes the non-volatile flash OTP memory and a small microprocessor and places all the hardware and software logic into a removable device such as a USB key used by a personal computer [2250]. Only the removable devices need be isolated and the separate physical nature of the device prevents inspection of the OTP memory or other internal state information increasing physical security while reducing the vulnerability to attack. Another implementation takes the majority of software logic and places those parts in hardware logic, such as shift registers, address registers and banks of non-volatile memory [2260]. When dedicated FPGA (field programmable gate arrays) and ASIC/VLSI (very large scale integrated) circuits are used [2270], mass production is possible at low cost with very lower power consumption while the added miniaturization prevents inspection or probing of the internal state or OTP greatly improving physical security.

Figure 23:
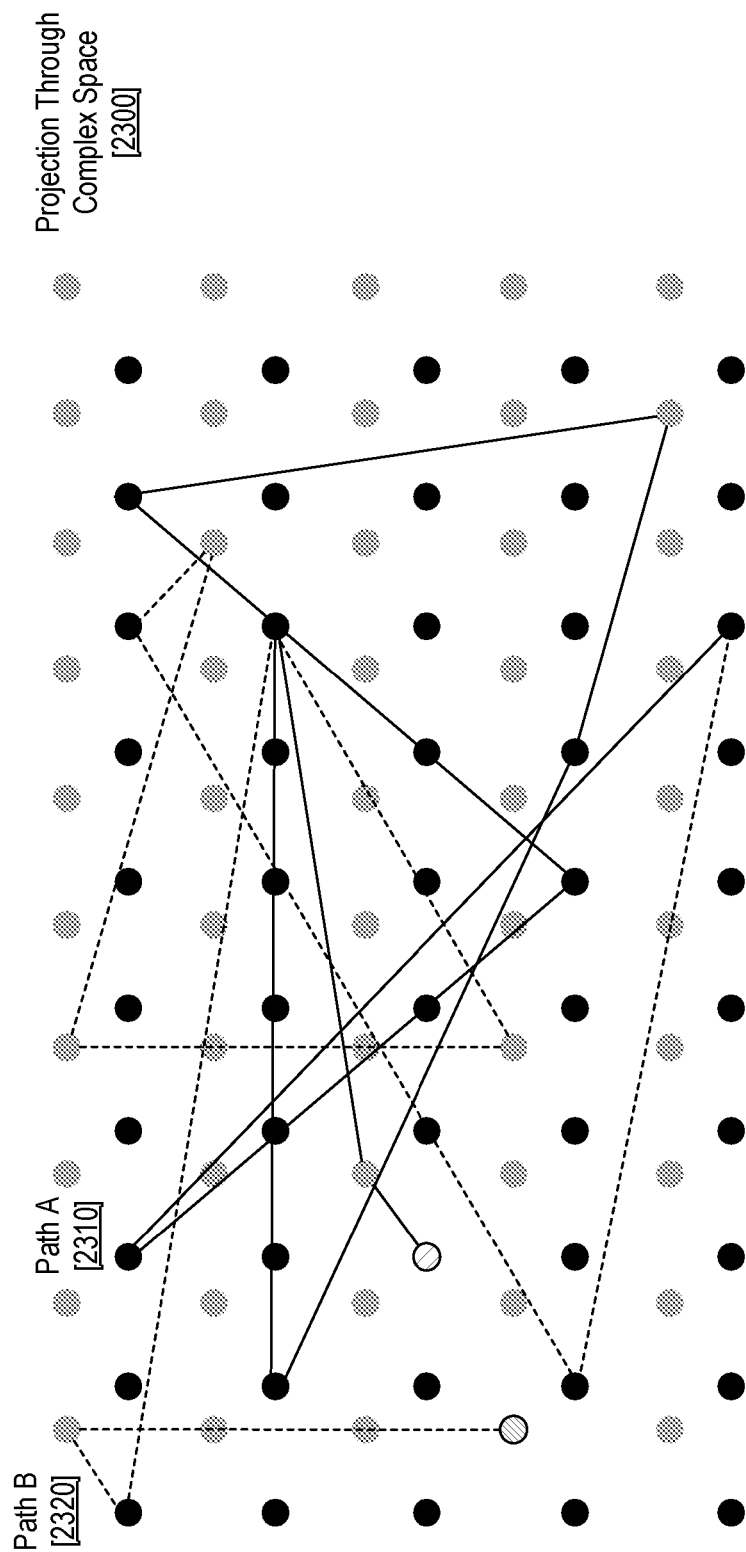
FIG. 23 illustrates a graphical representation of a complex space and an unstructured random walk.

FIG. 23 illustrates a graphical representation of a complex space [2300] and an unstructured random walk with N=100 and n=9. By refreshing the initial key string, the path taken in the first walk set (red [2310]) is not followed when the second set (blue [2320]) intersects with it.

Figure 24:
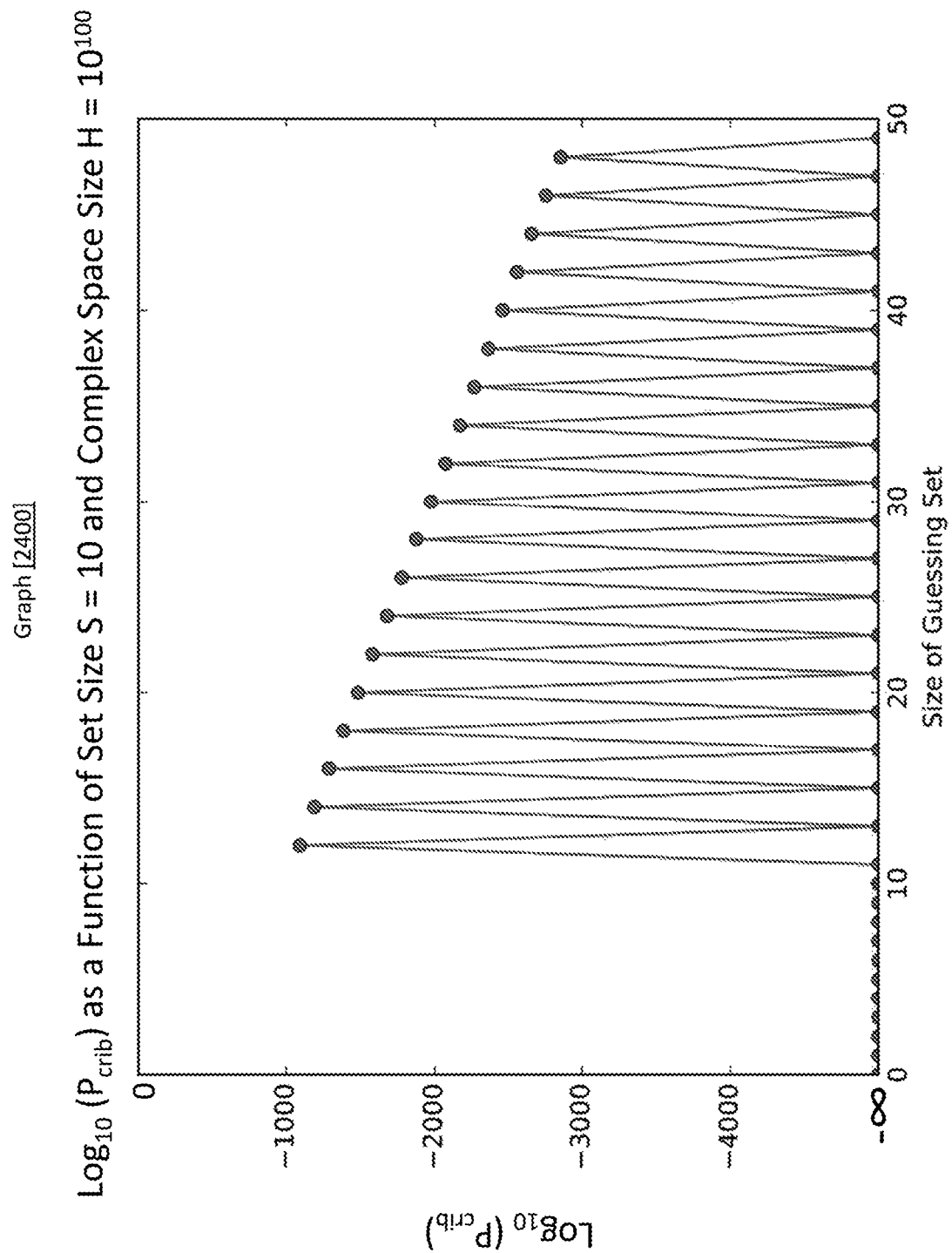
FIG. 24 illustrates a graph of the probability that a randomly selected set G breaking a set of S elements in a complex space of a googol (11) elements.

FIG. 24 illustrates a graph of the function of the probability of collision with a randomly selected set G breaking a set of S elements in a relatively small complex space of $10^{19}$ elements (using a log-scale of probabilities) [2400], or the probability of a successful crib $P_{Crib}$. When G has fewer than 10 elements, the probability is zero. Since no odd number of elements can cancel out an even number, and vice versa, this results in a striated pattern in the function where probability periodically oscillates between an ever vanishingly small value and zero probability. Larger complex spaces exhibit probabilities of collision approach but do not quite reach the Shannon Limit of Information so collisions may never occur in practice.

Typical applications of this system are in mobile cellular phones, telephony and communications including television and radio broadcasts, network devices such as gateways, routers, firewalls and VPN, personal computers, general purpose servers, file servers, web servers, database servers and other systems or electronic devices. A further implementation takes highly integrated circuits and places them in identity devices such as RFID, remote sensing and identity devices like credit cards, identity cards, passports to allow authentication of identity. Extremely low power versions of the implementation are possible, enabling operation with low power or transient power sources such as electro/electromagnetic/magnetic field, solar, or electro/static/voltaic sources, like bi-metallic, aircell, chemical battery, piezo or curie effect. Very low power implementations with the encryption logic designed in hardware gates and registers requires little or no programming. Consequently, the speed and latency of operation is fast, fixed and predictable or with low jitter, required for precise timing of highly synchronized processed such as cellular phone signaling, financial transactions and ledgers where accurate precision timing is used to arbitrate access to resources or records. Time division of resources with long operational life in decades makes the implementation suitable for both terrestrial and satellite communications. A final implementation example takes a version of the highly-integrated logic/circuit design and provides a hardware logic library (like Verilog or VHDL) to enable inclusion into the hardware of a microprocessor or similar devices. The library allows the adaptation of a general-purpose processors such as the ARM processor so a quantum encryption engine can be added to a provide a specialized single chip solution. Ultimately the encryption engine implementation may be included as a standard feature of any electronic processor/CPU.

APPENDIX—MATHEMATICAL MODELLING

The embodiments of the invention are comprise a method in which large random bit strings (herein referred to as vectors) are created from an original random vector derived from a true random number generator, such as a quantum random number generator. The algorithm uses OTPs which are information theoretic secure, as well as secure key reuse that is combinatorically secure. This appendix will outline key properties of the methods in accordance with embodiments of the invention, including: (1) the preservation of optimal randomness: mixing vector data, when derived from a uniformly random distribution, preserves the properties of the distribution. (2) ensuring that there is no key repetition during the virtualization procedure of the algorithm, using a seeded set selection technique and a bound on virtualization, (3) how attempts to compromise encryption through the biasing of set selection will not be successful (with reasonable assumptions), (4) the probability that an attacker could gain access to insecure message text given a certain amount of intercepted ciphertext produced in a combinatorially secure way, and that this probability is unphysically (when using reasonable parameters).

Here we will examine the XOR function and its ability to preserve randomness, and show how it can function as a mixing function. The truth table for the XOR function can be defined in equation 2:

| Equation 2 $a \oplus b = c$ | | |
|---|---|---|
| a | b | c |
| 1 | 1 | 0 |
| 1 | 0 | 1 |
| 0 | 1 | 1 |
| 0 | 0 | 0 | when calculating the result of the XOR function, the variables a and b are binary vectors of length $\rho$ (i.e. A, $B \in \{0,1\}^n$). The result of an XOR function between the two vectors can be defined as the bitwise operation between the $i^{th}$ element of vector A and the $i^{th}$ element of vector B, to produce another binary vector of length $\rho$.

To illustrate that the XOR operation preserves randomness, consider a fixed vector F, which can be defined as $F \in \{0,1\}^\rho$ and another vector R which is chosen from a uniformly random distribution (derived from a true random number generator or some other means) where the probability of each individual binary element in the vector $2^\rho$ can be defined as $2^{-\rho}$. The result of XORing the vectors F and R can be defined as O, such that:

$$O = F \oplus R \quad \text{(Equation 3)}$$

We can define the probability that O assumes an arbitrary value as follows:

$$P(O = \text{Arbitrary}) \quad \text{(Equation 4)}$$

which is then defined as $$= P(F \oplus R = \text{Arbitrary}) \quad \text{(Equation 5)}$$

which is then equivalent to $$= P(R = F \oplus \text{Arbitrary}) \quad \text{(Equation 6)}$$

This can be stated because of the following relationships:

$$1) O = A \oplus A = \{0\}^\rho \quad \text{(Equation 7)}$$

$$2) \{O\}^\rho \oplus A = A \quad \text{(Equation 8)}$$

$$\forall A \in \{0,1\}^\rho \quad \text{(Equation 9)}$$

Hence, the probability of the vector O assumes a specific value is equivalent to the probability of R assumes a specific value. As a result, the following can be asserted:

$$P(O = \text{Arbitrary}) = P(R = F \oplus \text{Arbitrary}) = 2^{-\rho} \quad \text{(Equation 10)}$$

since all of the values of R are equiprobable by definition. Hence, the distribution of values of a given vector combined with another vector of values with a uniformly random distribution using the XOR operation will be a random distribution of values as well (assuming that the two input vectors are independent). This observation can be extended to a set of n vectors, such can then be combined using a series of XOR operations in the following fashion:

$$O = R \oplus A_1 \oplus A_2 \oplus A_3 \ldots \oplus A_n \quad \text{(Equation 11)}$$

where $A_m$ is an arbitrary value. We can then define:

$$F = A_1 \oplus A_2 \oplus A_3 \ldots \oplus A_n \quad \text{(Equation 12)}$$

hence for a given number of vectors n combined using the XOR operator, if at least one vector is of a random distribution, the final result will also be of a random distribution.

Having establishing that vector combinations from a uniformly random distribution of values can constitute a valid source of new random vector data, a method of selecting sets of information securely must be established. In the encryption algorithm, random vector information which constitutes an OTP is "virtualized" or transformed into a "complex space" which can consist of hyperdimensional space, a network, graph, vector space, or other space as defined previously. The complex space has a coordinate system associated with it, and subsets of the space need to be selected so that no information is revealed about the final or initial key. The initial key is used to guide the selection of subsets in a deterministic fashion. This process will allow one or more parties with the initial key to reconstruct the same final key, used for encrypting the message, which is much larger.

For instance, consider a complex space with N entries, and each entry consists of a p length vector that is generated using a true random number generator, like a quantum random number generator. The unique index for each location, stored in m bits, can be defined using the following equation:

$$m = \text{Log}_2(N) \quad \text{(Equation 13)}$$

The walk is initiated by storing the location of the first m bits of a key in a temporary set. The entry to the next location is then provided by XORing the m bits of the initial key with the first m bits of the entry. The product of the XOR operation will produce a result that is of a uniformly random distribution as discussed in section 1.

This process is repeated at new locations in the complex space, with each entry added to the temporary stored set, until the set contains n desired elements. Then, the resulting n $\rho$ vectors are XORed together resulting in $\rho$ bits of the final key. The temporary set is then cleared and the portion of the final key is stored. Then, m bits are discarded from the initial key, and subsequently m bits are retrieved to be processed in the same fashion. During this process, the refresh rate for generating the initial key can be changed to correspond to the appropriate key generation rate.

When selecting a set of n items, the probability of selecting that set can be expressed as the product of the probabilities of selecting each individual item:

$$P_{set} = \Pi_i P_i \quad \text{(Equation 14)}$$

The probability of selecting each item can be described as $$P_i = \frac{1}{2^m},$$

as each of the m bits obey a uniformly random distribution. The selection of each item is therefore equiprobable, so each set is trivially equiprobable and can be described as:

$$P_{set} = \frac{1}{\binom{N}{n}} \quad \text{(Equation 15)}$$

This method provides access to all possible subsets within the complex space equally, and the method of subset selection results in no structure in the final key. It is important to note, however, that the set of all chosen subsets has a uniformly random distribution in numerical values, since any two subsets with a nonzero union can be described as having a higher probability of equality compared to two disjoint subsets. This is because the union will have overlap (see FIG. 23).

If we define a complex space of N elements, with a given precision $\rho$ (which can also be referred to as "bit depth"), and a general subset of n elements (n<N), a structure less random walk can be described in the following fashion. We need to define two spaces, a "bit space" and "combination space". The definition of the "bit space" is a space containing all possible binary vectors of length $\rho$, and the size of the space is specified by $2^\rho$. The "combination space" contains all possible combinations of n elements contained in an N-dimensional complex space. This has a multiplicity defined by a binomial coefficient (without repetition):

$$\binom{N}{n} = \frac{N!}{n!(N-n)!} \quad \text{(Equation 16)}$$

Since the XOR operator is commutative, unordered combinations should be considered rather than ordered permutations. If the combination space size exceeds the bit space size, then this results in multiple combinations of n elements (from N) which when combined result in the same key. As an example, if we have a list consisting of 10 4-bit strings, then this results in 220 possible ways to select various subsets of 3 elements with replacement. The corresponding dimension of the bit space is $2^4=16$, and the 16 possible strings are produced on the average, 220/16=13.75 distinct subsets. Hence, certain vectors will occur more likely than other vectors in a complex space. We can define an expectation value which expresses the number of sets which lead to a specific vector as:

$$v = \frac{\binom{N}{n}}{2^\rho} \quad \text{(Equation 17)}$$

which applies to all possible vectors, and selecting certain values for n and $\rho$ can result in:

$$\binom{N}{n} \approx 2^\rho \quad \text{(Equation 18)}$$

yielding an expectation within a given complex space of one set per string with size $\rho$ bits.

There are constraints on this process, including physical memory requirements and time to perform multiple XOR operations. With regard to physical memory, the total amount of memory that needs to be used is related to the number of bits that need to be stored at a given time in the complex space, and as well as the locations of temporary sets, with the physical memory (a reasonable physical memory limit might be $10^{10}$ bits) P being defined as:

$$N \cdot \rho + n \cdot \log_2(N) \approx P \quad \text{(Equation 19)}$$

Additionally, to combine n elements, $n \cdot \rho$ bitwise XOR operations need to be performed. If we define the time to perform an XOR operation as tau, then the time to produce a single bit of key n can be defined as:

$$T = n \tau \quad \text{(Equation 20)}$$

Hence, if n is very large, the bitrate reduces. For the remainder of this discussion, r will be assumed to be small enough to render this an insignificant problem. While the combination space can be maximized when n=N/2, this may be difficult to implement practically. In order to impart a combinatorial advantage, we need the combinatorial space to be larger than N, such that:

$$N << \binom{N}{n} \approx 2^\rho \quad \text{(Equation 21)}$$

A realistic example can be now developed considering the memory and time/bitrate constraints discussed above. If we allocate 1 GB of storage ($10^{10}$ bits) filled with vectors with $N=10^6$ and a depth of $\rho=10^4$. We can define the combination space with n=861 as:

$$\binom{10^6}{861} \approx 10^{3010} \quad \text{(Equation 22)}$$

And the bit space has a size defined as:

$$2^{10^4} \approx 10^{3010} \quad \text{(Equation 23)}$$

This describes an approximate equivalence between bit space and the combination space. This can be recalculated if sets are recorded and eliminated while running, which would yield about $10^4 * 10^{3010} = 10^{3014}$ bits of key available, an astronomical value which completely dwarfs all known data storage capacity. A key growth expansion factor, which needs to be defined due to the requirement of refreshing the initial key, can be defined as:

$$\hat{K} = \frac{\rho}{j \cdot \log_2(N)} \quad \text{(Equation 24)}$$

With the value j defined as the number of refreshes per set, and j=1 yields a factor of 500 bits of final key per bit of initial key.

The above discussion has shown that spatial distributions of selected subsets in within complex space can be described as uniformly random. However, the values in each subset, namely the XOR product of all elements, may not be numerically uniformly distributed, since some complex space subsets have nonzero unions, which are always equal. While the XOR product of all of the elements in a single subset creates a random value which is treated as a uniformly random event, the probability of a "collision" (or two selected subsets producing the same value) depends on the size of the union. As a result, the keys used are not maximally entropic, resulting in some reuse in the protocol. This can be demonstrated in the following example which involves a complex space with two entries, denoted A and B. A scheme where all of the combinations are used can be expressed as follows:

$$A \oplus M_1 = C_1 \quad \text{(Equation 25a)}$$

$$B \oplus M_2 = C_2 \quad \text{(Equation 25b)}$$

$$A \oplus B \oplus M_3 = C_3 \quad \text{(Equation 25c)}$$

An attacker can gain access to an XORed data using a brute force attack without the presence of a key, which is susceptible to frequency analysis:

$$C_1 \oplus C_2 \oplus C_3 = A \oplus M_1 \oplus B \oplus M_2 \oplus (A \oplus B \oplus M_3) = M_1 \oplus M_2 \oplus M_3 \quad \text{(Equation 26)}$$

The combinations of ciphertext remain secure if there is one string of unknown key data, with one string of maximally entropic key data sufficient to secure the data against crib drag, brute force attack, frequency analysis, and other cryptanalysis methods. To determine the probability that an attacker or some external person could access or decrypt XORed data that is susceptible to frequency analysis, we need to calculate the probability that combinations of compromised ciphertext will completely cancel the key present in another compromised ciphertext.

To address this problem, we assume that the key can be drawn with equal probability from all sets of complex space elements (i.e. using a structure less random walk). With this assumption, we can count the number of possible multisets G of size |G| (where repetition is allowed in G) of complex space elements that cancel out a set of size |S| (with no repetition allowed in S). S is a set of complex space elements that represent the XOR product that produced a key for ciphertext that was intercepted. G represents the set that consists of the XOR product of multiple keys of other intercepted ciphertexts. This is a larger set of XORed complex space elements that allows for repetition.

To allow for frequency analysis, two conditions need to be fulfilled for a set G to cancel out a set S. The first condition specifies that every element of S must be contained in G an odd number of times. This condition ensures that the final product of the XOR operation does not contain elements contained in S. In the second condition, each element in the complex space that is not in S must be contained in G zero times or an even number of times. This ensures that no new complex space elements are introduced when S is XORed with G. This problem can be represented in the following fashion: an integer can be assigned to each location within a complex space such that each integer represents the number of times that a location appears in G. If we define the size of a complex space as |H|, the ordered sum of |S| odd integers, and the ordered sum of |H|−|S| even (or zero) integers that sum to |G| represent a unique, unordered set G. This set G cancels some set S.

Using these principles, we can define the number of integer constructions, or the number of ordered integer sums that equal a particular value. Odd integer constructions of k elements that add to n are expressed as:

$$\binom{\frac{n-k}{2} + k - 1}{\frac{n-k}{2}} \quad \text{(Equation 27)}$$

For $$\frac{n-k}{2}$$

an integer, and zero if otherwise. We can then express number of even integer (including zero) constructions of n with k elements as:

$$\binom{\frac{n}{2} + k - 1}{\frac{n}{2}} \quad \text{(Equation 28)}$$

For n even, and zero if otherwise. Hence, the total sets G that will cancel out a set S is defined as follows:

$$\sum_{n=|S|}^{|G|} \binom{\frac{n-|S|}{2} + |S| - 1}{\frac{n-|S|}{2}} \cdot \binom{\frac{|G|-n}{2} + |H| - |S| - 1}{\frac{|G|-n}{2}} \quad \text{(Equation 29)}$$

and all fractional expressions are integers, or else the term does not contribute. This can be expressed as a probability by dividing the sum terms by total possibilities, |H| multi-choose |G|:

$$P_{cancel} = \frac{\sum_{n=|S|}^{|G|} \binom{\frac{n-|S|}{2} + |S| - 1}{\frac{n-|S|}{2}} \cdot \binom{\frac{|G|-n}{2} + |H| - |S| - 1}{\frac{|G|-n}{2}}}{\binom{|H| + |G| - 1}{|G|}} \quad \text{(Equation 31)}$$

Using numerical modelling one can calculate reasonable values for the complex space. From the plot FIG. 24, the probabilities of guessing a successful set vanish rapidly as G increases in value (in this instance a complex space of a googol ($10^{100}$) in size is used because of the limited precision m the mathematical libraries used to model). Using this relationship, the amount of ciphertext that needs to be intercepted for a break to occur can be calculated. If an attacker intercepts discrete packets of $\rho$ bits of ciphertext, the total number of access attempts is $2^C$ with the number of intercepted ciphertexts being C (that have $\rho$ bits of message data XORed with the same amount of a final key which are generated from a set of complex space elements), which is the total number of unordered sets chosen from C elements. The number of attempts to pick a cipher-breaking set is approximated as 1 over the leading probability term. If intercepted ciphertexts are in packets of trivial size S=10, then the allowed value for |G| is i·|S|, with i being an integer. If we assume that i=1 is forbidden, then the leading term can be expressed as $P_{break}(|G|=2 \cdot |S|)$ where i=2. From these relationships, the next term when i=3 is several times less likely, compared to i=2.

To determine how much ciphertext can be sent in this fashion with the assumption that not a single breaking set is even is more complicated to determine: C packets of intercepted ciphertext results in a number of unordered sets of size i given by $$\binom{C}{i}.$$

Hence a breaking set of i·|S| elements is available when:

$$\binom{C}{i} \cdot P_{break}(|G| = i \cdot |S|) \approx 1$$

for some value i. For modest values of C, $P_{break}$ dominates, and i=2 is maximal, but as C increases this is no longer necessarily true as the function $$\binom{C}{i}$$

outpaces $P_{break}$ with an increase in i.

The invention claimed is:

1. A first device for generating a private cryptographic key for use in a secure cryptogram for transmission between the first device and a second device over a secure quantum communications channel for establishing a quantum key, the first device comprising:
a hardware processor configured to:
generate a random vector defined in an n-dimensional vector space shared between the first device and the second device, the vector comprising one or more component coordinates defined in the n-dimensional vector space, each component coordinate being associated with one or more bits, using a quantum key distribution protocol executed between the first device and a second device, the quantum distribution protocol being configured to generate a random sequence of numbers, and associate the random sequence of numbers with component coordinates defining the random vector;
determine the one or more bits associated with each component coordinate comprised in the random vector; and
generate the private key in dependence on the one or more bits associated with each component coordinate comprised in the random vector.

2. The first device of claim 1, comprising:
an output configured to output information associated with the random vector to the second device, the information associated with the random vector enabling the second device to recover the private key from the shared n-dimensional vector space.

3. The first device of claim 2, wherein the output is configured to output information indicative of the one or more component coordinates associated with the random vector.

4. The first device of claim 1,
wherein the processor is configured to generate the cryptogram in dependence on the private key; and
the output is configured to output the cryptogram to the second device, the cryptogram comprising confidential information recoverable by the second device in dependence on the recovered private key.

5. The first device of claim 4, wherein the processor is configured to:
compress the confidential information in accordance with a lossless compression algorithm;
combine the compressed confidential information with random data;
generate the cryptogram by encrypting the compressed confidential information combined with the random data; and
wherein the processor is configured to include information enabling the confidential information to be distinguished from the random data in the cryptogram.

6. The first device of claim 5, wherein the processor is configured to:
compress the random data in accordance with a lossy compression algorithm; and
generate the cryptogram by encrypting the compressed confidential information combined with the compressed random data.

7. The first device of claim 4, comprising a random number generator and an input, the random number generator configured to generate a first nonce,
wherein the processor is configured to encrypt the first nonce using the generated private key;
wherein the output is configured to output the encrypted first nonce from the first device to the second device;
wherein the input is configured to receive a response message from the second device comprising a second nonce; and
wherein the processor is configured to determine if the first nonce and the second nonce are correlated and to authenticate the second device in dependence on the first nonce and the second nonce being correlated.

8. The first device of claim 4, comprising a pseudo-random number generator configured to generate the random vector by generating random component coordinates defining the random vector.

9. The first device of claim 8, wherein the pseudo-random number generator is configured to generate the random vector seeded with a value from a source of random numbers.

10. The first device of claim 1, comprising a random number generator configured to generate a random binary string; and
wherein the processor is configured to generate the shared n-dimensional vector space prior to selecting the random vector, by projecting the binary string into the n-dimensional vector space using a projection function, the projection function mapping the binary string to the n-dimensional vector space.

11. The first device of claim 10, wherein the binary string comprises a linear array of bits, and the processor is configured to use a projection function configured to map the linear array of bits to an n-dimensional array of bits comprised in the n-dimensional vector space.

12. The first device of claim 10, wherein the processor is configured to use the projection function to map the binary string to an n-dimensional vector space comprising any one of:
one or more fractal dimensions; or
one or more nested complex dimensions.

13. The first device of claim 10, wherein the random number generator is configured to generate a first random binary string, and combine portions of the first random binary string with portions of a second random binary string received from the second device.

14. The first device of claim 13, wherein the random number generator is arranged to randomly combine the portions of the first and second random binary strings.

15. The first device of claim 13, wherein the random number generator is arranged to combine the portions in accordance with one or more of:
a mixing function;
a merging function;
a substitute function;
an exchange function;
a shuffle function; or
a riffle shuffle function.

16. The first device of claim 13, wherein the random number generator is arranged to combine portions of the first and second random binary strings using an exclusive OR operator "XOR".

17. The first device of claim 10, comprising a secure environment, and the processor is configured to generate the shared n-dimensional vector space in the secure environment, the secure environment comprising any one or more of:
a Faraday cage;
a Virtual Private Network (VPN);
a secure fibre optic communications channel; or
a secure quantum communications channel for establishing a quantum key.

18. The first device of claim 10, wherein the processor is configured to:
divide the binary string into a plurality of discrete sub-sections, each sub-section comprising a plurality of bits;
associate an index to each sub-section;
map the indices associated with at least some of the sub-sections, to different coordinate values in the n-dimensional vector space; and
identify the index associated with each component coordinate and determine the plurality of bits associated with each component coordinate in dependence on the identified index.

19. The first device of claim 18, wherein the processor is configured to divide the binary string into the plurality of discrete sub-sections, each sub-section comprising a nibble.

20. The first device of claim 18, wherein
the random number generator is configured to generate a random sequence of indices; and
the processor is configured to select the random vector by identifying the component coordinate associated with each index in the sequence of randomly generated indices.

21. The first device of claim 9, wherein the processor is configured to partition the random binary string into two or more separate partitions, and project at least a portion of the separate partitions into the H-dimensional vector space using the projection function.

22. The first device of claim 21, wherein the processor is configured to partition the random binary string into a plurality of partitions of equal length.

23. The first device of claim 21, wherein the processor is configured to partition the random binary string into a random number of partitions, each partition having a random length.

24. The first device of claim 1, wherein the processor is configured to generate the private key by combining the one or more bits associated with each component coordinate comprised in the random vector.

25. The first device of claim 24, wherein the processor is configured to generate the private key by combining the one or more bits associated with adjacent component coordinates comprised in the random vector.

26. The first device of claim 24, wherein the processor is configured to combine the one or more bits associated with each component coordinate in accordance with a logical operator.

27. The first device of claim 26, wherein the logical operator is an exclusive OR operator "XOR".

28. The first device of claim 1, wherein the private key is a one-time key, and the processor is configured to generate a new one-time key for each new cryptogram required for transmission between the first and second devices.

29. The first device of claim 1, wherein the first device is any one of:
a mobile device; or
a personal computer.

30. A computer-implemented method of generating a private cryptographic key for use in a secure cryptogram for transmission between a first device and a second device over a secure quantum communications channel for establishing a quantum key, the method comprising:
generating, by a processor of the first device, a random vector defined in an n- dimensional vector space shared between the first device and the second device, the vector comprising one or more component coordinates defined in the n -dimensional vector space, each component coordinate being associated with one or more bits, the random vector being generated using a quantum key distribution protocol executed between the first and second devices, the quantum distribution protocol being configured to generate a random sequence of numbers and associating the random sequence of numbers with component coordinates defining the random vector;
determining, by the processor, the one or more bits associated with each component coordinate comprised in the random vector; and
generating, by the processor, the private key in dependence on the one or more bits associated with each component coordinate comprised in the random vector.

31. The method of claim 30, comprising:
transmitting, from the first device, information associated with the random vector to the second device, the information associated with the random vector enabling the second device to recover the private key from the shared n-dimensional vector space.

32. The method of claim 31, wherein the information associated with the random vector comprises information indicative of the one or more component coordinates associated with the random vector.

33. The method of claim 31, comprising:
generating, by the processor of the first device, the cryptogram in dependence on the private key; and
transmitting the cryptogram from the first device to the second device, the cryptogram comprising confidential information recoverable by the second device in dependence on the recovered private key.

34. The method of claim 33, comprising:
compressing, by the processor, the confidential information with a lossless compression algorithm;
combining, by the processor, the compressed confidential information with random data;
generating, by the processor, the cryptogram by encrypting the compressed confidential information combined with the random data; and wherein the cryptogram comprises information enabling the confidential information to be distinguished from the random data.

35. The method of claim 34, comprising:
compressing, by the processor, the random data with a lossy compression algorithm; and
generating, by the processor, the cryptogram by encrypting the compressed confidential information combined with the compressed random data.

36. The method of claim 33, comprising:
generating, by a random number generator of the first device, a first nonce;
encrypting, by the processor, the first nonce using the generated private key;
forwarding the encrypted first nonce from the first device to the second device;
receiving a response message at the first device from the second device comprising a second nonce;
determining, by the processor of the first device, if the first nonce and the second nonce are correlated; and
authenticating, by the processor of the first device, the second device in dependence on the first nonce and the second nonce being correlated.

37. The method of claim 36, comprising:
generating, by a processor of the second device, a third nonce;
encrypting, by the processor of the second device, the third nonce using the generated private key;
forwarding the encrypted third nonce from the second device to the first device;
receiving a response message at the second device from the first device comprising a fourth nonce;
determining, by the processor of the second device, if the third nonce and the fourth nonce are correlated; and
authenticating, by the processor of the second device, the first device in dependence on the third nonce and the fourth nonce being correlated.

38. The method of claim 30, comprising:
generating, by the processor of the first device, the random vector using a mathematical function, the mathematical function comprising a pseudo-random number generator configured to generate random component coordinates defining the random vector.

39. The method of claim 38, comprising:
generating, by the processor of the first device, the random vector using a mathematical function comprising a pseudo-random number generator seeded with a value from a source of random numbers.

40. The method of claim 30, comprising:
generating, by a random number generator of the processor of the first device, the shared n-dimensional vector space prior to selecting the random vector, by:
generating, by the random number generator, a random binary string; and
projecting, by the processor, the binary string into the n-dimensional vector space using a projection function, the projection function mapping the binary string to the n-dimensional vector space.

41. The method of claim 40, wherein the binary string comprises a linear array of bits, and the projection function is configured to map the linear array of bits to an n-dimensional array of bits comprised in the n-dimensional vector space.

42. The method of claim 40, wherein the n-dimensional vector space comprises any one of:
one or more fractal dimensions; or
one or more nested complex dimensions.

43. The method of claim 40, wherein the projection function is a state- dependent one-way function.

44. The method of claim 40, wherein generating the random binary string comprises:
the processor of the first device generating a first random binary string;
a processor of the second device generating a second random binary string; and
combining, by the processor of the first device, portions of the first random binary string with portions of the second binary string received from the second device to generate the binary string.

45. The method of claim 44, wherein the portions of the first and second binary strings are randomly combined using the random number generator.

46. The method of claim 44, wherein the portions of the first and second binary strings are combined in accordance with one or more of:
a mixing function;
a merging function;
a substitute function;
an exchange function;
a shuffle function; or
a riffle shuffle function.

47. The method of claim 44, comprising combining portions of the first and second binary strings using an exclusive OR operator "XOR".

48. The method of claim 40, comprising:
generating the shared n-dimensional vector space in a secure environment.

49. The method of claim 40, comprising:
dividing, by the processor of the first device, the binary string into a plurality of discrete sub-sections, each sub-section comprising a plurality of bits;
associating, by the processor of the first device, an index to each sub-section; and
wherein projecting the binary string into the n-dimensional vector space comprises mapping, by the processor, the indices associated with at least some of the sub-sections, to different coordinate values in the n-dimensional vector space; and
wherein determining the one or more bits associated with each component coordinate comprised in the random vector comprises:
identifying, by the processor of the first device, the index associated with each component coordinate, and
determining the plurality of bits associated with each component coordinate in dependence on the identified index.

50. The method of claim 49, wherein each discrete sub-section comprises a nibble.

51. The method of claim 49, comprising:
generating a random sequence of indices using a random number generator; and
selecting, by the processor of the first device, the random vector by identifying the component coordinate associated with each index in the sequence of randomly generated indices.

52. The method of claim 40, comprising:
partitioning, by the processor of the first device, the random binary string into two or more separate partitions; and
projecting, by the processor, at least a portion of the separate partitions into the n- dimensional vector space using the projection function.

53. The method of claim 52, comprising:
partitioning, by the processor of the first device, the random binary string into a plurality of partitions of equal length.

54. The method of claim 52, comprising:
partitioning, by the processor of the first device, the random binary string into a random number of partitions, each partition having a random length.

55. The method of claim 30, comprising:
generating, by the processor of the first device, the private key by combining the one or more bits associated with each component coordinate comprised in the random vector.

56. The method of claim 55, comprising:
generating, by the processor of the first device, the private key by combining the one or more bits associated with adjacent component coordinates comprised in the random vector.

57. The method of claim 55, wherein the one or more bits associated with each component coordinate comprised in the random vector are combined in accordance with a logical operator.

58. The method of claim 56, wherein the logical operator is an exclusive OR operator "XOR".

59. The method of claim 30, wherein the private key is a one-time key, and the method comprises:
generating, by the processor of the first device, a new private key for each new cryptogram required for transmission between the first device and the second device.

60. A non-transitory computer readable data storage device having stored thereon instructions for carrying out, by a processor of a first device, a method of generating a private cryptographic key for use in a secure cryptogram for transmission between a first device and a second device over a secure quantum communications channel for establishing a quantum key, the method comprising:

generating, by the processor, a random vector defined in an n-dimensional vector space shared between the first device and a second device, the vector comprising one or more component coordinates defined in the n-dimensional vector space, each component coordinate being associated with one or more bits, the random vector being generated using a quantum key distribution protocol executed between the first and second devices, the quantum distribution protocol being configured to generate a random sequence of numbers and associating the random sequence of numbers with component coordinates defining the random vector;

determining, by the processor, the one or more bits associated with each component coordinate comprised in the random vector; and generating, by the processor, the private key in dependence on the one or more bits associated with each component coordinate comprised in the random vector.

* * * * *